(12) United States Patent
Tao et al.

(10) Patent No.: US 8,962,729 B2
(45) Date of Patent: *Feb. 24, 2015

(54) SOY METHYL ESTER POLYSTYRENE BLENDS FOR USE IN CONCRETE

(75) Inventors: Bernard Y. Tao, Lafayette, IN (US); Kevin C. Coates, Huntington Beach, CA (US); William Jason Weiss, West Lafayette, IN (US); Samia Mohtar, West Lafayette, IN (US); Alva Peled, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,140

(22) Filed: Jan. 5, 2012

(65) Prior Publication Data

US 2012/0108705 A1    May 3, 2012

Related U.S. Application Data

(63) Continuation of application No. 12/592,336, filed on Nov. 23, 2009, now Pat. No. 8,129,459.

(60) Provisional application No. 61/116,946, filed on Nov. 21, 2008.

(51) Int. Cl.
| | | |
|---|---|---|
| C08L 91/00 | (2006.01) |
| C08K 3/00 | (2006.01) |
| C04B 40/00 | (2006.01) |
| C04B 28/02 | (2006.01) |
| C04B 41/00 | (2006.01) |
| C04B 41/52 | (2006.01) |
| C04B 41/63 | (2006.01) |
| C08K 5/103 | (2006.01) |
| C04B 111/27 | (2006.01) |

(52) U.S. Cl.
CPC ............. *C04B 40/0039* (2013.01); *C04B 28/02* (2013.01); *C04B 41/009* (2013.01); *C04B 41/52* (2013.01); *C04B 41/63* (2013.01); *C08K 5/103* (2013.01); *C04B 2111/27* (2013.01)
USPC .............................................. 524/313; 524/8

(58) Field of Classification Search
USPC ......................................................... 524/313
See application file for complete search history.

(56) References Cited

U.S. PATENT DOCUMENTS

| | | | | |
|---|---|---|---|---|
| 6,337,413 B1 * | 1/2002 | Kapila et al. | ................... | 554/163 |
| 7,572,852 B1 * | 8/2009 | Ware | .............................. | 524/297 |
| 2007/0287820 A1 * | 12/2007 | Weirich | ............................ | 528/1 |

OTHER PUBLICATIONS

Coates et al., Proceedings of Third North American Conference on the Design and Use of Self-Consolidating Concrete, Chicago, Ill., Nov. 10-12, 2008.*

* cited by examiner

*Primary Examiner* — Hui Chin
(74) *Attorney, Agent, or Firm* — Bose McKinney & Evans LLP

(57) ABSTRACT

A non-aqueous blend composition for treating a porous material comprising triacylglycerides obtained from vegetable oils and containing a fatty acid component and a polystyrene dissolved in the triacylglycerides to form a blend composition, the polystyrene component being present in the blend composition in an amount of from about 1% to about 40% by weight of the fatty acid component.

21 Claims, 44 Drawing Sheets

SOY METHYL ESTER POLYSTYRENE BLENDS FOR USE IN CONCRETE

RELATED APPLICATIONS

This application is a continuation of U.S. patent application Ser. No. 12/592,336, filed Nov. 23, 2009 now U.S. Pat. No. 8,129,459, which claims the benefit of U.S. Provisional Patent Application Ser. No. 61/116,946, filed Nov. 21, 2008, both of which are incorporated herein in their entireties.

STATEMENT OF GOVERNMENTAL RIGHTS

This invention was made in part with government support under grant reference number NA/IND010661 awarded by the United States Department of Agriculture ("USDA/CREES"). The Government therefore has certain rights in this invention.

TECHNICAL FIELD

The teachings of the present invention generally relate to hydrophobic treatment agents for porous materials, and more particularly to soy methyl ester polystyrene blends for use in treating concrete.

BACKGROUND OF THE INVENTION

Nearly all problems associated with the deterioration of concrete (e.g., chloride ion ingress and freeze-thaw damage) are related to the presence of moisture or the transport of fluid in the concrete's porous structure. Many methods have been used to reduce the ingress of fluid and to preserve the durability of concrete, such as improving mixture proportioning, designing special curing techniques or membrane coatings and using penetrating sealers and/or crack sealants. For example, linseed oil has been used as a penetrating sealer to reduce the absorption of moisture within pavement and other such infrastructure elements because of its hydrophobic properties. While these methods may be useful for improving the structural integrity of these infrastructure elements, many of these products are damaging to the environment, non-biodegradable, toxic, corrosive, and/or nonrenewable in nature. As such, it would be desirable to develop a material and associated methods of use which not only improve the structural integrity of a desired infrastructural element, but also are environmentally friendly, renewable, biodegradable, non-toxic and non-corrosive.

SUMMARY OF THE INVENTION

The present invention overcomes or ameliorates at least one of the prior art disadvantages discussed above or provides a useful alternative thereto by providing novel, and environmentally friendly, soy methyl ester polystyrene blends for use in concrete based materials.

According to one aspect of the present invention, a hydrophobic agent that can be used as a sealant for a porous surface is provided. The agent comprises fatty acid alkyl esters and polystyrene. In accordance with certain embodiments, the fatty acid alkyl ester is from an agricultural source. Moreover, the polystyrene component can be in a pure compound form or in a foam consistency. While not required herein, in accordance with certain specific embodiments, a plasticizer (such as dioctyl phthalate (DOP)) is optionally added to the hydrophobic agent.

According to another aspect of the present invention, the fatty acid alkyl esters serve as a vehicle on which the chains of polystyrene are dissolved and therefore can penetrate the porous surfaces to be treated. The blends are prepared by mixing the components, and mild heating can be used to speed up the dissolution of polystyrene if desired. In accordance with certain embodiments, the concentration of the blends ranges from about 1% to about 20% by weight of the polystyrene.

In accordance with certain embodiments, the hydrophobic agents are sprayed onto the porous surfaces. In accordance with specific aspects of this embodiment, a blend of less than 5% is used for certain spraying applications.

In accordance with yet other embodiments of the present invention, the hydrophobic agents are brushed onto the surface of the porous material.

According to one aspect of the present invention, a non-aqueous blend composition for treating a porous material is provided. In accordance with this embodiment, the blend composition comprises triacylglycerides obtained from vegetable oils and containing a fatty acid component and polystyrene dissolved in the triacylglycerides to form a blend composition, the polystyrene component being present in the blend composition in an amount of from about 1% to about 40% by weight of the fatty acid component.

According to yet another aspect of the present invention, a non-aqueous blend composition for treating a porous material is provided. In accordance with this embodiment, the blend composition comprises fatty acid alkyl esters obtained from vegetable oils and having 16 to 22 carbon atoms and polystyrene dissolved in the fatty acid alkyl esters to form a blend composition, the polystyrene being present in the blend composition in an amount of from about 1% to about 40% by weight of the fatty acid alkyl esters.

According to still another aspect of the present invention, a method of treating a porous material is provided. The method comprises providing fatty acid alkyl esters obtained from vegetable oils and having 16 to 22 carbon atoms; dissolving polystyrene in the fatty acid alkyl esters to form a blend composition, the polystyrene being present in the blend composition in an amount of from about 1% to about 40% by weight of the fatty acid alkyl esters; and applying the blend composition to a porous material.

Additional embodiments, aspects, and advantages of the present invention will be apparent from the following description.

DETAILED DESCRIPTION

Figure 1:
FIG. 1 shows a set-up depicting an exemplary process for creating soy methyl ester polystyrene blends in accordance with the teachings of the present invention.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is generally related to penetrating non-aqueous hydrophobic agents that include a bio-based material and polystyrene that can be used to protect surfaces of porous materials, such as concrete, wood, etc. As used herein, the term "non-aqueous" means substantially free from water. In accordance with certain aspects of the present invention, the agents are applied topically onto the porous surface to reduce and/or prevent water absorption and protect the treated surface from other environmental conditions. In accordance with still other aspects of the present invention, the agents are admixed with the porous material.

The hydrophobic agents of the present invention do not contain organic solvents and therefore do not present the typical emission problems seen with volatile organic compounds (VOCs). Moreover, these agents have fast curing times (since they do not contain water) and are basically from renewable bio-based materials.

Over the years, the industry associated with producing biodiesel has flourished as alternative energy sources are becoming more desirable. There are several sources available for the production for biodiesel including spent vegetable oil used by restaurants, as well as the unused oil from vegetables. Soybeans are one example of a renewable resource which can be used in the production of biodiesel. Soybean oil (a common product from feedstock used in the production of biodiesel) is composed of three fatty acid chains connected by a glycerol molecule. To create a biodiesel, the soybean oil is mixed with an alcohol (e.g., methanol) and a catalyst, such as sodium hydroxide. This process is called transesterification. First the catalyst aids the reaction by removing a hydrogen atom from the methanol molecules. This increases the reactive potential of the methanol, by creating a methoxide ion. Three of these ions then replace the triglycerin molecule which is attached to the fatty acid chains. This creates soy methyl-ester (SME) molecules which are collectively referred to as biodiesel or B100 (100% biodiesel). The triglycerin molecule separates, and attach to the free hydrogen atoms from the methoxide ion formation. This forms the byproduct of this process, glycerin, which is used in several common products including soap.

Soy methyl esters are a derivative of soybean oil, yet have a different chemical composition and structure after esterification, thereby leading to properties that differ from the original oil. These properties include high solvent capacity, altered surface tensions, and enhanced viscosities. All of these properties lead to a substance with unique potential for various applications within the concrete construction industry; however, such substances have not been historically utilized to modify the properties of cementious materials. As such, the present inventors have investigated the use of soy methyl-ester polystyrene (SME-PS) blends to determine any potential uses for such substances within the concrete construction industry, as well as to determine its effectiveness on concrete's fresh and hardened properties.

As should be understood and appreciated herein, soybeans are one example of a renewable resource which is commonly used in the production of biodiesel. SMEs are biodegradable, non-toxic, non-corrosive, renewable, hydrophobic materials. While the extracted oils have many potential uses, such as soap, cosmetics, surfactants, lubricants, paints and varnishes, solvents, resins and plastics, stabilizers, emulsifiers, pesticides, and fatty acids, these materials also show great potential for use in the construction industry. Specifically, soybean oil derivatives are hydrophobic and have the potential to repel water or reduce transport if used in wood or concrete.

Soy methyl esters are derived from soy oil and are composed of long chain fatty acids (14-20 carbons) which are esterified to a methyl group. Soybean oil is mixed with an alcohol (usually methanol) and an alkaline catalyst, such as sodium hydroxide. This process is called transesterification. The result of transesterification is fatty acid methyl ester (FAME) molecules.

Methyl esters are produced from plant triacylglycerides (oil) when they are mixed with an alkaline catalyst which causes transesterification with methanol. Each molecule of triacylglyceride reacted requires three (3) molecules of methanol, resulting in the production of three (3) molecules of methyl esters and one (1) molecule of glycerin. To create soy methyl esters, soybean oil is mixed with another alcohol, which is usually methanol, and a catalyst such as sodium hydroxide. First, the catalyst aids the reaction by removing a hydrogen atom from the methanol molecules. This increases the reactive potential of the methanol, by creating a methoxide ion. Three of these ions then replace the triglycerin molecule which is attached to the fatty acid chains. The triglycerin molecule separates, and attaches to the free hydrogen atoms from the methoxide ion formation. This forms the byproduct of this process, glycerin, which is used in several of the common products previously mentioned.

Illustrative SMEs in accordance with the teachings of the present invention and as discussed herein are composed of many types of fatty acids that have been bonded to a methanol ion. The composition of the fatty acid methyl esters within these illustrative SME are listed in Table 1A below, and specifically show the fatty acid methyl esters (FAMEs) by describing the number of carbon molecules on each fatty acid chain, as well as the number of double bonds present between carbon molecules. For example, "C18:2" denotes a fatty acid chain containing 18 carbon molecules, and 2 carbon double bonds, otherwise referred to as linoleic acid. Moreover, a profile by percent and by molecular weight of various illustrative SMEs that may be used in accordance with the teachings of the present invention is shown in Table 1B.

TABLE 1A

Fatty Acid Methyl Ester Composition Profile for SME Used

| Fatty Acid | % of FAMEs |
| --- | --- |
| C16:0 | 11.3% |
| C18:0 | 4.4% |
| C18:1 | 30.8% |
| C18:2 | 47.3% |
| C18:3 | 6.0% |
| C20:0 | 0.0% |
| C22:0 | 0.1% |

TABLE 1B

Typical SME profile

| Fatty Acid Name | Carbon Design | Formula and Structure | Molecular Weight (g/mole) | Melting Point (° C.) | Percent of SME by Weight |
| --- | --- | --- | --- | --- | --- |
| methyl palmitate | C16:0 | $C_{15}H_{31}CO_2CH_3$ | 270.5 | 30.5 | 10.3 |
| methyl stearate | C18:0 | $C_{17}H_{35}CO_2CH_3$ | 298.5 | 39.1 | 4.7 |

TABLE 1B-continued

Typical SME profile

| Fatty Acid Name | Carbon Design | Formula and Structure | Molecular Weight (g/mole) | Melting Point (° C.) | Percent of SME by Weight |
|---|---|---|---|---|---|
| methyl oleate | C18:1 | $C_{17}H_{33}CO_2CH_3$ | 296.5 | −19.8 | 22.5 |
| methyl linoleate | C18:2 | $CH_3(CH_2)_4CH=CHCH_2CH=CH(CH_2)_7CO_2CH_3$ | 294.5 | −34.9 | 54.1 |
| methyl linolenate | C18:3 | $CH_3(CH_2CH=CH)_3(CH_2)_7CO_2CH_3$ | 292.5 | −57.0 | 8.3 |

The percentage of FAMEs with carbon double bonds can also be used to quantify the amount of unsaturated fatty acids in the SME. In accordance with certain aspects of the present invention, the SMEs may contain 84.1% unsaturated fatty acids (FAMEs containing carbon double bonds) and 15.9% saturated fatty acids (no carbon double bonds).

While remaining biodegradable and non-toxic, the physical properties of the methyl esters are distinctly different than the triacylglyceride (soybean oil) since SME's are excellent solvents for many synthetic polymers unlike the original oil which is a very poor solvent for these materials. Since the SME is an excellent solvent, polystyrene and polyvinyl chloride can be dissolved in the SME to make a SME-polymer combination that enables the creation of blends with significantly different fluid properties. This enables the selection of blends that are best suited for desired applications. Furthermore, and as will be explained in detail below, the addition of polystyrene (PS) can lead to the deposition of polystyrene in the pores of the concrete when SME-PS blends are admixed in cementitious systems.

As mentioned above, SME has a high solvent capacity, and is therefore capable of "holding" dissolved compounds which can then change the physical properties of the SME. This enables the SME to be used as a carrier for other compounds, in particular, polymers. One such compound which can be readily added to SME in accordance with the teachings of the present invention is polystyrene (PS). To create the SME-PS blends, the polystyrene (which is a thermoplastic) is dissolved by heating the SME, and then the PS is mixed into the dissolved solution (see FIG. 1). As shown in FIG. 1, when added to the SME, the shape of the PS molecule in solution alters the fluid behavior of the SME-PS blends (i.e., the viscosity of the fluid is modified). More particularly, as PS is a long chain-like molecule which can entangle and hinder fluid flow of the SME, SME-PS blends with varying densities, viscosities, and surface tensions can be created in accordance with the teachings of the present invention. As will be explained in detail below, various exemplary blends were created by adding expanded polystyrene (plain Styrofoam cups) to the SME. The blends described herein are reported as the percent of PS by mass. For example, a 20% blend of SME-PS may be created by adding a mass of 20 grams of PS to 100 grams of SME (20% of the mass of SME), resulting in a concentration of 16.67% PS by mass of solution. Table 2 below shows a summary of some illustrative SME-PS blends created in accordance with the teachings of the present invention. Moreover, it should be understood and appreciated that the SME-PS blends described herein refer to the amount of PS added by mass of SME during the mixing process (not the actual PS concentration) unless noted otherwise.

TABLE 2

SME-PS Blend Proportions

| Blend Name | PS Added by Mass SME | Concentration of PS by Mass | Volume Fraction of PS |
|---|---|---|---|
| SME-0% PS | 0% | 0.00% | 0.00% |
| SME-1% PS | 1% | 0.99% | 0.94% |
| SME-5% PS | 5% | 4.76% | 4.55% |
| SME-10% PS | 10% | 9.09% | 8.70% |
| SME-20% PS | 20% | 16.67% | 16.00% |
| SME-40% PS | 40% | 28.57% | 27.59% |

The varying volume fractions of PS in accordance with the teachings of the present invention resulted in slightly different physical properties. For instance, Table 3 shows the specific gravities of each blend made. The increase in PS content results in an increased specific gravity of the blend. Polystyrene has a specific gravity of approximately 1.05 as compared to pure SME which has a specific gravity of 0.857.

TABLE 3

SME-PS Blend Specific Gravities

| SME Blend | % PS Content | Density g/mL | Specific Gravity, SG |
|---|---|---|---|
| Soy Methyl Ester | 0 | 0.8565 | 0.8825 |
| SME-1% PS | 1 | 0.8591 | 0.8850 |
| SME-5% PS | 5 | 0.8619 | 0.8880 |

TABLE 3-continued

SME-PS Blend Specific Gravities

| SME Blend | % PS Content | Density g/mL | Specific Gravity, SG |
|---|---|---|---|
| SME-10% PS | 10 | 0.8705 | 0.8969 |
| SME-20% PS | 20 | 0.8827 | 0.9094 |
| SME-40% PS | 40 | 0.9020 | 0.9293 |

The values of specific gravity in Table 3 were measured using a 30 mL pycnometer. It should be understood herein that the specific gravities of the solution can also be calculated using the SME and PS densities, but these values would not account for variations in materials or any gas entrapped in the blends from the mixing process. This gas is sometimes present in the mixtures from the dissolution of PS into the SME.

As previously mentioned, the PS used comes from expanded polystyrene (Styrofoam) cups, which release the gas contained in the expanded polystyrene as it dissolves. Due to the viscosity of the mixtures, the gas can sometimes remain suspended in the blends. The mean error between the measured and calculated specific gravities is 2.6%. While any form of PS can theoretically be used to create these blends, it is particularly advantageous to use waste or recycled polystyrene due to potential environmental benefits, reduced cost, and the abundance of recyclable materials. The source of the PS used, however, will impact the resulting SME-PS blends properties. In particular, the size of the PS molecules being introduced into these blends directly influences the viscosity of the SME-PS blend. Moreover, while not required herein, in accordance with certain specific embodiments, it should be understood and appreciated that a plasticizer (such as dioctyl phthalate (DOP)) can be optionally added to the hydrophobic agent if desired.

The viscosity of admixtures and topical additives has direct implications on fluid absorption, fresh paste properties, and ionic transport. To evaluate how the viscosity of SME-PS blends change as a function of mixture composition (i.e., polystyrene content) an Anton Paar MCR-301 rheometer utilizing vane geometry is used. A flow-curve was created for each SME-PS blend, and a Bingham fluid model was fit to the curves resulting in the corresponding viscosities of the blends.

Figure 2:
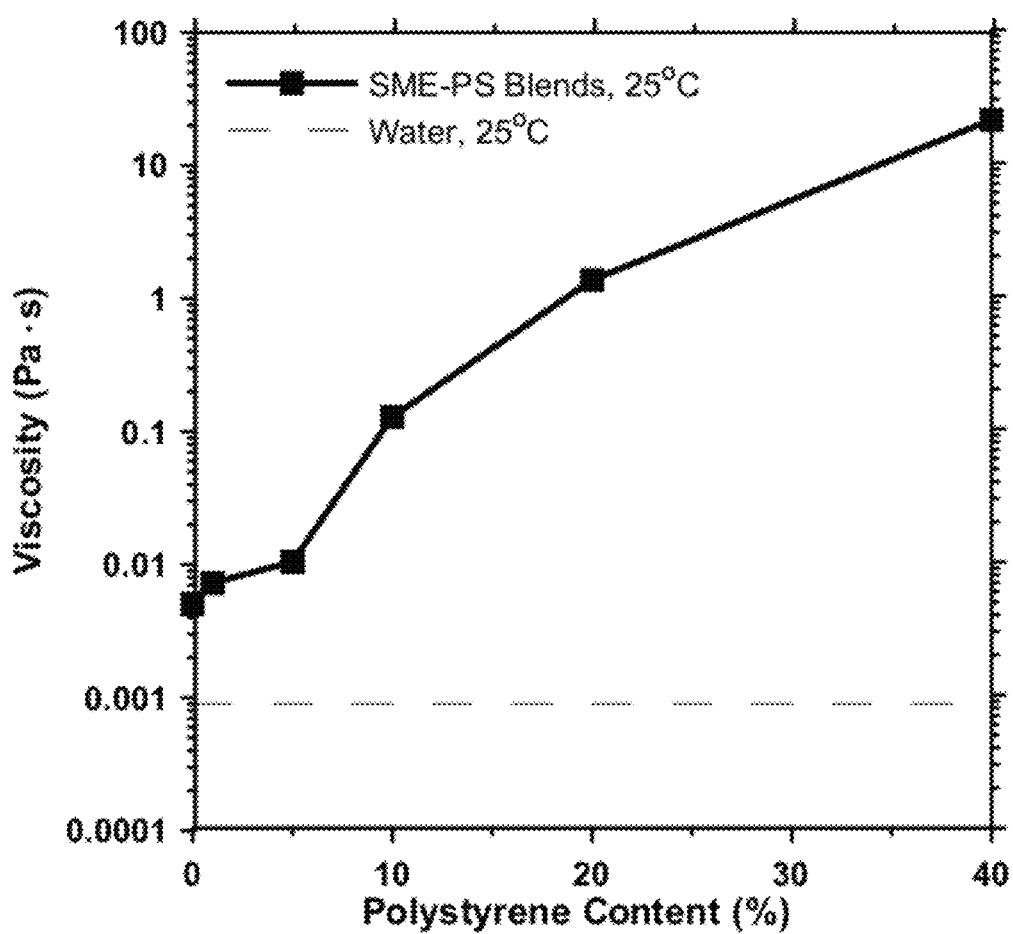
FIG. 2 shows the change in viscosity of soy methyl ester polystyrene blends with 0%, 1%, 5%, 10%, 20%, and 40% polystyrene added by mass of soy methyl ester at 25° C. in accordance with the teachings of the present invention.

FIG. 2 shows the change in viscosity of SME-PS with 0%, 1%, 5%, 10%, 20%, and 40% PS added by mass of SME at 25° C. It can be seen that the viscosity increases substantially as the PS content increases. The change in viscosity is likely due to the long chain-like shape of the PS molecule. During fluid movement, the long PS molecules entangle and hinder the flow of the liquid, which results in a viscous response.

As can be seen from FIG. 2, a substantial change in viscosity occurs between polystyrene contents of 5% and 10%. This critical content is believed to represent the polystyrene content at which the PS molecules begin to percolate in the SME-PS solution. An approximation of the critical percolation volume fraction can be made by using a Padé-type approximation for the percolation of ellipsoids of revolution. By defining the aspect ratio (L/D) of the molecules in solution, it is possible to calculate the critical volume fraction of the molecules required for percolation. To describe the aspect ratio of a polystyrene molecule, a range of values for molecular weights and lengths are used. The molecular weights of polystyrene in accordance with certain aspects of the present invention range from about 72,000 to about 1,500,000, which correspond to molecular lengths of about 20 nm to about 115 nm. Moreover, the shape of the PS molecules is assumed to be cylindrical in order to calculate the corresponding diameters required to describe the aspect ratio. An example of this calculation is shown below in Equation 1:

$$\left(\pi \frac{D^2}{4}\right)L = \frac{MW}{\rho * \text{Avagadros Number}} \quad [\text{Equation 1}]$$

where: MW=Molecular Weight of polystyrene molecule; L=Length of molecule (Angstroms); D=Diameter of assumed cylindrical molecule (Angstrom); L/D=Aspect ratio of molecule; Avagadros Number=$6.022 \times 10^{23}$; $\rho$=Density of polystyrene=1.05 grams/cm$^3$ (or $1.05 \times 10^{-24}$ g/Angstrom$^3$); P(x)=Padé-type approximant; and 1/P(x)=$P_c$=Critical percolation volume fraction.

Given the assumption of a polystyrene molecular weight and length (see Table 8), the corresponding critical percolation volume of that particular molecule can be calculated, wherein MW=290000 g/mol and L=441 Angstroms. Moreover, assuming a cylindrical shape, the volume of a polystyrene molecule can be calculated, based on an assumed density of 1.05 grams/cm$^3$ (or $1.05 \times 10^{-24}$ g/Angstrom$^3$).

$$\text{Volume} = \frac{MW}{\rho * \text{Avagadros Number}} \quad [\text{Equation 2}]$$

$$\text{Volume} = \frac{290000 \frac{g}{mol}}{(1.05 \times 10^{-24} g/\text{Å}^3)(6.022 \times 10^{23} \text{ molecules/mol})} \quad [\text{Equation 3}]$$

$$\text{Volume} = 458625 \text{ Å}^3/\text{molecule} \quad [\text{Equation 4}]$$

$$\text{Volume of cylinder} = \left(\pi \frac{D^2}{4}\right)L = 458625 \text{Å}^3/\text{molecule} \quad [\text{Equation 5}]$$

$$\left(\pi \frac{D^2}{4}\right)441 \text{ Å} = 458625 \text{Å}^3/\text{molecule} \quad [\text{Equation 6}]$$

$$D = 36.389 \text{ Å} \quad [\text{Equation 7}]$$

$$\frac{L}{D} = 12.119 \quad [\text{Equation 8}]$$

Substituting the calculated aspect ratio into the approximation, where x=L/D, and the values for the constants are given as follows:
h=7.742
f=14.61
g=12.33
c=1.763
d=1.658
s=9.875

$$p(x) = \frac{h + fx + gx^{\frac{3}{2}} + cx^2 + dx^3}{sx + x^2} \quad [\text{Equation 9}]$$

$$P(x) = 14.6883 \quad [\text{Equation 10}]$$

$$1/P(x) = P_c = 0.0681 = 6.8\% \quad [\text{Equation 11}]$$

Figure 3:
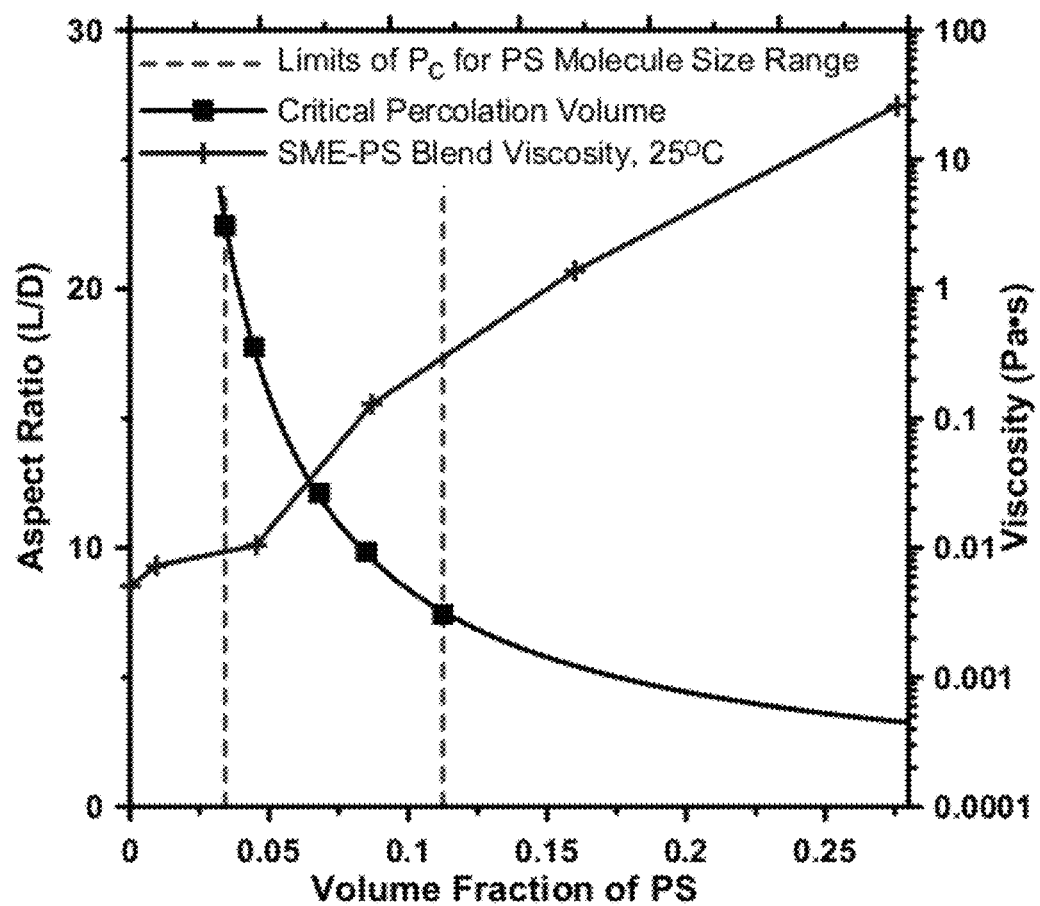
FIG. 3 shows a graphical representation of critical percolation volumes for polystyrene.

The resulting value for 1/P(x) is equal to the critical percolation volume fraction of the polystyrene molecule. In this case, the critical percolation volume fraction is approximately 6.8%. FIG. 3 shows the results from the Padé-type approximation for several calculated aspect ratios. The resulting values of the critical percolation volume fraction ($P_c$) range from 3.4% for an L/D of 7.41 and 11.2% for an L/D of 22.55. These values correspond to SME-PS blends with 3.9% and 12.8% polystyrene added by mass of SME. These values correlate well with the range at which the measured viscosity increases dramatically (between 5% and 10% PS added by mass of SME). This can also be seen in FIG. 3, which shows the dramatic viscosity change occurring at a polystyrene content within the limits defined by the dotted lines. The approximation confirms that the entanglement of PS due to molecule percolation may be a main factor in the modification of the SME-PS blend viscosities.

It should also be noted that the viscosity of the SME-PS blends are temperature sensitive. The ability to alter and predict the viscosity of SME-PS blends enables it to be tailored for specific uses, applications, or application temperatures. As will be discussed in more detail below, the rate of penetration of SME-PS blends into porous material (i.e. hydrated cement paste) is impacted significantly by the viscosity of the blends.

Figure 4:
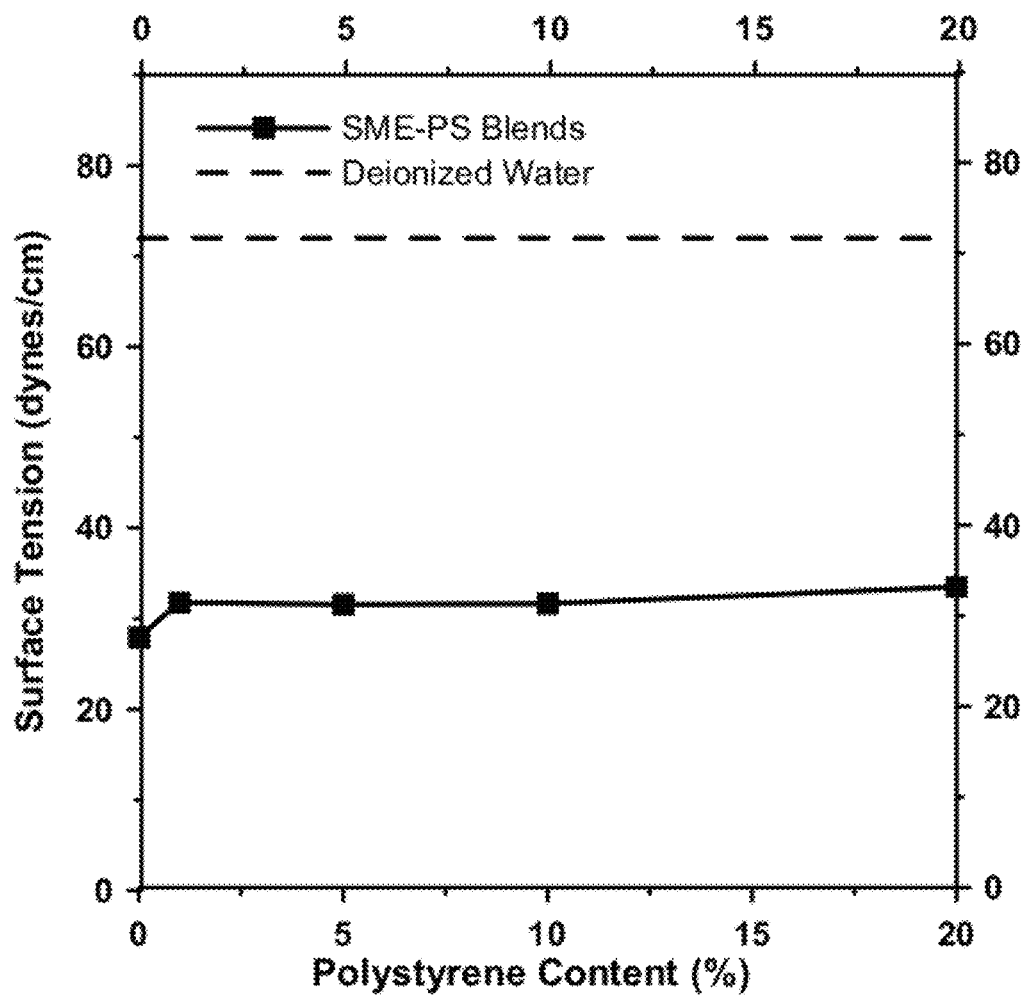
FIG. 4 shows a graphical representation of the surface tension of soy methyl ester polystyrene blends.

Surface tension of the SME-PS blends has been measured against air (at the free surface) using a Du Nouy tensiometer. The SME has a surface tension of 27.9 dynes/cm at 25° C., and this value increases slightly with the addition of polystyrene. Although the blends of SME-PS are immiscible in water, they can still have an effect when in contact with water, as the interfacial tension may affect the response of the fluid system. FIG. 4 shows the measured surface tension for SME-PS blends. The SME is a primary factor in determining the surface tension values as PS content had little effect on the values.

As is generally known, SME is non-carcinogenic, non-corrosive, renewable, and has a high solvent capacity. Because of these attributes, the present inventors have determined that it makes a good potential choice for the base of a concrete admixture. One factor that should be considered when using the SME-PS blends is the relatively low oxidation stability of SME, particularly as this stability decreases significantly at elevated temperatures.

The oxidation stability of SME is related to the amount of unsaturated fatty acid methyl esters of which it is composed. The Oil Stability Index (OSI), which typically is measured using the Rancimat test, heats a certain volume of SME to 110° C. while air is circulated through at a specified flow rate. The air circulating through the SME will transport the secondary oxidation reaction products to a water bath. As the reaction products begin to become more concentrated in the water bath, the conductivity of the water changes thus signifying that oxidation has begun in the SME. The amount of time for this process to take place is referred to as the induction time. Typical SME blends that are utilized for biodiesel purposes can be subjected to the extreme conditions of the rancimat test for several hours without forming the organic acid oxidation products. B100 biodiesel refined in the U.S. is required to have a minimum three-hour induction time.

The requirements imposed on the induction time of SME being produced for biodiesel implies that SME blends used for the purposes of creating SME-PS blends would have induction times that would be sufficiently long under normal temperatures and standard storage conditions. However, the oxidation process of SME-PS blends still occurs at very slow rates under normal conditions, and can impact the shelf life of the blends. Also, additional compounds in the SME blends, such as PS, slowly drop out of solution over time. This is most likely due to the natural polymerization process of the SME, which can only be rectified by reheating the SME. These issues could cause some practical problems with SME being used commercially as it must be used within a certain amount of time of being produced.

Although the oxidation process cannot be reversed for SME-PS blends, the oxidation process can be prevented by the addition of antioxidants, as well as the implementation of proper storage methods. Additionally, in the event that a blend begins to exhibit precipitation of PS from solution, reheating the mixture will often reverse some of the polymerization of SMEs and aid in the dissolution of PS again. Further investigation into chemical modification of SME may be possible to increase both oxidation and temperature stabilities.

Low temperatures can also create practical problems related to the use of SME-PS blends in the concrete industry. SME-PS blends may not be able to be utilized in very cold conditions as the viscosities of the blends are very sensitive to temperature, which may create difficulties in trying to dispense or atomize the blends.

It has been shown that certain metals, such as copper, can act as a catalyst in the process of oxidation, whereas other metals, such as steel, are compatible and do not accelerate oxidation. In the case that SME-PS blends were to be used in a system of reinforced concrete, the reinforcing steel would not affect the rate of polymerization. More importantly, as stated earlier, SME is non-corrosive, and therefore, would not be expected to accelerate corrosion of reinforcing steel.

Although it has also been found that steel does not have an impact on the rate of oxidation of SME, it should be noted that the rate of polymerization of SME can be impacted by the presence of alkalis. Because cementitious mixtures develop pore solutions of high alkalinity during the hydration process, any SME present inside a hydrating cementitious system may undergo accelerated polymerization. The rate of this polymerization, as well as its impact on the properties of the SME, is still under investigation. However, if there is an accelerated polymerization of SME when admixed or applied topically to concrete, it is believed that the process will most likely act as a catalyst to gelate the SME, and could reduce the potential for leaching and wash-out of the SME-PS blends. As a result, oxidation of SME-PS after application may be helpful.

To avoid high levels of oxidation, the SME-PS blends of the present invention should be stored properly and used within a sufficient time, particularly if they will be utilized as an admixture in industry. If not stored properly or used in a sufficient amount of time, the blends may become less homogenous as PS precipitates from solution. The effects of oxidation, as well as low temperature, can both contribute to problems in dispensing SME-PS blends, especially in applications where atomization is required (such as a topical spray application).

Advantages and improvements of the processes and methods of the present invention are discussed in detail below and demonstrated in the following exemplary examples. These examples are illustrative only and are not intended to limit or preclude other embodiments of the invention.

Example 1

A 1% blend of polystyrene in soy methyl esters was prepared and applied over the surface of a porous concrete specimen (4-inch diameter, 2-inch width). The sealing material was applied at a coverage area between 40-50 cm2/g. The sides of the specimen were sealed with epoxy resin and the treated surface was soaked with 2 inches of water. The water absorption was then measured at regular intervals and the results were compared to an untreated sample. The water absorption after 12 days was as follows:

| Area coverage (cm2/g) | Water Absorption (%) |
|---|---|
| 49 | 0.70 |
| 40 | 0.94 |
| 0 (control) | 7.03 |

The results indicate a reduction of water absorption of approximately 87-90%.

Example 2

A 5% blend of polystyrene in soy methyl esters was prepared and applied over the surface of a porous concrete specimen (4-inch diameter, 2-inch width). The sealing material was applied at a coverage area between 20-30 cm2/g. The sides of the specimen were sealed with epoxy resin and the treated surface was soaked with 2 inches of water. The water absorption was then measured at regular intervals and the results were compared to an untreated sample. The water absorption after 12 days was as follows:

| Area coverage (cm2/g) | Water Absorption (%) |
|---|---|
| 28 | 0.70 |
| 19 | 0.99 |
| 0 (control) | 7.03 |

The results indicate a reduction of water absorption of approximately 86-90%.

Example 3

A 10% blend of polystyrene in soy methyl esters was prepared and applied over the surface of a porous concrete specimen (4-inch diameter, 2-inch width). The sealing material was applied at a coverage area of around 40 cm2/g. The sides of the specimen were sealed with epoxy resin and the treated surface was soaked with 2 inches of water. The water absorption was then measured at regular intervals and the results were compared to an untreated sample. The water absorption after 12 days was as follows:

| Area coverage (cm2/g) | Water Absorption (%) |
|---|---|
| 41 | 0.56 |
| 39 | 0.71 |
| 0 (control) | 7.03 |

The results indicate a reduction of water absorption of approximately 90-92%.

Further advantages and improvements of the processes and methods of the present invention are discussed in detail below and demonstrated in the following exemplary examples. These examples are illustrative only and are not intended to limit or preclude other embodiments of the invention. Moreover, unless noted otherwise, the following materials were used for all experiments described in the remaining exemplary examples.

ASTM C150 Type I ordinary portland cement, having a Blaine fineness of 370 m²/kg. An estimated Bogue composition of 56% $C_3S$, 16% $C_2S$, 12% $C_3A$, 7% $C_4AF$ and a $Na_2O$ equivalent of 0.68%, all by mass fraction.

Graded fine aggregate, with a specific gravity of 2.58, an absorption of 1.8%, and a fineness modulus (FM) of 2.72. Gradation for this aggregate can be found in Table 4.

Mix water was acquired from a regular tap water source and conditioned to 23° C.±0.5° C. before use.

TABLE 4

Fine Aggregate Gradation

| Sieve Size | Sieve Size (mm) | Retained (g) | % Retained | % Passing |
|---|---|---|---|---|
| 4 | 4.76 | 2.1 | 0.6 | 99.4 |
| 8 | 2.36 | 21.2 | 5.6 | 93.8 |
| 16 | 1.18 | 83.3 | 22.0 | 71.8 |
| 30 | 0.6 | 103.5 | 27.4 | 44.4 |
| 50 | 0.3 | 105.0 | 27.8 | 16.7 |
| 100 | 0.15 | 54.9 | 14.5 | 2.1 |
| Pan | — | 8.1 | 2.1 | 0.0 |

The following mixing methods apply for the mixtures made in accordance with the illustrative examples included herein, unless it is noted otherwise. All mixing was conducted according to the ASTM C305-99, "Mechanical Mixing of Hydraulic Cement Pastes and Mortars of Plastic Consistency." If a SME-PS blend was being utilized as an admixture, the blend was dispensed after all other constituents of the mixture were already incorporated into the mixture. The reason for delaying the introduction of SME-PS into the mixtures was to avoid premature interaction with dry cement powder. Immediately after the final component had been added and allowed to disperse, the SME-PS blend would be dispensed using a syringe. Because SME-PS blends tend to coat the containers they are placed in, the use of a syringe is required to ensure the correct amount of SME-PS is dispensed into the mixture. This occurred before the final stage of mixing, ensuring the best dispersion of the blends within the mixture.

Figure 5:
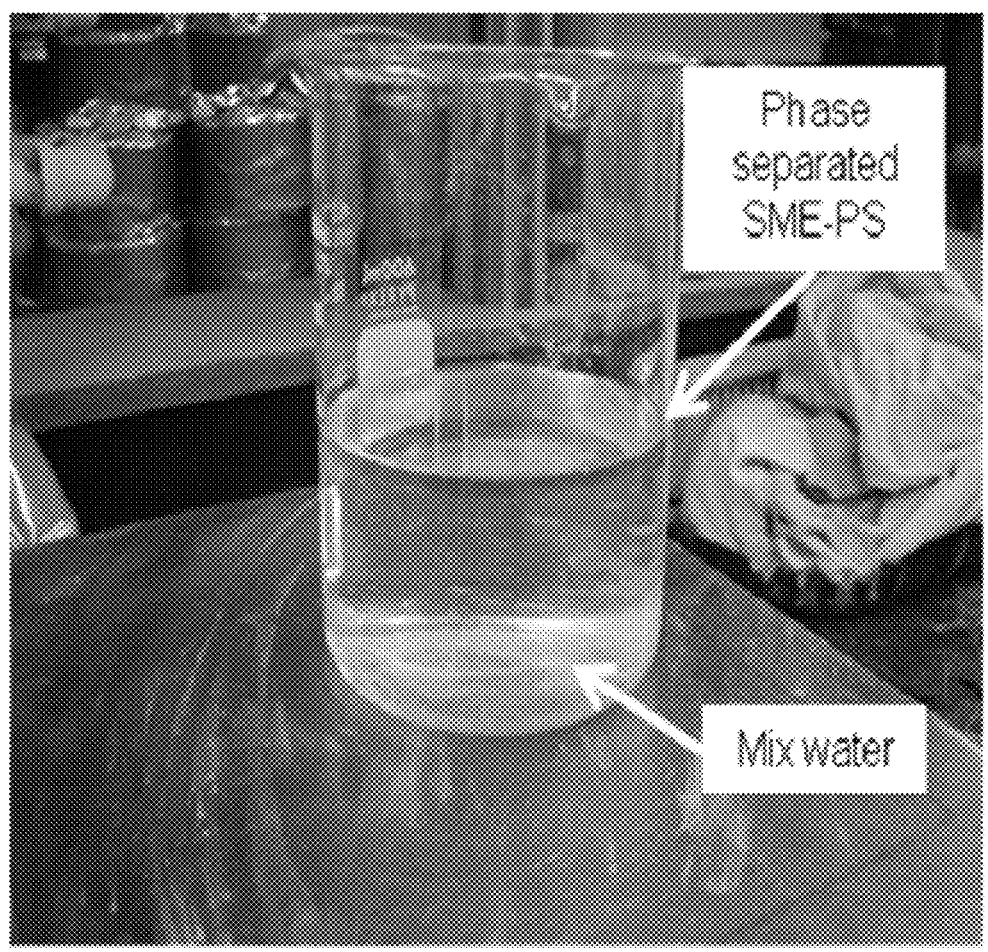
FIG. 5 shows a set-up depicting the phase separation of soy methyl ester polystyrene blends in water in accordance with the present invention.

SME-PS blends are hydrophobic solutions which present a practical problem in mixing. Many commercial admixtures can be added directly to the mix water when dispensed to ensure uniform dispersion of the admixture. Since SME-PS blends phase separate quickly when added to water, as shown in FIG. 5, another method of dispersion is required.

It has been observed that if SME-PS blends are allowed to contact dry constituent materials (i.e., unhydrated cement, fine aggregate, etc.) before they come into contact with the mix water, the particles will coat with SME-PS and will tend to agglomerate throughout the mixing process. These flocculations cannot be deflocculated unless subjected to high shear rates while mixing.

Figure 6:
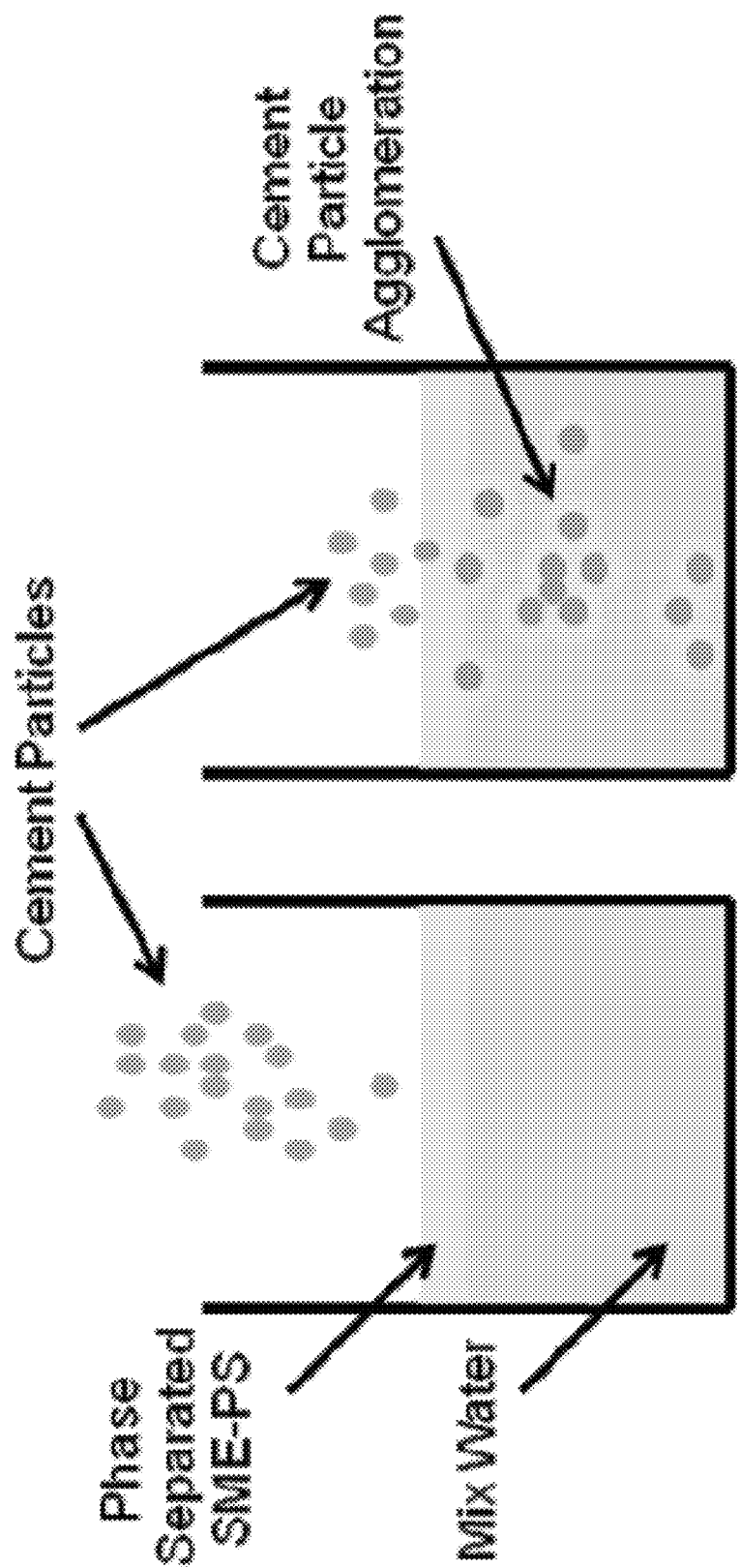
FIG. 6 shows cement particle agglomeration when soy methyl ester polystyrene blends are dispensed in water before mixing.

FIG. 6 shows conceptually what happens when cement is added to a beaker containing the mix water and the phase separated SME-PS. When cement is added to mix water with SME-PS already phase separated, the cement will first come into contact with the SME-PS. The cement particles will then travel through the layer of SME-PS before coming into contact with mix water.

By traveling through the layer of SME-PS first, the cement particles can become coated with SME-PS. Once absorbed onto the surface of the cement, the SME-PS will only separate from the surface under high shear rates. Under normal mixing speeds, the SME-PS coated particles that come into contact with each other tend to create larger agglomerations. This is due to the fact that individual globules of hydrophobic SME-PS in water will want to merge when they meet.

To avoid this condition of particle agglomeration, the addition of SME-PS blends into cementitious mixtures is delayed until all the other constituent materials have been added to the mixture in accordance with ASTM C305, the standard of mixing for hydraulic cement pastes. By allowing the surface of the cement and aggregate particles in the mixture to come into contact with water before the addition of SME-PS, it is found that large particle agglomerations do not form, resulting in more homogenous mixtures.

Several mixture designs were utilized while performing the experimental procedures of the present invention. The mixture proportions were varied to allow comparison with previously acquired data, and/or to provide a mixture tailored to a particular experiment. Table 5 summarizes the mixture proportions used for each experiment type.

TABLE 5

Mixture Proportions Used During Experimental Program

| Experiment | w/c | FA Vol. | CA Vol. | SME-PS Dose* |
|---|---|---|---|---|
| Compressive Strength | 0.50 | 62.6% | 0% | 1.25% |
| Shrinkage | 0.50 | 62.6% | 0% | 1.25% |
| Set Time, Vicat | 0.50 | 0% | 0% | 2.50%, 1.25% |
| Set Time, Hydration Temperature | 0.30 | 0% | 0% | 1.50% |
| Hardened Air Content | 0.42 | 55% | 0% | 2.50% |
| Evaporation | 0.42 | 55% | 0% | 1.50% |
| Cement Paste Viscosity | 0.30 | 0% | 0% | 0.14%, 0.27%, 0.54%, 0.81% |
| Water Absorption | 0.42 | 55% | 0% | 2.50% |
| Chloride Ponding | 0.42 | 55% | 0% | 2.50% |

*Note:
SME Dosage is measured by weight of cement in mixture

Each of the aforementioned parameters used to describe each mixture design can be described as follows:
Water-to-cement ratio (w/c): The w/c is the mass ratio of mix water to cement powder used. The range of w/c used in experimentation is from 0.30 to 0.50.
Fine aggregate volume fraction (FA Vol): The volume fraction of all mixture constituents that is composed of fine aggregate (sand).
Coarse aggregate volume fraction (CA Vol): The volume fraction of all mixture constituents that is composed of coarse aggregate.
Dosage rate for SME-PS blends (SME Dose): The amount of a given SME-PS blend that is admixed to a cementitious mixture. This dosage is described as a percent of the mass of cement used in the mixture.

Initial consideration of SME-PS blend properties implicated the potential for it to be utilized as a shrinkage reducing admixture. This is due to the low surface and interfacial tension of SME-PS. A typical dose of shrinkage reducing admixture is around 5.00% by weight of water. For a water to cement ratio of 0.50, this equates to a dose of 2.50% by weight of cement. This established a dose that would be used in many of the experiments, as described in Table 5. Additionally, in the interest of investigating the effect of dosage rates, dosages of 1.25% by weight of cement were also utilized frequently. It should be noted that the investigation of SME-PS blends used as a viscosity modifying admixture were dosed differently since the results of viscosity modification were being directly compared to a commercial viscosity modifying admixture.

As with any new material being tested for use in industry, there is always concern regarding the impact of these new materials on the environment if used improperly or if accidently introduced into the surrounding environment. To this end, one area considered with respect to the present invention was the potential leaching of the SME-PS blends over time. More particularly, when SME-PS blends are applied to a cementitious system in its hardened or fresh state, there is the possibility that some of the SME-PS blend may leach out of the material after it is in place, allowing it to be carried away by run-off from storm water. This could lead to the contamination of the surrounding environment with non-biodegradable polystyrene if it is included in the blend utilized.

Before SME-PS blends can be used in cementitious materials for any purpose, the effect of adding these blends to a cementitious mixture should be investigated. To this end, it is important to determine if the presence of SME-PS blends have any influence on the hardened properties of the concrete. As such, compressive strength and free shrinkage of cementitious samples were assessed in accordance with the present invention.

Figure 7:
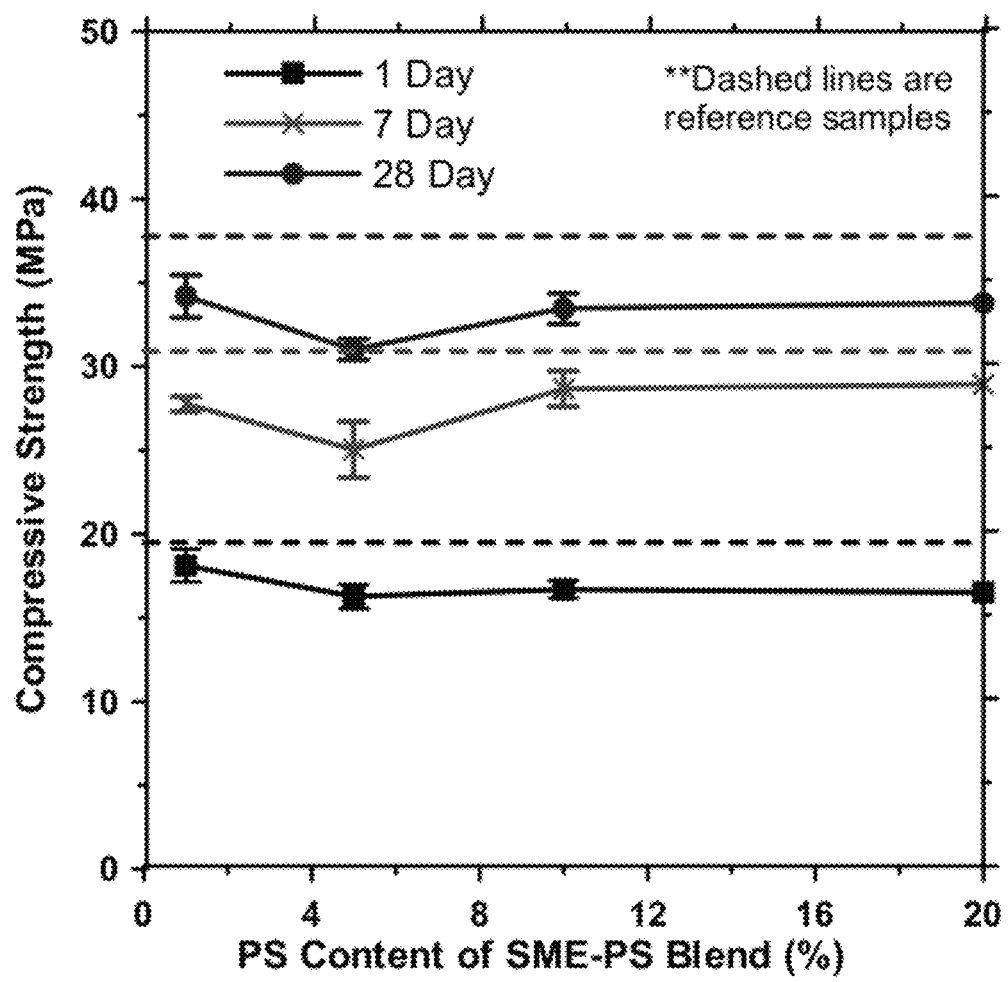
FIG. 7 shows the results of the compressive strength for the soy methyl ester polystyrene blends tested at 1, 7, and 28 days after casting.

Compressive strength tests were performed following ASTM C39. More particularly, five (5) mortars were prepared according to the mixture design in Table 5 using the SME-PS blends described in Table 6, which in turn illustrates a matrix of the testing program that was used for examining SME-PS blends in both topical and admixed applications. The mortars were mixed according to the standard ASTM mixing procedures discussed above, and were allowed to cure for 24 hours in the cylinder molds under wet burlap. After 24 hours the specimens were demolded, and placed in a moist curing chamber. Nine (9) mortar samples were created from each mortar mix. Compressive strength was determined at each age from the average of three 4-inch×8-inch cylinders. A reference sample set was created using the mortar mixture without any SME-PS added. FIG. 7 shows the results of the compressive strength for the SME-PS blends tested at 1, 7, and 28 days after casting. The samples containing SME-PS were dosed at 1.25% SME-PS by weight of cement. The samples containing the admixed SME-PS blends showed slightly lower average strength than the plain samples. The most dramatic reduction in strength measured was 18% which was seen for the SME-5% PS blend at 28 days. The error bars represent one standard deviation of the data for that day of testing. Although the addition of SME-PS does not detrimental impact the strengths achieved, there is a noted reduction in the compressive strength achieved.

TABLE 6

| Property | Test Method | Description | SME-PS Blends Tested |
|---|---|---|---|
| SME-PS Blend Properties ||||
| Viscosity | Anton Paar, MCR301 Rheometer | SME-PS Blends Only | SME-0% PS SME-1% PS SME-5% PS |
| Surface and Interfacial Tension | Du Nouy (Tensiometer) ASTM C971 | | SME-10% PS SME-20% PS SME-40% PS |
| Fresh Properties ||||
| Set Time | Vicat Needle, ASTM C191 | Admixed | SME-1% PS SME-5% PS SME-10% PS |
| | Thermo-Couple Temperature Profiles | Admixed | SME-1% PS SME-10% PS SME-20% PS |
| Evaporation Rate (Fresh mortar water loss) | Environmental chamber at 23° C., 50% RH | Topical, Admixed | SME-5% PS |
| Rheology | Anton Paar, MCR301 Rheometer | Admixed | SME-40% PS |
| Transport Properties ||||
| SME Absorption | X-Ray Measurements | Topical | SME-5% PS |
| Water Absorption | X-Ray Measurements | Topical | SME-5% PS |
| | ASTM C1585 Sorption Test | Admixed | SME-0% PS SME-1% PS SME-5% PS |

TABLE 6-continued

| Property | Test Method | Description | SME-PS Blends Tested |
|---|---|---|---|
| | Ponding test | Topical | SME-10% PS<br>SME-20% PS<br>SME-1% PS<br>SME-5% PS<br>SME-10% PS |
| Chloride Ion Penetration | Ponding Test | Admixed | SME-0% PS<br>SME-1% PS<br>SME-5% PS<br>SME-10% PS<br>SME-20% PS |
| Mechanical/Hardened Properties | | | |
| Compressive Strength | ASTM C39 | Admixed | SME-1% PS<br>SME-5% PS<br>SME-10% PS<br>SME-20% PS |
| Shrinkage | ASTM C157 | Admixed | SME-1% PS<br>SME-5% PS<br>SME-10% PS<br>SME-20% PS |
| Hardened Air Content | Hardened Sample Air Void Image Analysis | Admixed | SME-0% PS<br>SME-1% PS<br>SME-5% PS<br>SME-10% PS<br>SME-20% PS |

**All tests compared to a plain mortar or paste reference sample

Note that for the specimens containing the SME-5% PS blend, the lowest strength value occurs for all ages tested, and also had the largest standard deviation amongst samples at 7 days (Standard Deviation=1.7 MPa). While the specific reason for this trend is unknown, the reductions in strength appear to be affected by the polystyrene content. In any event, the relationship between the reduction in strength and the PS content is non-linear. The reductions observed during this experiment are believed to be due to three factors. First, and as is discussed in greater detail below, the addition of SME-PS blends to a cementitious system can significantly reduce water absorption of the system. Because the specimens were allowed to cure in a moist curing room until tested, the reference samples which did not contain SME-PS blends were free to absorb additional water to continue the process of hydration resulting in a stronger cementitious structure. The effect of this additional water absorption on the strength gain becomes more prominent with specimens that have been cured for long periods of time. Second, the reduced surface tension of the system could result in lower strength gains. Third, the addition of an immiscible liquid, such as SME-PS blends, may lead to agglomerations of SME-PS blends within the fresh cementitious mixtures. These agglomerations can result in additional voids after hardening of the cement. These additional voids may have contributed to the strength reductions observed.

Figure 8:
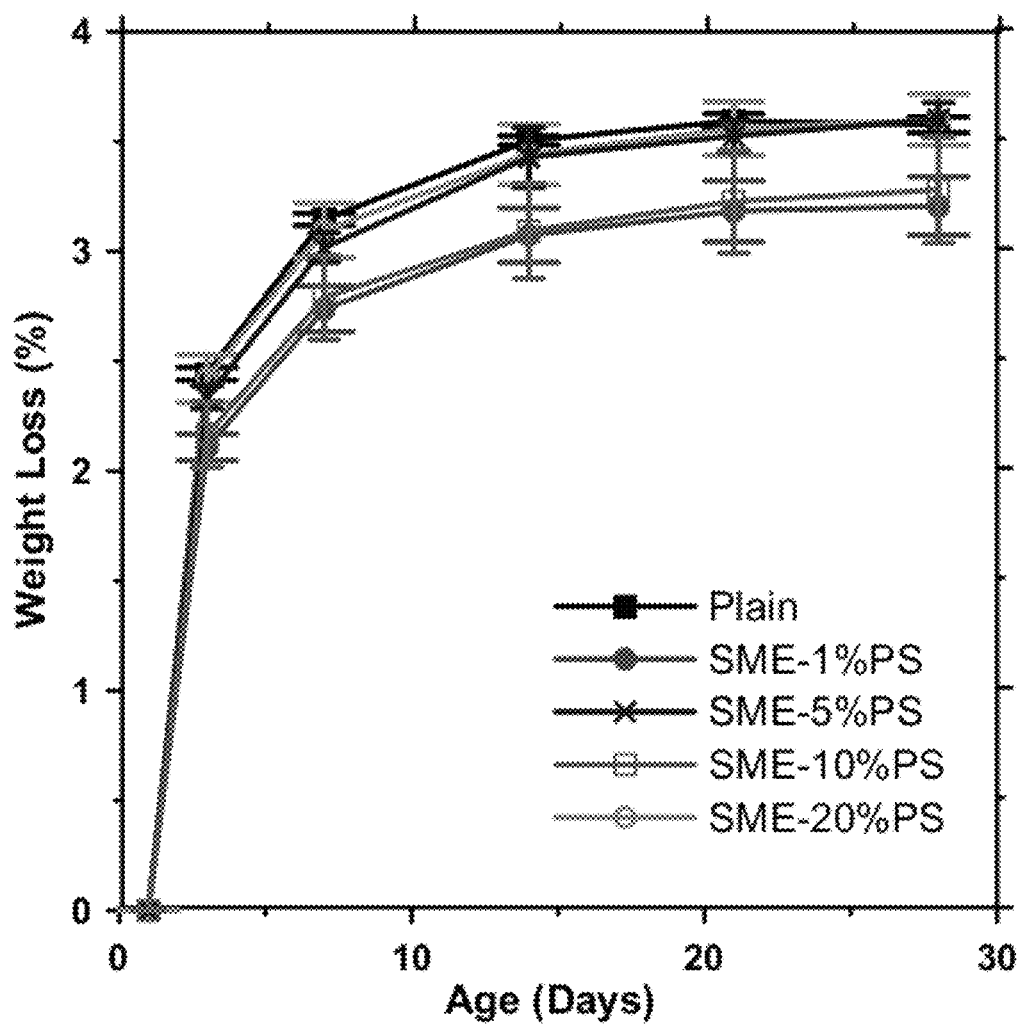
FIG. 8 shows the mass loss of mortar samples admixed with soy methyl ester polystyrene blends at 2.50% by weight of cement.
Figure 9:
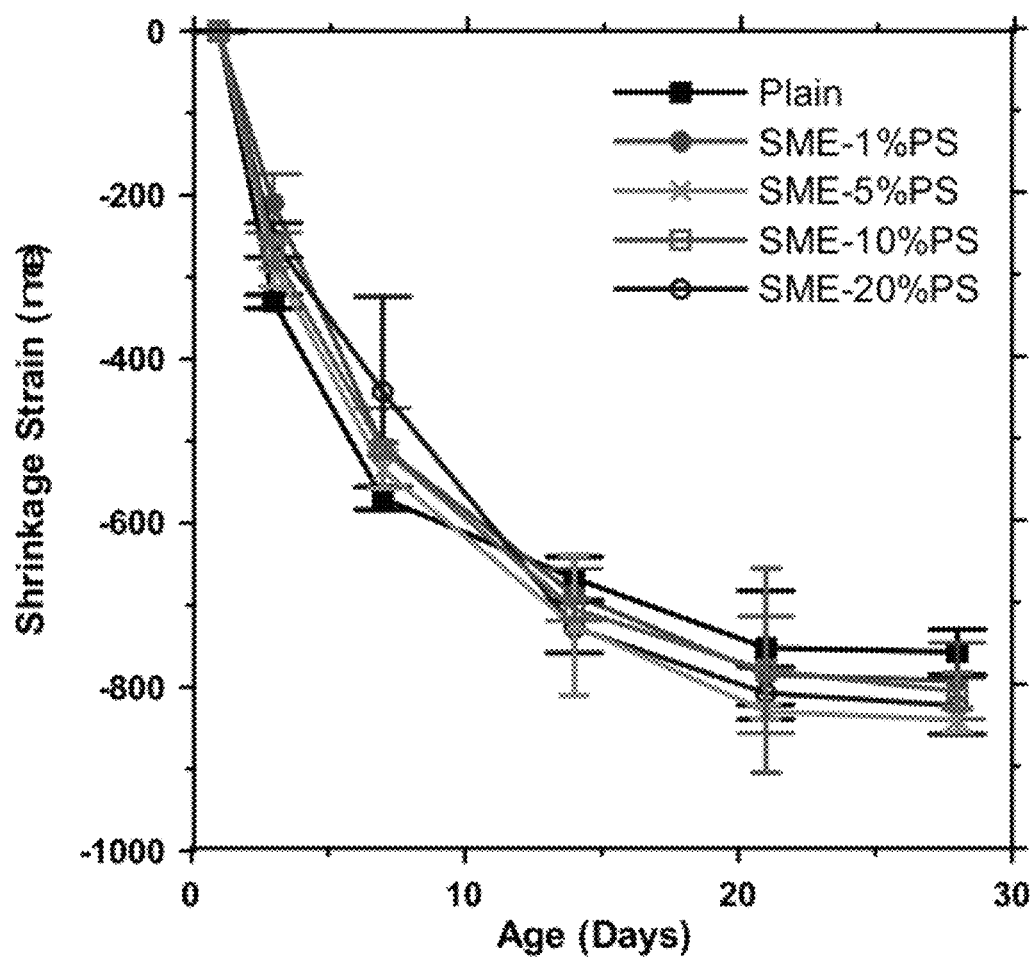
FIG. 9 shows measured drying shrinkage strains of mortar samples admixed with soy methyl ester polystyrene blends at 2.50% by weight of cement.

Drying shrinkage measurements were conducted according to ASTM C157. Four (4) 1-inch×1-inch×11¼ inch mortar samples were made using five (5) different mortar mixtures, four (4) of which contained a different blend of the SME-PS (see Table 6), and then placed into an environmental chamber at 23° C.±0.5° C. and 50%±1% RH relative humidity. Four (4) shrinkage specimens were created for each unique mortar mixture. The shrinkage strains and mass loss over 28 days were measured. The shrinkage samples made with the SME-PS blends exhibited less mass loss than the plain samples, as shown in FIG. 8. At 28 days, the mass loss due to drying for the blends containing SME-1% PS was approximately 10% less than the plain samples. However, this difference corresponds to an approximate reduction in mass loss of less than 1% the sample weight. The standard deviation in mass loss measurements was 0.04% for plain samples, and 0.14% for samples containing admixed SME-PS blends. The shrinkage strain measurements had an average standard deviation of 28 μs for plain samples, and 30 μs for all samples containing admixed SME-PS blends. The results of these tests indicated that there was no significant effect on the shrinkage of cementitious materials. FIG. 9 shows a small difference in shrinkage strain values throughout the 28 day test. The average difference in shrinkage at 28 days was approximately 8%, with the samples containing SME-PS blends exhibiting greater shrinkage.

As mentioned previously, SME-PS blends may form agglomerations of SME-PS when added to a cementitious mixture because they are hydrophobic and immiscible. These agglomerations are believed to be large relative to many of the pores in a typical hydrated cement paste. The large size of SME-PS agglomerations does not allow the SME-PS to be effective in reduce the surface tension of the smaller pores present in hydrated cement pastes. This implies that the high capillary stresses which develop in these small pores due to water loss are not reduced. Hence, there is no reduction in the shrinkage strains that develop in the system after 28 days.

Many durability problems in concrete are caused by the transport of water or fluid containing aggressive ions. As a result, many seek to reduce the absorption and flow of fluids in concrete through the use of admixtures or topical sealants that refine or block pores. As will be described in detail herein, the present inventors have evaluated the potential use of soy methyl ester-polystyrene blends (SME-PS) as an admixture to reduce the fluid absorption of cementitious systems. Dramatic reductions in fluid absorption can be obtained with SME-PS, with little negative influence on set time, strength, or shrinkage.

Several methods have been used to explore the effects of SME-PS on fluid transport in cementitious systems. Tests included the use of SME as both an admixed material and topical applications. To quantify changes in the transport properties of samples containing SME-PS blends, a standard water absorption test was performed, as well as a chloride solution ponding test. The water absorption test, described by ASTM C1585 is used to define the rate of water absorption of cementitious samples. Additionally, chloride ion penetration tests were conducted to investigate the effects of SME-PS blends on chloride ion mobility.

It is hypothesized that SME-PS blends can have a large impact on the rate of water absorption in cementitious specimens. It is speculated that the decrease in the rate of water absorption is thought to be due to the presence of the SME inside the pores of the concrete which inhibit absorption of water through capillary uptake. Because SME-PS blends are hydrophobic and have low surface tension, the presence of these blends in the pore of a cementitious system may not allow water to absorb fully onto the pore walls, inhibiting the capillary action which normally occurs. Sorption tests were conducted in accordance with ASTM C1585, "Measurement of Rate of Absorption of Water by Hydraulic-Cement Concretes." Two separate tests were conducted, one with samples conditioned as specified in ASTM C1585, and one with samples conditioned to a lower relative humidity (50% RH) than specified in the ASTM C1585 standard.

The first set of sorption samples tested was prepared as specified in ASTM C1585. The samples were created using a mortar, with a water-to-cement ratio of 0.42, a fine aggregate volume of 55%. For samples containing SME-PS blends, the blends were added at 2.5% by weight of cement. The mortar was cast into 4-inch diameter cylinders that are eight (8)

inches tall. The mortar specimen was sealed in the cylinder and then allowed to cure for 24 hours under wet burlap. After 24 hours, the specimen was demolded and then saw-cut into 2-inch (25 mm) thick slices. The samples were weighed and sealed with aluminum tape around their circumference, weighed again, and then allowed to air dry 3 days at 23° C.±0.5° C. and 50%±1% RH because of the additional water introduced into the sample during cutting. The samples were then weighed again after the 3 day air drying period, and then placed into a dessicator containing a solution of potassium bromide, designed to maintain a relative humidity inside the dessicator. The dessicator was then placed into an oven at 50° C. for 3 days. After this period the samples were then removed from the dessicator, weighed, and placed into a plastic container for 15 days so that the internal RH could equilibrate throughout the vertical profile of the sample. At the end of the 15 days, the samples were covered on the top surface by a sheet of plastic which was attached with tape. The purpose of this was to reduce the influence of drying of the sample over the course of this experiment. Finally, the samples were ready for testing. This process was used to prepare the sample by bringing the relative humidity of the samples into the range of 50%-70% RH.

The results from this set of samples indicate that there is a large reduction in the water absorbed by samples containing SME-PS blends. This reduction can be clearly seen in FIG. 10. After eight (8) days of testing, the samples containing SME-PS blends had absorbed an average of 76.6% less water than the samples not containing SME-PS (herein referred to as "plain samples"). This decrease illustrates the impact these blends can have on the absorption and transport of fluid in a cementitious system.

Figure 11:
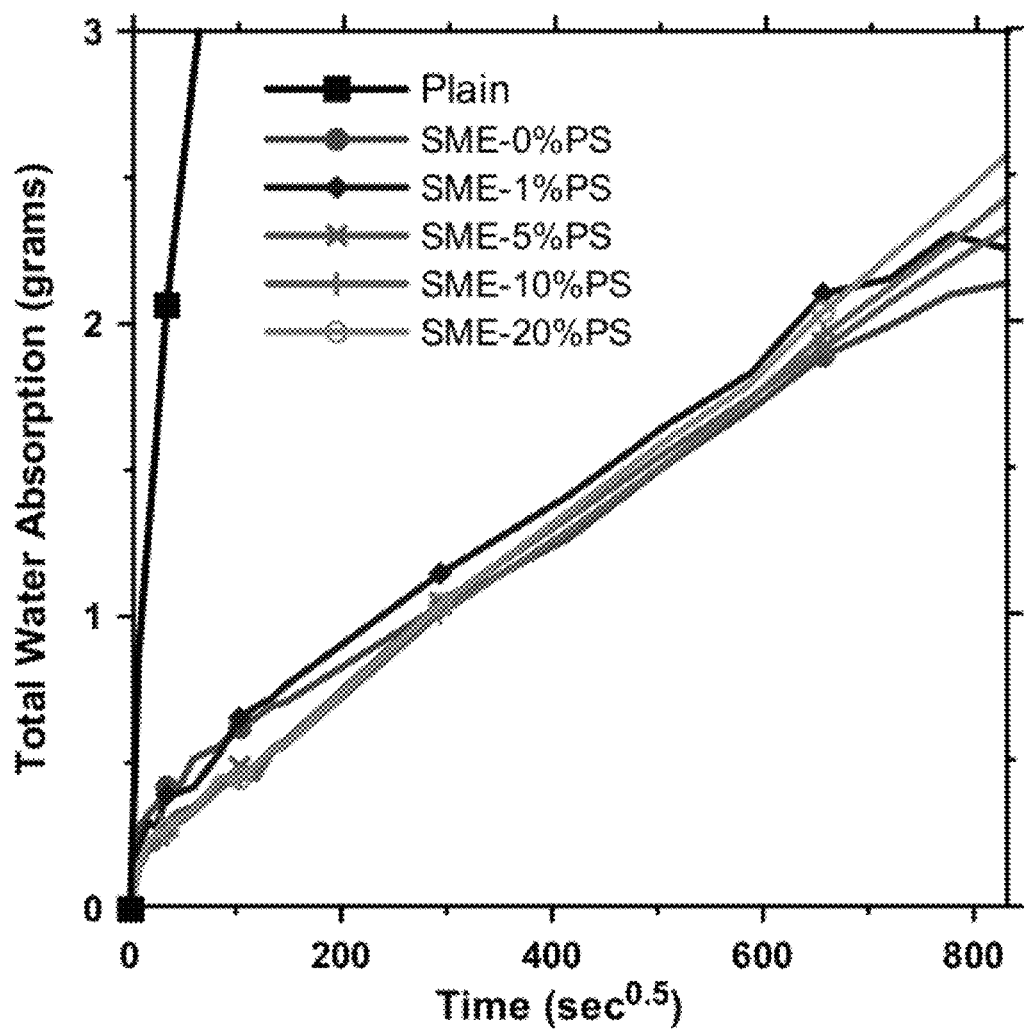
FIG. 11 shows the effect of admixed soy methyl ester polystyrene on sorption of standard conditioned samples.
Figure 12:
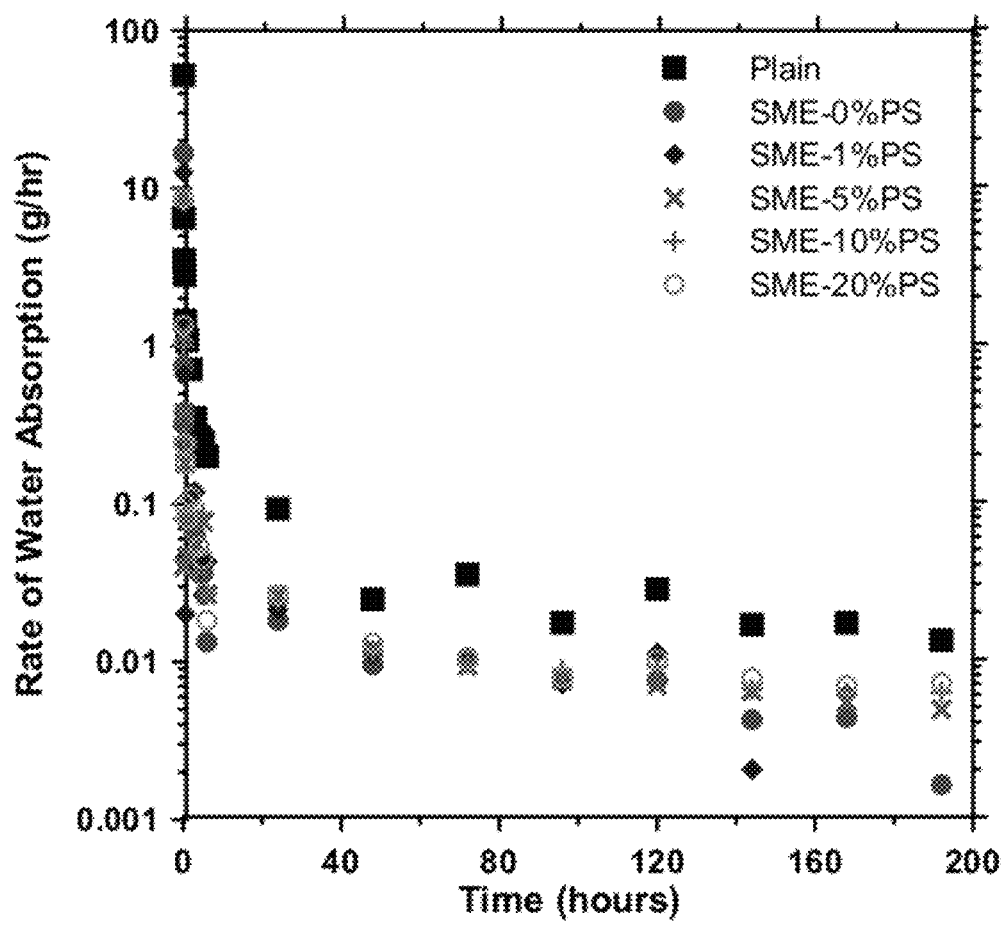
FIG. 12 shows the rate of water absorption of samples containing soy methyl ester polystyrene blends admixed at 2.50% by weight of cement.

Additionally, the rate at which water is being absorbed by the plain samples is consistently greater than the samples with SME-PS blends. FIG. 11 shows the same data as FIG. 10, only the scale has been changed to emphasize the different in the initial absorption rates. The rate of water absorption of the plain samples after eight (8) days is 0.0138 grams per hour, versus the average for samples containing SME-PS which were absorbing water at a rate of 0.0041 grams per hour after eight (8) days, with a standard deviation in absorption rate of 0.0031 grams per hour for samples containing SME-PS. A 70.3% reduction in the rate of water absorption was observed for the samples tested which contain SME-PS blends. In FIG. 12, it is seen that the sorption (rate of absorption with respect to the square root of time, change in mass/sec$^{0.5}$) of the SME-PS admixed samples appears fairly constant, whereas the plain samples exhibit the typical behavior of water uptake resulting in an initial and secondary sorption.

As seen in FIG. 12, the rate of water absorption decreases rapidly in the first six (6) hours. After this time, the rates of at which water absorption decreases begins to decline. However, the most notable difference is the initial sorption for the SME-PS samples. These samples exhibited much lower initial sorption than the plain samples, which attributes greatly to its success in reducing water absorption.

Figure 13:
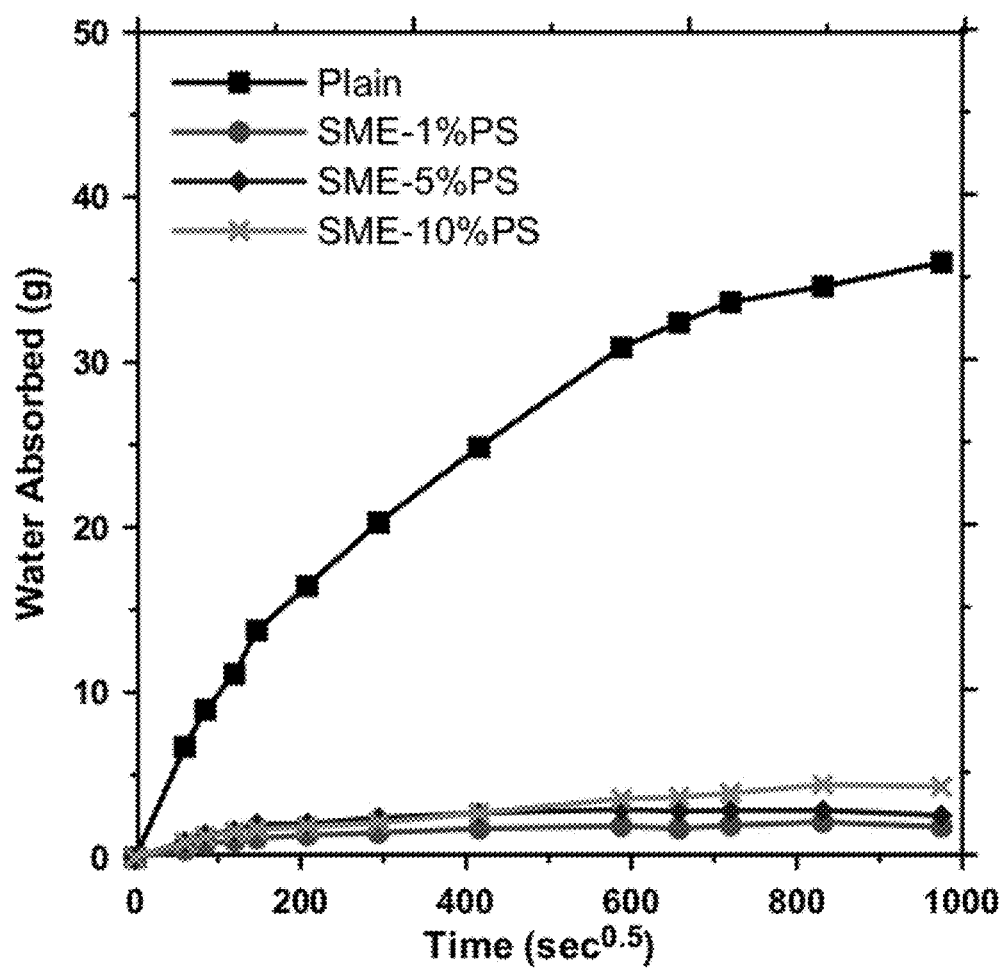
FIG. 13 shows the effect of soy methyl ester polystyrene admixed at 1.25% by weight of cement.
Figure 14:
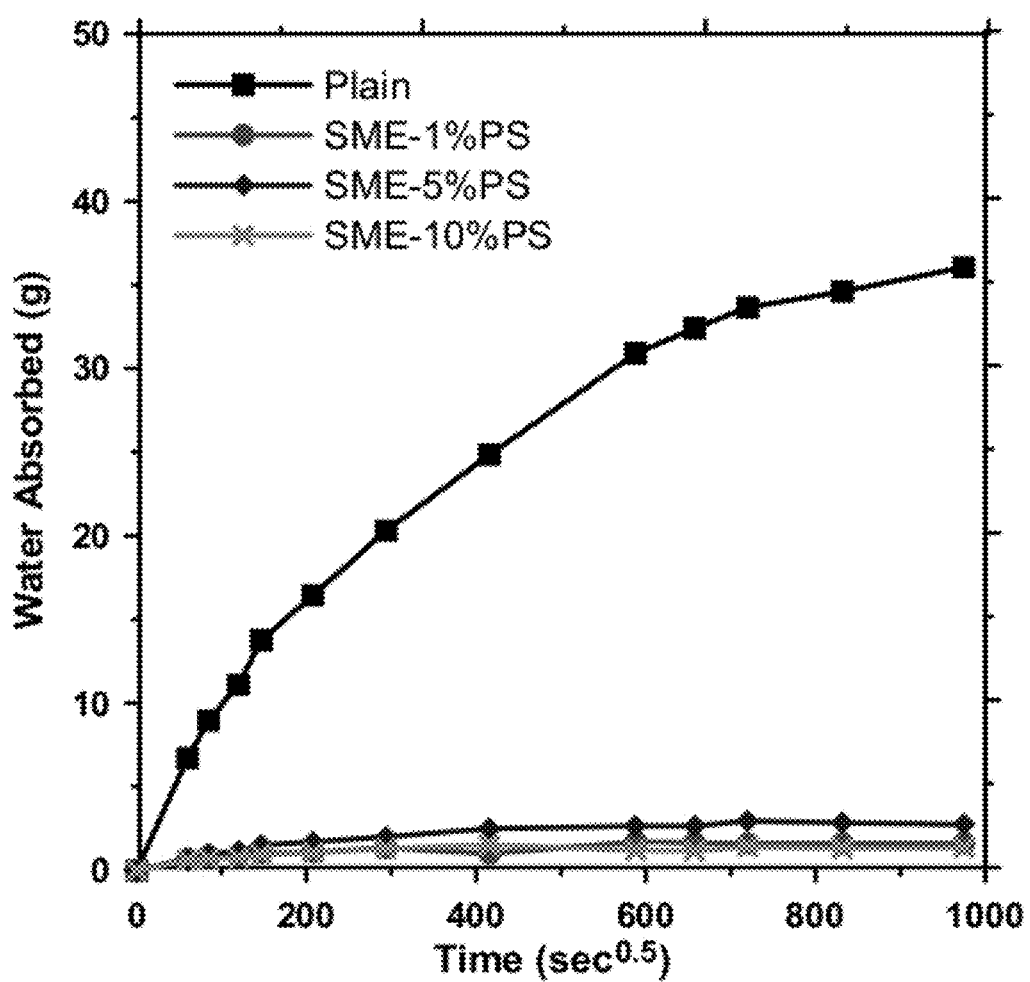
FIG. 14 shows the effect of soy methyl ester polystyrene admixed at 2.50% by weight of cement.

The second set of sorption samples tested was prepared differently than the previously described. The samples were created using 4-inch×8-inch cylindrical specimens which were made using several different SME-PS blends added at 1.25% and 2.5% by weight of cement (see FIGS. 13 and 14). The cylinders were cut into 2-inch thick discs after 24 hours of covered curing. After being saw-cut, the samples were then allowed to dry at 23° C.±0.5° C. and 50%±1% relative humidity for 90 days. This conditioning period is believed to have lowered the internal relative humidity of the samples such that it would be less than the internal relative humidity of the samples conditioned according to the standard. The samples were then subjected to water absorption. The average reduction in total absorption of samples containing SME-PS at 192 hours (8 days) is 91% for samples dosed at 1.25% and 94% absorption reduction for samples dosed at 2.5%. FIG. 13 shows this reduction in absorption which indicates that this application may be particularly effective in reducing moisture ingress in cementitious materials. This may be attributed to the presence of SME in the pore structure of the concrete. Having SME present in the pores or coating the walls of the pores can reduce the capillary pressure that draws the water into the pores.

Figure 15:
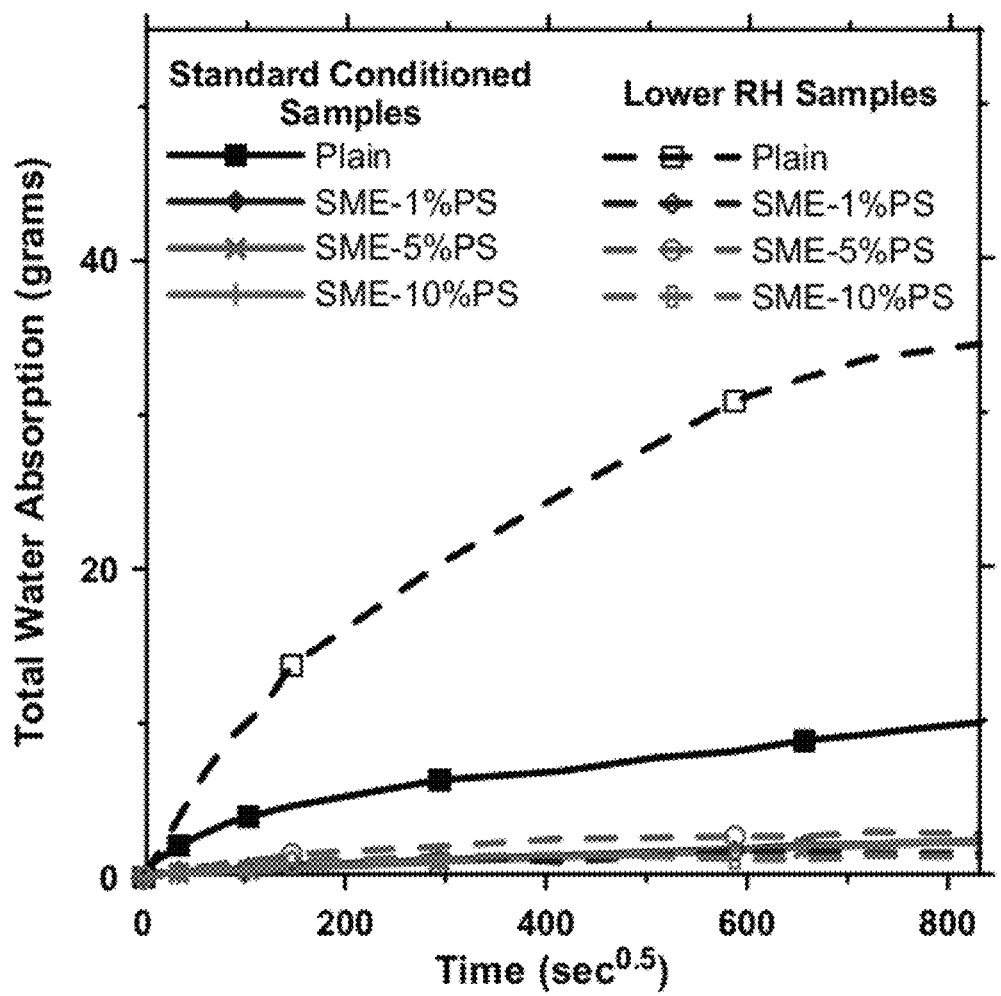
FIG. 15 shows a comparison of water absorption of samples conditioned to different relative humidity with soy methyl ester polystyrene admixed at 2.5% by weight of cement.

Upon comparison of the fluid absorption behavior of the mortar samples, it is observed that the relative humidity of the samples influences the absorption behavior of the sample. This behavior can be easily predicted by examining a typical adsorption isotherm for hardened cementitious systems. The sample conditioned to lower relative humidity exhibits greater water absorption. Looking at FIG. 15, this behavior is seen when comparing the plain mortar samples of different relative humidity. However, the same change in water absorption is not observed for samples containing the SME-PS admixture. It is theorized that the difference in behavior is mainly due to a pore blocking effect, as well as a reduction in surface tension, from the admixed SME-PS. Inside of hydrated cement pastes, many pore sizes exist, as is shown in Table 7. Many of these pores are percolated, creating an interconnecting structure of small and large pores. If SME-PS blends absorbs onto the wall of these pores, or forms a barrier across them, it could inhibit water from leaving the pores which would result in a sample with higher moisture content than an equivalent system without SME-PS. This explains why the different conditioning processes appear to have little effect on the behavior of these systems.

It was originally believed that the presence of polystyrene in the SME-PS blends may also contribute to the reduction of fluid transport and absorption. Hydrated cement pastes contain a pore structure composed of a range of different pore sizes. Table 7 lists the typical pore sizes for a range of pore types in hydrated cement pastes.

TABLE 7

Typical Pore Sizes in Hydrated Cement Paste

| Pore Type | Diameter | Description |
|---|---|---|
| Capillary Pores | 10,000-50 nm | Large capillaries |
| | 50-10 nm | Medium capillaries |
| Gel Pores | 10-2.5 nm | Small isolated capillaries |
| | 2.5-0.5 nm | Micropores |
| | ≤0.5 nm | Interlayer spaces |

When fluid is allowed to enter a hydrated paste, it is capable of completely diffusing through the percolated pore structure of the paste because water molecules are small enough to do so. For a SME-PS blend, containing polystyrene molecules of an array of sizes, this may not be the case. As seen in Table 8, the size of a polystyrene molecule is much larger than some of the pores found within a typical hydrated cement paste.

TABLE 8

Estimated Size of Polystyrene Molecules

| Molecular Weight | Length (nm) | Diameter (nm) |
|---|---|---|
| 1,500,000 | 115.0 | 5.1 |
| 900,000 | 83.0 | 4.7 |

TABLE 8-continued

Estimated Size of Polystyrene Molecules

| Molecular Weight | Length (nm) | Diameter (nm) |
|---|---|---|
| 290,000 | 44.1 | 3.6 |
| 160,000 | 31.5 | 3.2 |
| 72,000 | 20.0 | 2.7 |

The source of polystyrene used for the creation of the SME-PS blends contains PS molecules of varying molecular weight. The sizes of some of the PS molecules may be small enough in some cases to penetrate into the larger capillary pores and voids present in a hydrated cement paste. This is not applicable to much of the PS present in the blends. The evaluation of the performance of the different SME-PS blends shows that the PS does not positively contribute to its performance in most applications.

Figure 10:
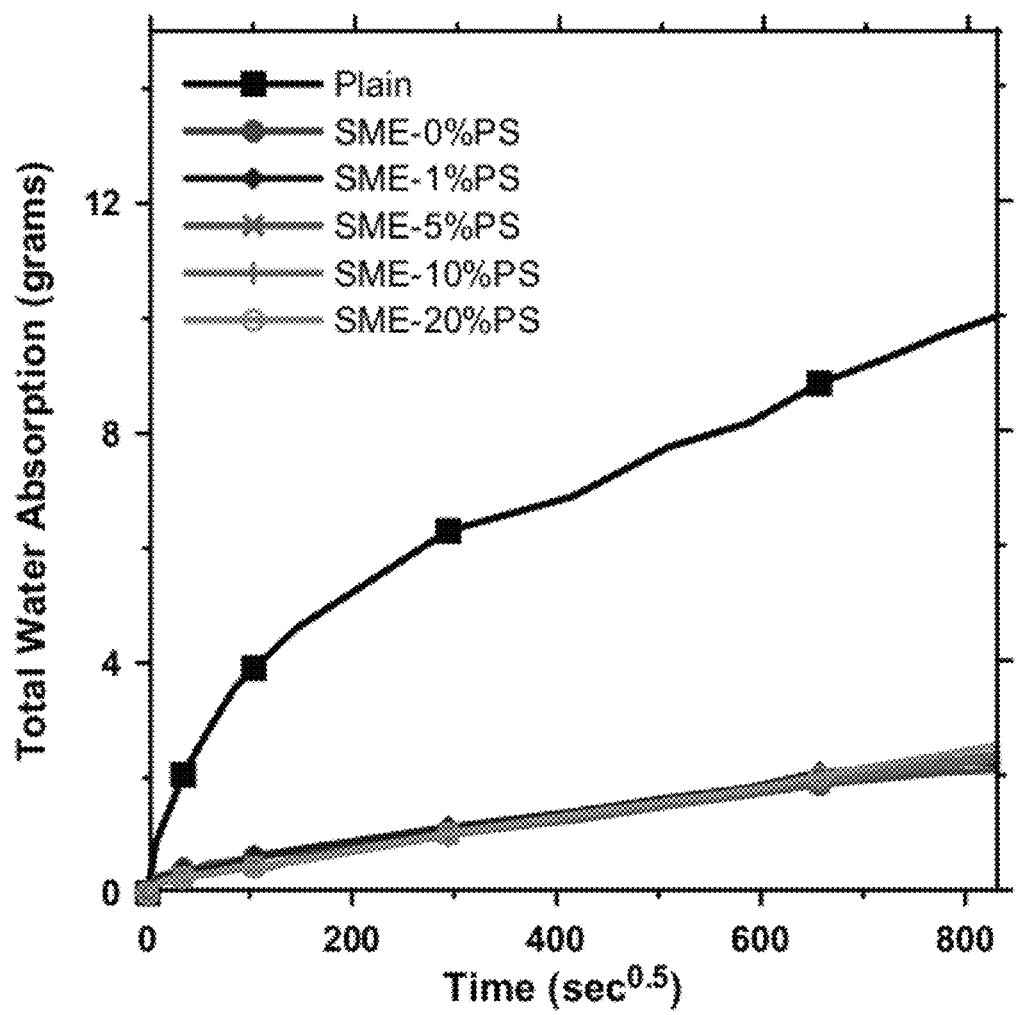
FIG. 10 shows the effect of admixed soy methyl ester polystyrene on sorption of standard conditioned samples.
Figure 16:
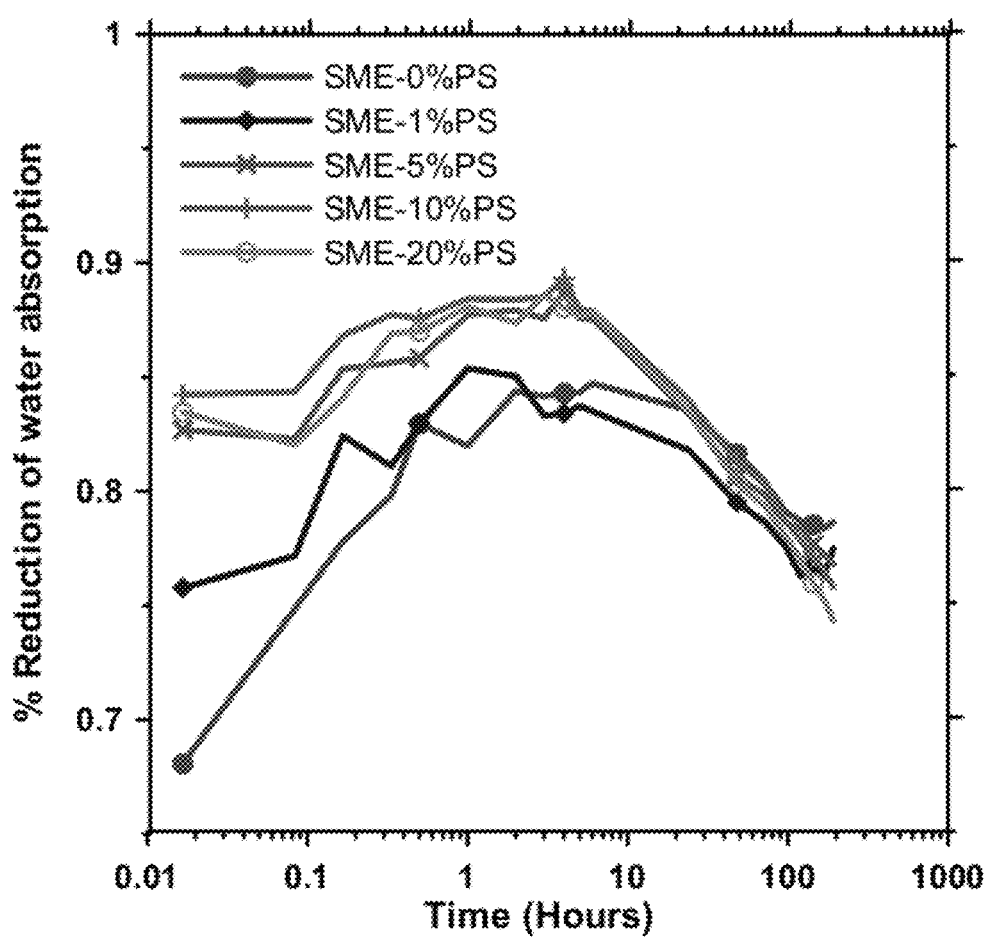
FIG. 16 shows the performance of soy methyl ester polystyrene blends in reducing water absorption as a function of time.

FIG. 10 shows the reduction in water absorption for the standard conditioned sorption samples discussed above. When SME-PS is present in a hydrating cement paste, it possible that some of the PS dissolved in the SME can be deposited or caught in certain pores, depending on the size of both the pore and the polystyrene molecule. However, based on the results of sorption tests conducted, there is a clear reduction in the performance of the SME-PS blends after prolonged exposure to water absorption as the polystyrene content increases. FIG. 16 shows the performance of each SME-PS blend in reducing water absorption over time. Initially, each blend differed significantly in performance. During the first 24 hours of water absorption, the samples containing greater amounts of PS reduced water absorption to a greater degree. However, over several days the performance of each blend changed relative to each other. After 8 days, the samples containing lesser amounts of PS reduced water absorption to a greater degree, but with much less divergence than seen earlier.

Figure 17:
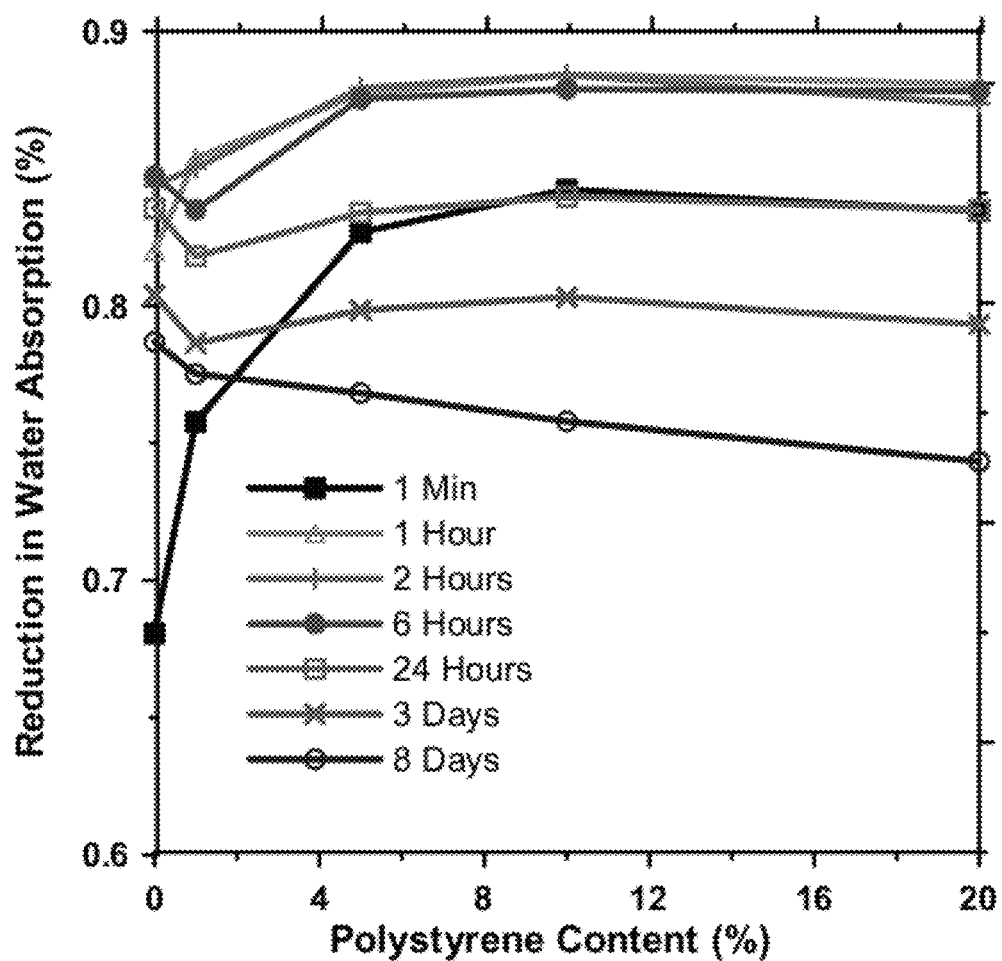
FIG. 17 shows the performance of soy methyl ester polystyrene blends in reducing water absorption as a function of polystyrene content.

This trend is also very apparent in FIG. 17 where the performance of each blend is plotted at certain times over the eight (8) days of water absorption. After one (1) minute of water absorption, the blends with high PS contents perform significantly better than the SME-0% PS blend. After eight (8) days it is seen that there is a similar behavior between the performance of the blend and the PS content.

Although the reasons for the change in effectiveness for reducing water absorption due to the presence of polystyrene molecules are not fully understood, FIG. 17 suggests that the difference in blend performance after prolonged ponding will be very small. Assuming that the adsorption isotherms for all systems containing any SME-PS blend are the same, this would account for the changing rates of water absorption, as well as the change in performance of each blend relative to each other. The initial difference between blends suggests that the presence of PS may lead to slower initial sorption that also result in a slower decrease in the rate absorption rate. Comparing this to the behavior of systems containing SME-PS with no PS, the lack of PS leads to higher initial sorption, which in turn, leads to faster decreases in the rate of absorption.

As is known generally, reduced fluid transport is typically a desirable property of concrete. The results discussed above clearly show that this is a property given to cementitious systems when SME-PS blends are added to the system. Although SME-PS blends are shown to reduce water absorption, this property is only one aspect of transport within cementitious materials. The ability of ions to diffuse through a hydrated cement paste is also of great importance in most applications of concrete. Chloride ion ingress can be detrimental to the integrity of a structure made from reinforced concrete because of the tendency of the chloride ions to accelerate corrosion of the reinforcing steel within the system.

Figure 18:
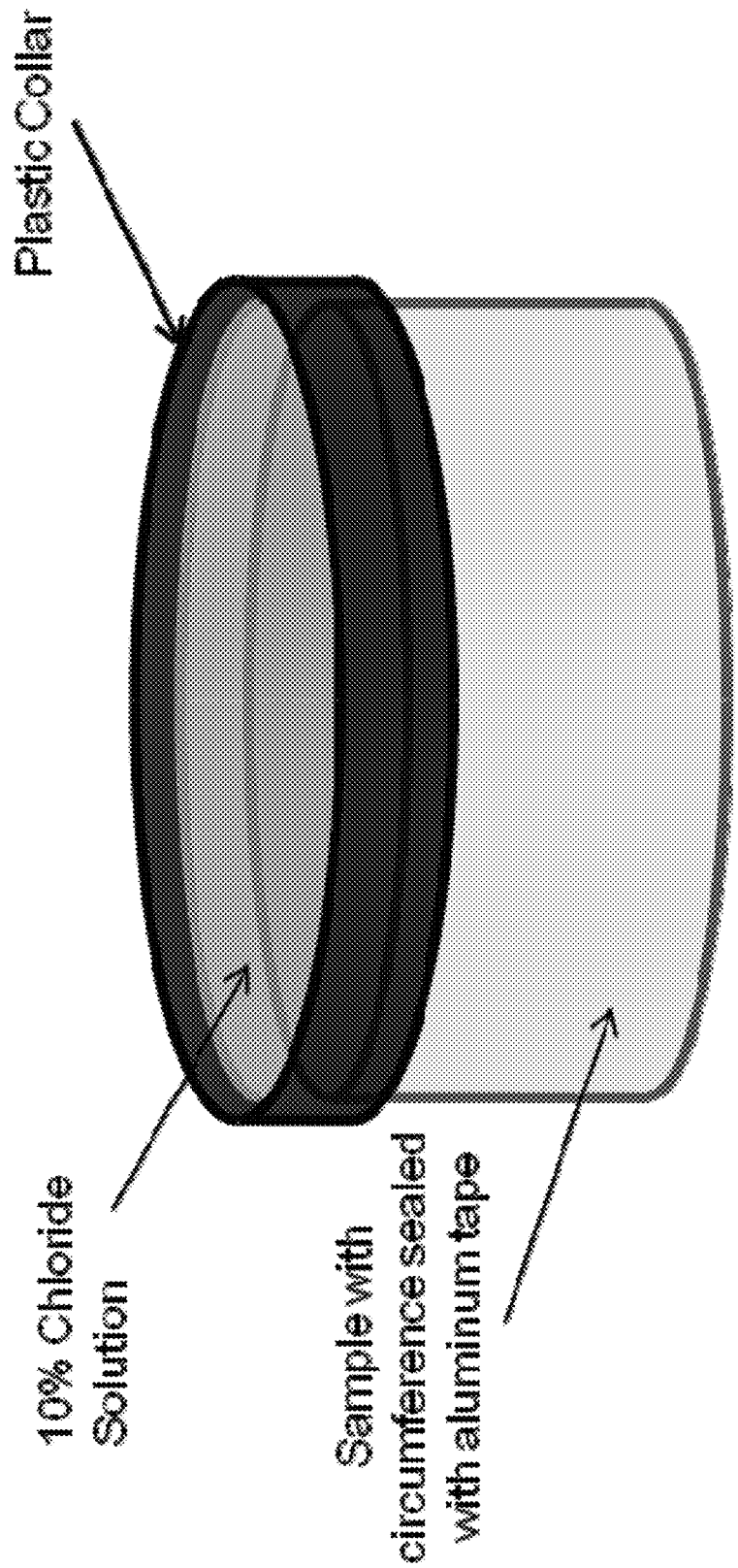
FIG. 18 shows an experimental setup for chloride ponding of admixed samples in accordance with the present invention.

To determine the effects SME-PS blends have on ion mobility of cementitious systems, the standard conditioned samples utilized for the sorption tests described above were reused. The samples were created using the mixture proportions described in Table 5, and had SME-PS blends admixed to the system at 2.5% by weight of cement. FIG. 18 depicts the experimental setup of the chloride ponding test performed.

Figure 19:
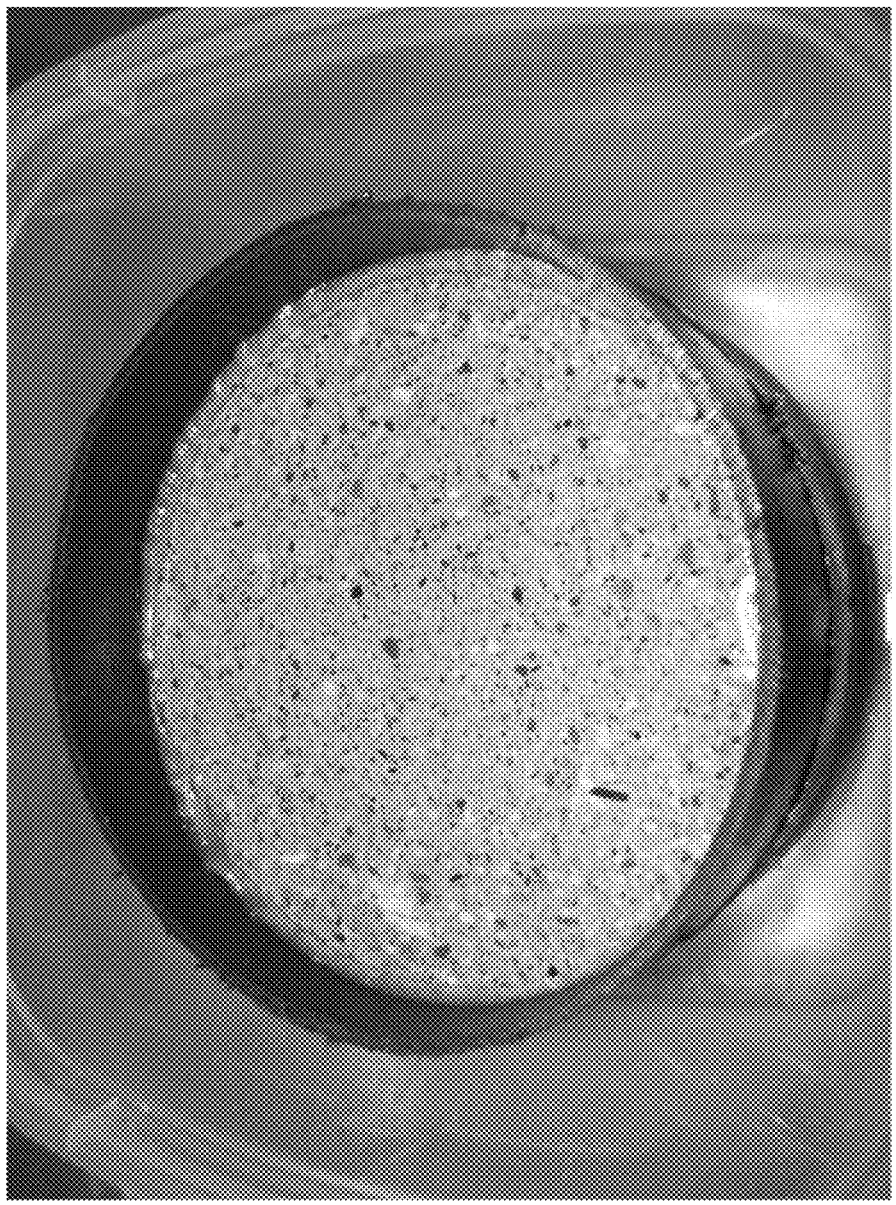
FIG. 19 shows a picture of a plastic collar and silicone sealant used on samples subjected to chloride ponding in accordance with the teachings of the present invention.
Figure 20:
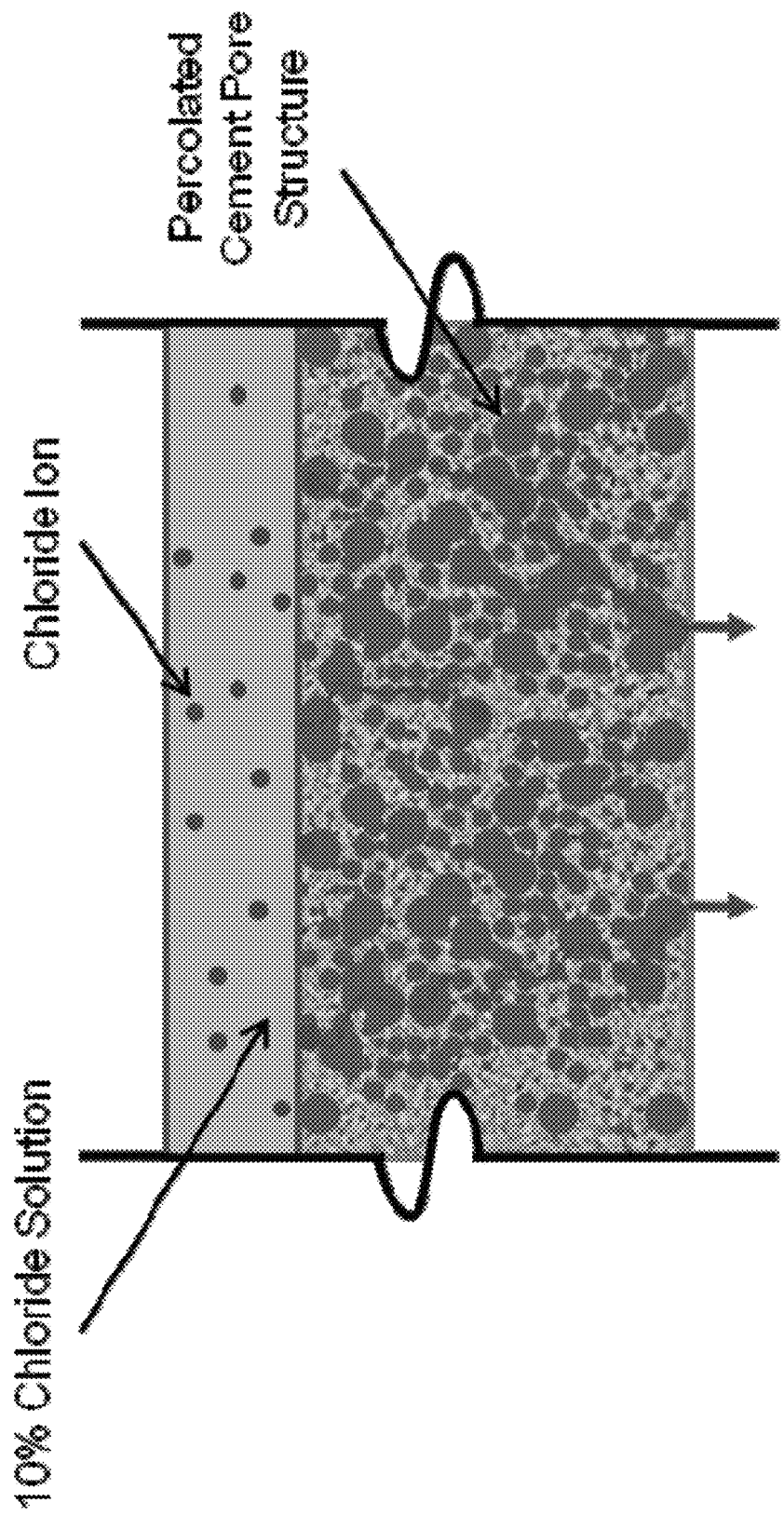
FIG. 20 shows an illustration of ion diffusion in a hydrated cementitious system in accordance with the teachings of the present invention.

The samples were sealed with aluminum tape around their circumference and then a plastic collar was placed around the top of the sample to act as a dam that could hold a chloride solution ponded on top of the sample (see FIG. 19). The seams around the collar and the sample were sealed with a silicone caulk to ensure that the chlorides from the ponded solution could only penetrate from the top of the sample and would not leak along the seam of the tape used to seal the sides of the samples. The samples were then ponded with a 10% chloride solution, and then the entire sample was placed in a plastic box with a small amount of deionized water in the bottom to help keep the sample saturated throughout the test. The lid was also placed on the box to prevent evaporation of the water in the chloride solution. FIG. 20 illustrates the concept of this experimental set-up.

Since the samples had been saturated for several weeks prior to the experiment, it was assumed that the pores within the hydrated cement paste were fully saturated. By ponding chloride solution on top of the saturated sample, the ability of the ions to diffuse through the percolated water filled pores can be measured using their penetration depth.

Figure 21:
FIG. 21 shows chloride ion penetration of a plain mortar sample at 9 days.
Figure 22:
FIG. 22 shows chloride ion penetration of a mortar with SME-1% PS admixed at 2.50% by weight of cement.
Figure 23:
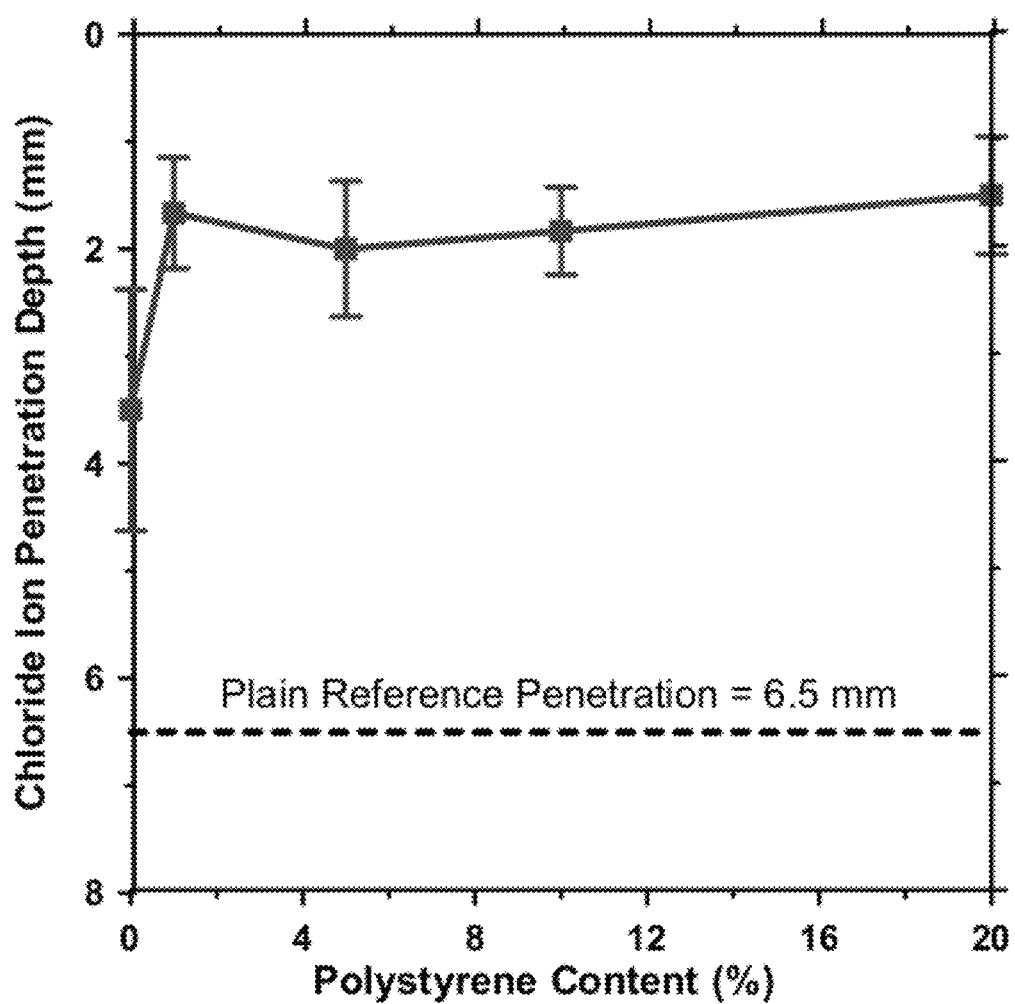
FIG. 23 shows chloride ion penetration for saturated mortar samples containing soy methyl ester polystyrene blends at 2.50% by weight of cement.

After nine (9) days of ponding the mortar samples with a 10% chloride solution, it was assumed that ion penetration had occurred to a measurable extent. The samples were then removed from the boxes, the ponding solution disposed of, and the samples were stripped of the collars and aluminum tape. To measure the penetration of the chloride ions the samples were split open with a hammer and chisel, and then sprayed with silver nitrate. The application of silver nitrate caused the areas of the sample without chloride ions to turn a brown color. Areas containing high concentrations of chloride ions remained a normal cement color. This allowed the penetration of chloride ions to be visually measured. One measurement was made on each split face of each sample. The measurement was made in the very center of the sample, and the average of the two measurements of each sample was used. The standard deviation in measurements was 2.5 mm for the plain samples (no admixed SME-PS), and 0.6 mm amongst all samples containing SME-PS blends. FIGS. 21 and 22 show the resulting interior surface of the samples which were ponded. FIG. 21 shows the penetration of the chlorides in a plain mortar sample after the 9-day ponding period. The depth of this penetration is significantly greater than that measured for samples containing the SME-PS blends as an admixture. FIG. 22 is an example of how shallow the penetration was after nine (9) days for samples with SME-PS blends admixed at 2.50% by weight of cement. The average reduction in chloride diffusion depth due to the presence of admixed SME-PS blends is 68%, with a maximum reduction of 77% occurring for the SME-20% PS blend. The results are summarized by FIG. 23 for all blends used in this experiment. Error bars show that each set of samples measured had consistent results. The measurements were made on each of the split halves, totaling six (6) measurements for each sample type.

Moving now to an illustrative example of the SME-PS effect on fluid transport for topical applications on hardened concrete, two tests were performed—i.e., a conventional water absorption test as described above and the use of x-ray absorption to track the penetration and ingress of both SME-PS blends and water. As mentioned previously, such a sealant may be practical for protecting concrete pavement joints from freeze-thaw deterioration. With this in mind, the geometry chosen for the x-ray absorption experiment is representative of a cross-section in a typical concrete pavement saw-cut joint. The samples were placed in the x-ray absorption device and a series of measurements were taken with an x-ray camera to track ingress of both the SME-PS as it penetrates into the samples upon application, as well as moisture ingress of water ponded on samples that have either been treated with SME-PS or left plain. This information can be used to look at how water is typically drawn into concrete, and how SME-PS blends affect this process.

Figure 24:
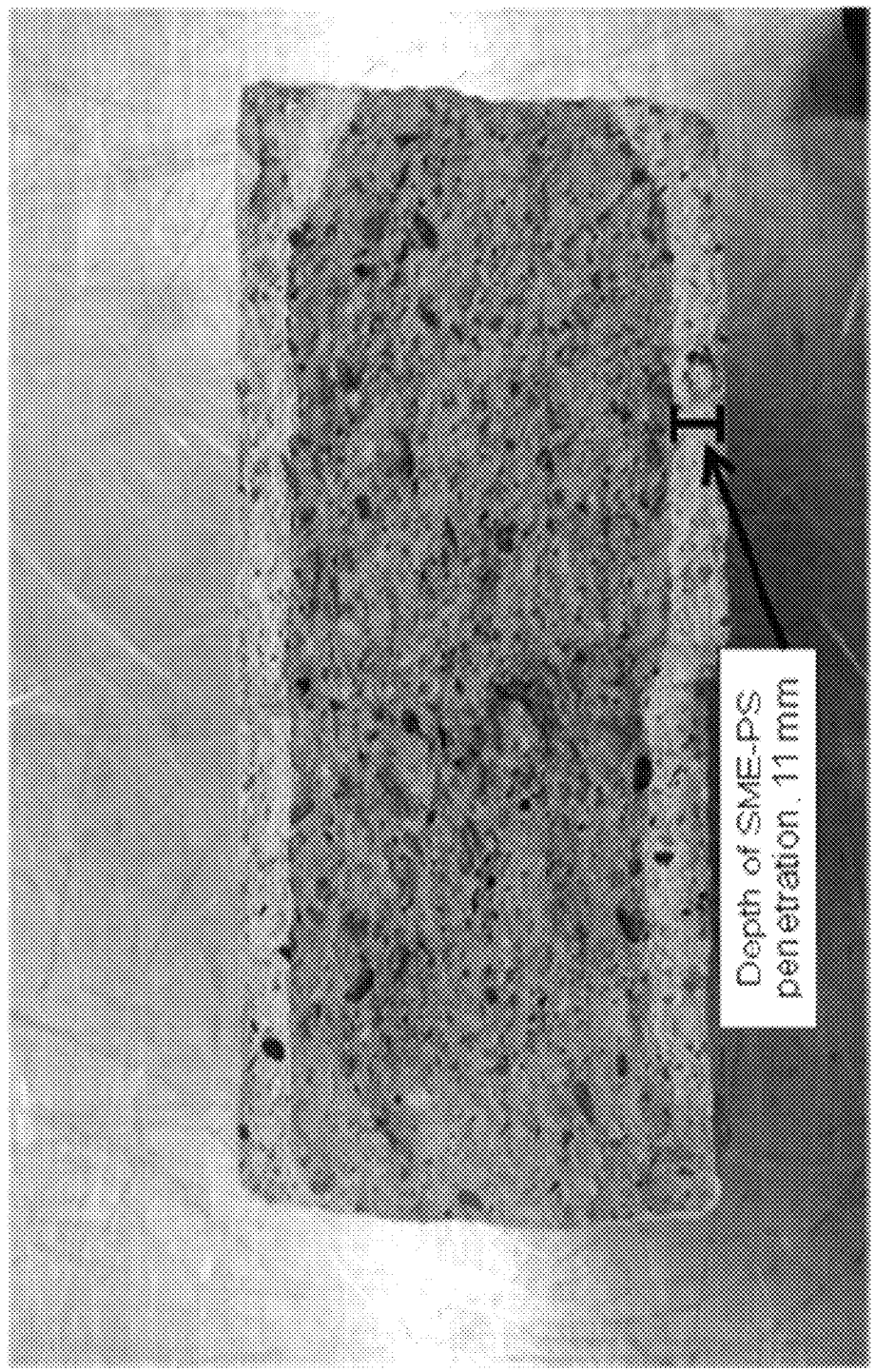
FIG. 24 shows visible penetration of topically applied SME-20% PS blend on concrete cylinder.

When working with SME-PS blends, the potential application of SME-PS blends as a penetrating sealer quickly becomes apparent. As seen in FIG. 24, SME-20% PS was topically applied to the concrete cylinder using a spray bottle and allowed to penetrate for 24 hours. After this time, the cylinder was split open along its longitudinal axis and the interior surface was wetted with water from a spray bottle. In doing so, the areas where SME-PS had penetrated to were visible and serve as a demonstration of the SME-PS blend abilities to penetrate and repel water.

Figure 25:
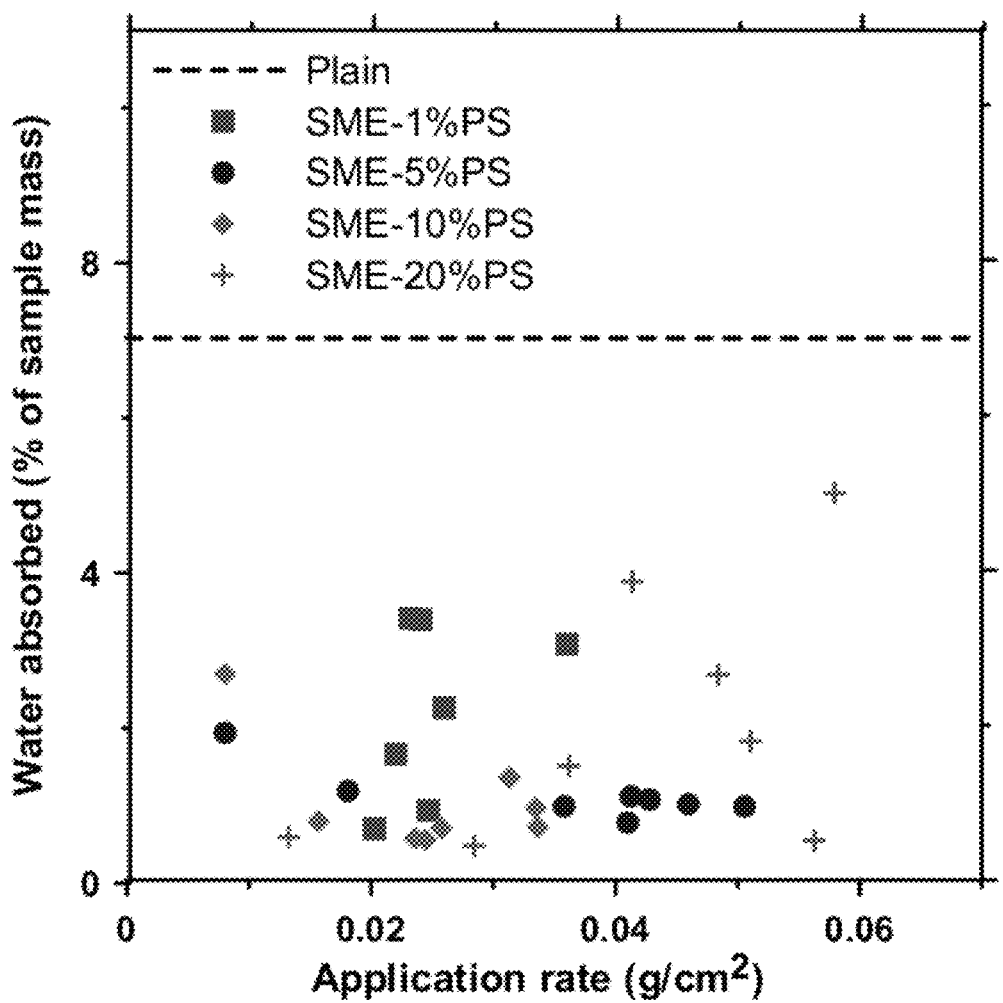
FIG. 25 shows water absorption with a topical application of soy methyl ester polystyrene blends in accordance with the present invention.

As described in detail above, the use of SME-PS blends in admixed applications can reduce water absorption by a cementitious system. Similarly, the application of SME-PS blends topically is also a viable option for reducing water absorption. To examine the effectiveness of SME-PS blends in reducing water absorption through topical applications, mortar samples were made. More particularly, several 4-inch×8-inch cylinders of a plain mortar (no SME-PS admixed) with w/c=0.5 and a fine aggregate volume fraction of 55%, were cast, cured for 24 hours under wet burlap, and then saw-cut into 2-inch thick discs. The discs were allowed to cure at 23° C. and 50% RH for 90 days. These discs were then treated topically with varying application rates of SME-PS using a spray bottle. The SME-PS applied to the surface was allowed to be absorbed by the samples for 24 hours before subjecting them to water ponding. The change in mass due to water absorption was tracked over 12 days. FIG. 25 shows the amount of water that each sample absorbed, based on the type of SME-PS blends used, as well as the application rate (average coverage of the SME-PS blend on the ponded surface of the sample in grams/cm$^2$). Application rates for all blends tested varied from 0.008 g/cm$^2$ to 0.058 g/cm$^2$.

Because each sample had a different application rate, the spread in this data is quantified by the standard deviation of reduction in water absorption observed for a particular blend of SME-PS used (see Table 9). The spread in the data indicates that there is no specific correlation between the effectiveness of blends in reducing water absorption and the polystyrene content. Additionally, the effect of the application rate does not appear to greatly influence the performance of the applied SME-PS. However, the overall performance of the SME-PS blends in reducing water absorption is similar to what is seen for the admixed applications. Table 9 summarizes the average reductions achieved for samples treated with each type of SME-PS blends used for this experiment.

TABLE 9

Average Reduction in Water Absorption of Topically Treated Samples

| SME-PS Blend | Water absorption by weight (%) | Application rate (g/cm$^2$) | % Reduction | Standard Deviation of % Reduction |
|---|---|---|---|---|
| None | 7.03 | — | 0% | — |
| SME-1% PS | 2.21 | 0.024 | 69% | 16.3% |
| SME-5% PS | 1.14 | 0.025 | 84% | 5.3% |
| SME-10% PS | 1.05 | 0.020 | 85% | 10.6% |
| SME-20% PS | 2.07 | 0.034 | 71% | 18.2% |

As seen in Table 9, the SME-10% PS blend achieved the greatest average reduction in water absorption after 12 days, with an 85% reduction. The maximum reduction from any sample was 93%, achieved by a sample with SME-20% PS topically applied with a relatively low application rate of 0.028 g/cm$^2$. In contrast, the worst performance was also seen by a sample treated with the SME-20% PS blend, which only reduced water absorption by 28% with the highest application rate of all samples (0.058 g/cm$^2$).

Figure 26:
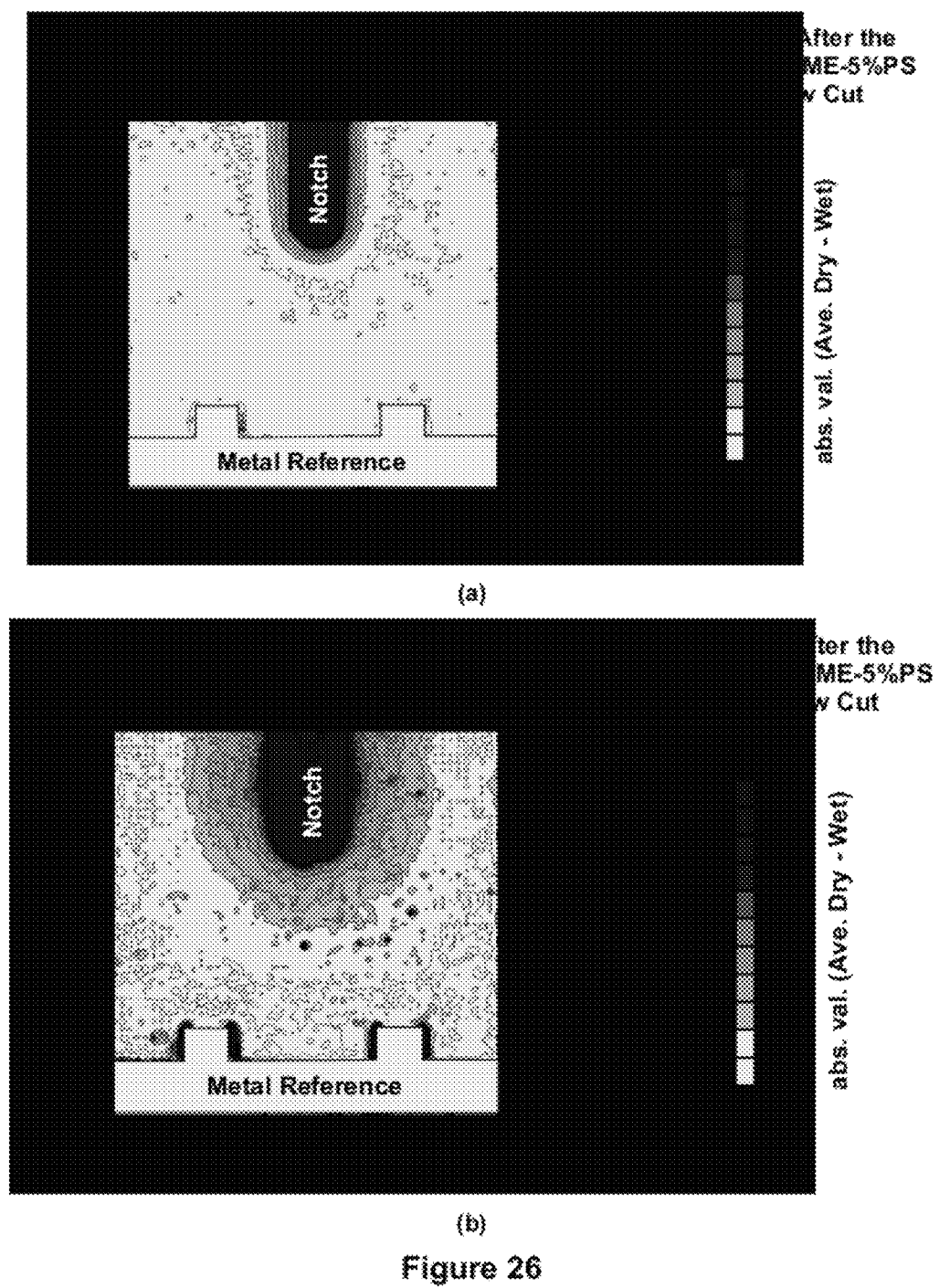
FIG. 26 shows elapsed time X-Ray measurements of soy methyl ester polystyrene penetration in cement paste.

The rate of penetration of SME-PS blends was measured in order to determine whether the blends could adequately penetrate cementitious materials in a practical time frame. Using x-ray absorption measurements taken at different times, changes in material composition can be detected. For example, dry mortar samples measured using x-ray absorption will have a different result than a wet mortar measured using x-ray absorption. These differences can be analyzed graphically. FIG. 26 shows the penetration of a SME-5% PS blend placed in the saw-cut of a dry cement paste specimen with a water-to-cement ratio of 0.30. It can be seen that the SME-PS can quickly penetrate the material several millimeters in a relatively short period of time (4 mm in 5 hours).

It should be noted that this penetration is highly dependent on the moisture condition of the specimens. Because of SMEs hydrophobic nature, the application of SME-PS blends to highly saturated samples would result in much smaller penetration depths.

Water absorption tests were performed on plain mortars like those described in detail above where one surface was coated with SME-PS. Total water absorption was reduced by 85-93% after 12 days for application rates of different blends between 0.020 g/cm$^2$ and 0.036 g/cm$^2$. These application rates are for flat surfaces where only small amounts can be applied at a given time. In the case of saw-cuts, however, it is possible to pond the SME-PS blends where even more SME-PS can be ponded and allowed to penetrate over time.

Saw cuts are placed in a concrete pavement shortly after it is placed to control stresses induced by shrinkage and thermal contraction. Several states have noticed premature damage development at the joints in pavements. This deterioration may be due in part to freeze-thaw damage that occurs when water enters the pore system in the concrete. One potential method that may be used to increase the freeze-thaw resistance of concrete is to provide a sealer that prevents water and aggressive fluids from entering the pore structure of the concrete. Previous research has shown that SME-PS has the potential to act as a penetrating sealer that would limit the fluid that is able to penetrate the concrete.

The rate at which concrete absorbs water is dependent on the condition of the concrete, most notably the relative humidity of the concrete, as well as the porosity of the cement paste. In this experiment, mortar samples were created, and then dried in an oven. The samples were then placed in an x-ray absorption device and measurements were taken at intervals during the experiment. The first measurements performed were of the typical rate of absorption of water into these oven dried samples.

Figure 27:
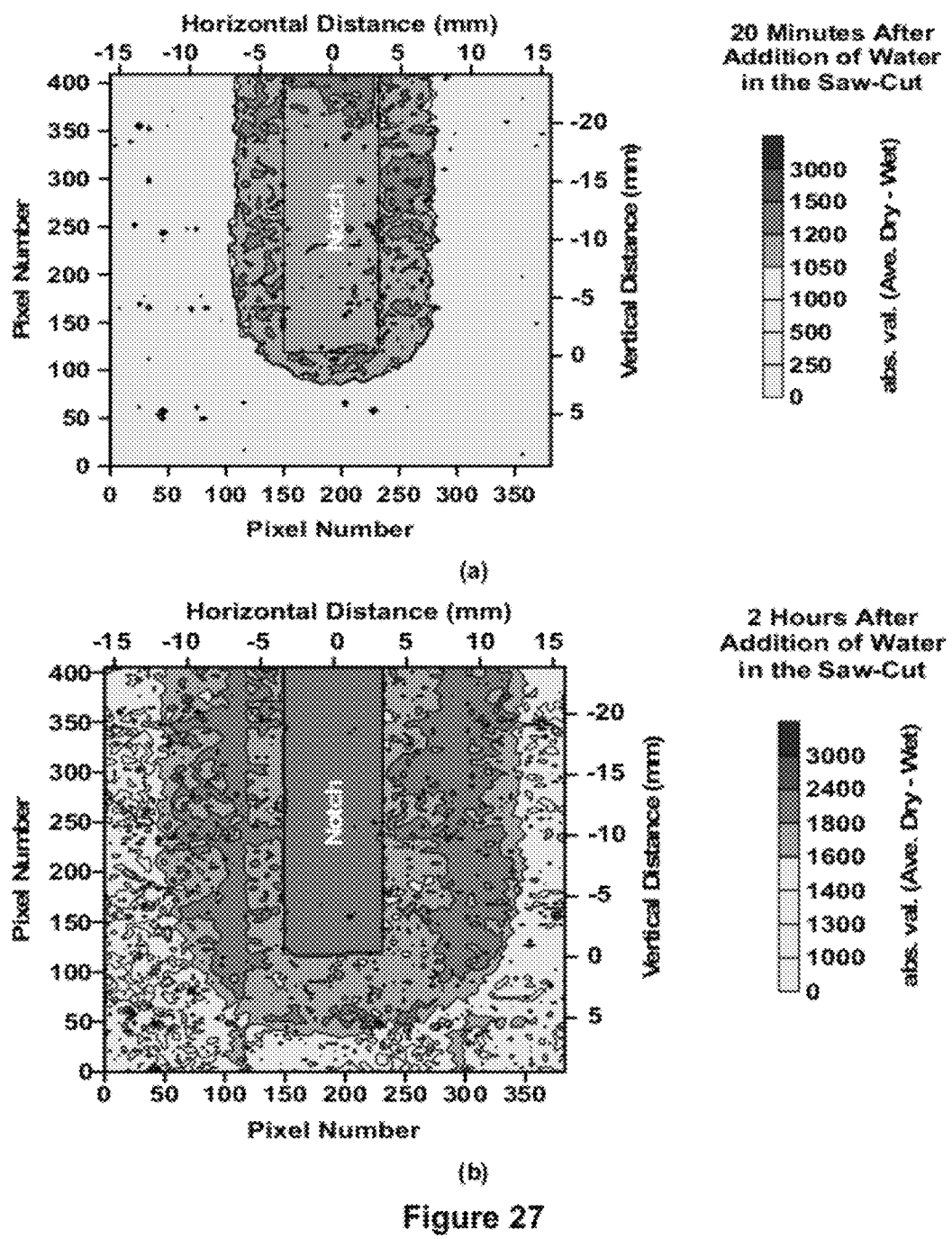
FIG. 27 shows elapsed time X-Ray measurements of water penetration in oven dry mortar.

FIG. 27 shows the penetration of water at 20 minutes and 2 hours after the addition of water. The penetration of the water can be easily seen since there is a clear moisture front boundary. At 20 minutes the moisture front has penetrated 4.4 mm into the sample, and at 2 hours the penetration reached 8.1 mm.

Another oven dry sample was then pre-treated with the SME-5% PS blend by ponding the SME-PS blend in the saw-cut of the sample and allowing it to be absorbed freely in to the sample over 48 hours. The sample was then subjected to the same wetting process as the plain oven dry sample shown in FIG. 27. The resulting images indicated that there was no detectable penetration of water over the course the measurements (4.5 hours).

In addition to measurements of penetration using x-ray absorption, a scanning electron microscope was utilized to examine the location of SME-PS after applied topically. It is desirable to have a penetrating substance that can easily diffuse into the pore structure of hydrated cement pastes, as well as fill macro and micro cracks that may have developed during the life of the cementitious system. In an attempt to locate SME-PS blends that have been applied topically, a scanning electron microscope was used to look at a cement paste samples that were ponded with SME-PS.

The cement paste samples were made with a water-to-cement ratio of 0.42, and were created by casting the paste into a standard 25 mm×25 mm×250 mm drying shrinkage specimen mold. The reason for choosing this geometry was to allow for a relatively small paste sample that could be cut into several segments, dried in an oven at 100° C. for 24 hours, and then ponded with different blends of SME-PS. After casting, the paste specimen was removed from the mold after 24 hours, saw-cut into shorter segments (approximately 25 mm×25 mm×30 mm in length). Two cement paste samples were sealed on all but one face using aluminum tape (leaving a 25 mm×25 mm area exposed). This small face was ponded with SME-0% PS on one sample, and with SME-20% PS on the other sample. The samples were allowed to freely absorb the SME-PS blends for 3 weeks.

Figure 28:
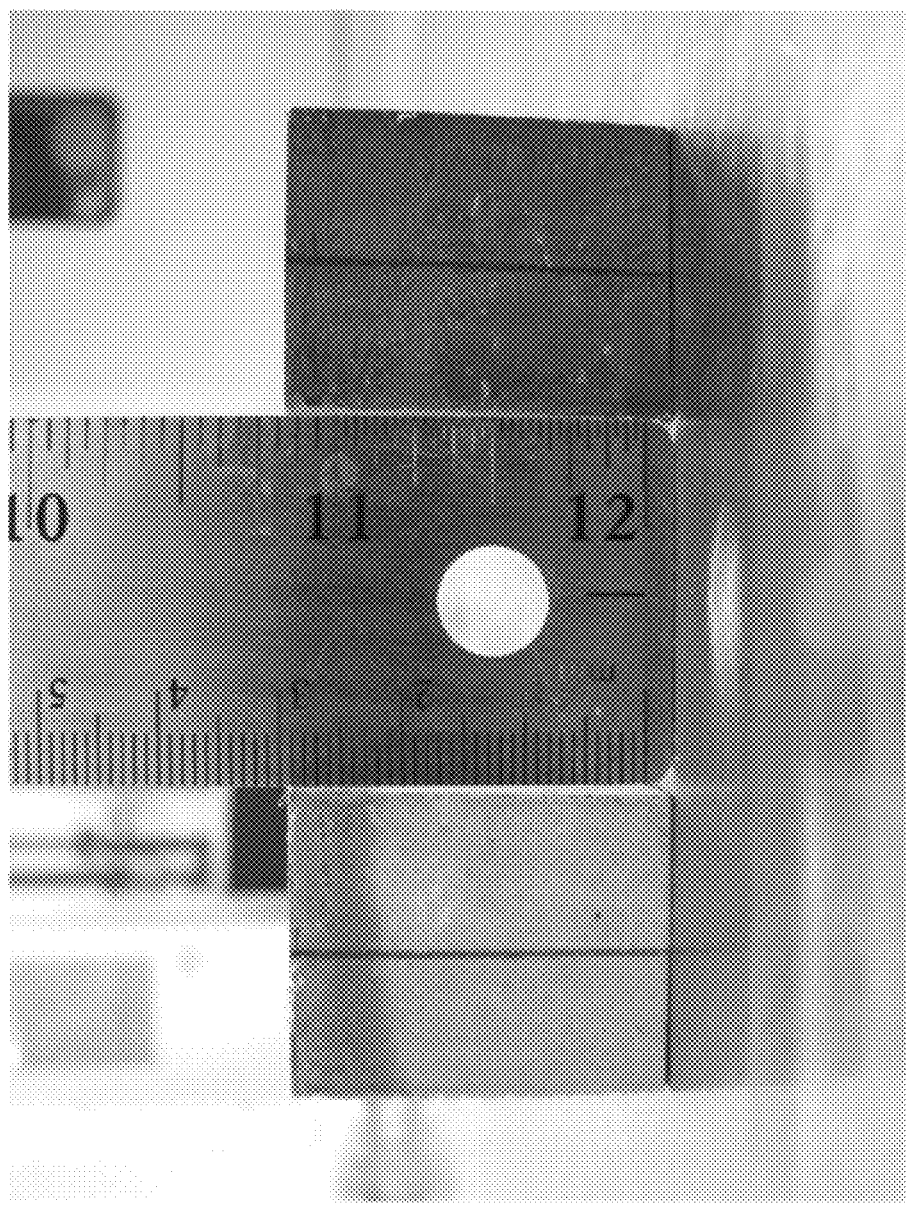
FIG. 28 shows cement paste samples shown after 3 weeks of ponding with SME-20% PS (Left Sample) and SME-0% PS (Right Sample)

It was observed that at the end of the 3 weeks, the sample ponded with the SME-0% PS blend completely saturated with SME-PS. The ponded SME-PS was able to completely penetrate 30 mm through the cross section of the cement paste sample. In the case of the sample ponded with the SME-20% PS blend, the blend was able to penetrate several millimeters, but was unable fully to saturate the sample in 3 weeks. FIG. 28 shows both samples after the aluminum tape has been removed from the sample sides.

The areas to which the SME-PS blends penetrated are very clear, and visual measurements of this penetration were taken. It is clear that the difference in blend viscosity lead to significantly penetration rates. While the SME-0% PS fully penetrated the sample (30 mm) in less than 3 weeks, the SME-20% PS only penetrated a maximum of 9 mm after 3 weeks.

It should also be noted that the moisture condition of the sample significantly impacts the penetration rates of SME-PS blends. This is due to the hydrophobic nature of SME-PS blends, as well as the change in the absorption behavior of the material. For example, topical application of SME-PS blends to a concrete pavement only 24 hours in age, may lead to slow rates of penetrations, as well as low depths of penetration, making them impractical to use of concretes above a certain relative humidity.

Figure 29:
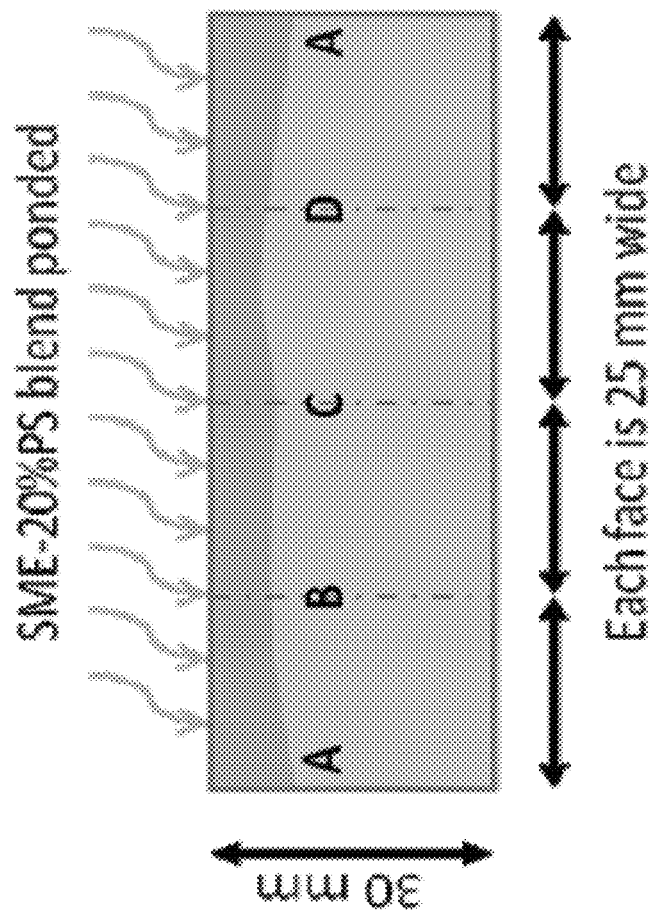
FIG. 29 shows a penetration profile of SME-20% PS blend in a cement paste sample after 3 weeks.
Figure 30:
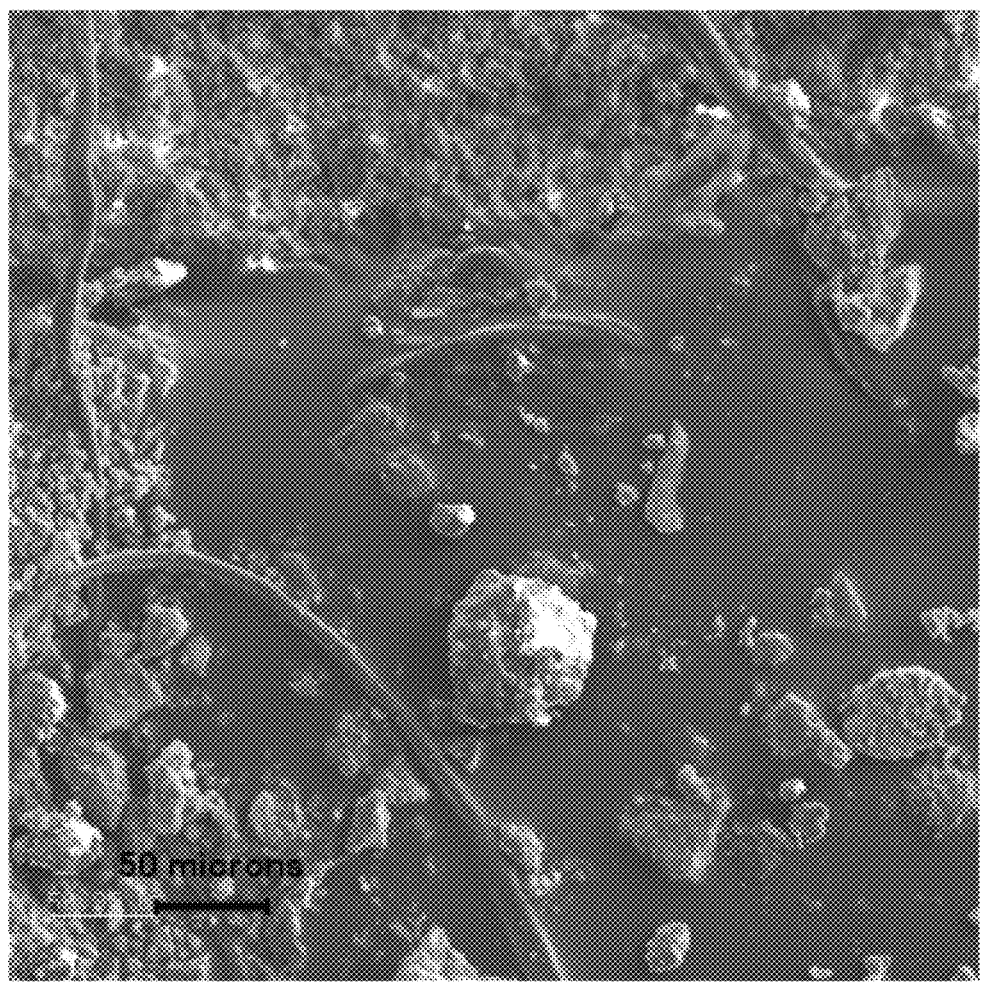
FIG. 30 shows a SME-20% PS Blend on an internal surface of a cement paste sample subjected to ponding in accordance with the teachings of the present invention.
Figure 31:
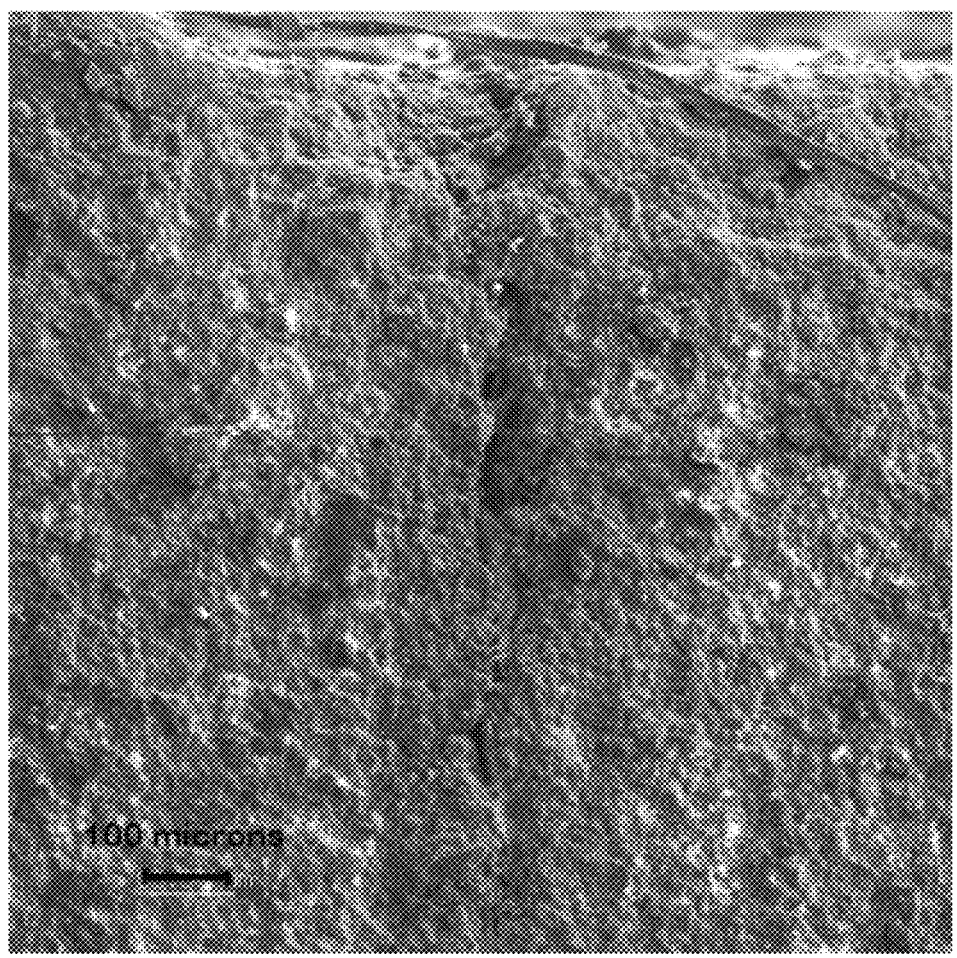
FIG. 31 shows a crack in a cement paste sample ponded with SME-20% PS.
Figure 32:
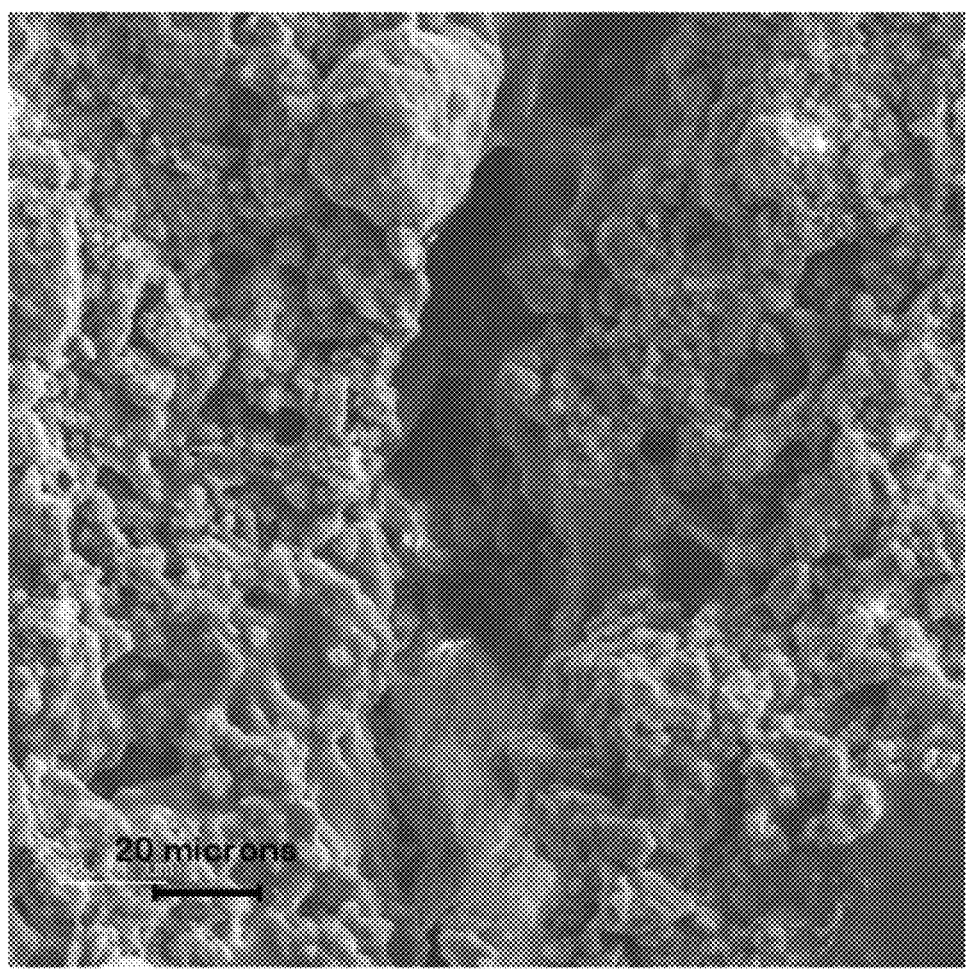
FIG. 32 shows a crack in cement paste sample ponded with SME-20% PS.

The ability of SME-PS blends to penetrate and fill existing cracks in a cementitious system is also an important characteristic. As seen in FIG. 30, SME-PS coatings are capable of completely coating the surface of cementitious specimens. The coatings appear to be smooth and continuous in areas of application. However, in addition to simply coating outside surfaces of specimens, SME-PS also has the ability to fill in cracks of damaged specimens. FIG. 31 shows a crack induced during saw-cutting of the cement paste sample depicted in FIG. 29. FIG. 32 is a close up of the same crack which was near the ponded surface of the cement paste sample. The syrup-like coating seen in the crack shows the ability of the viscous SME-PS blends to effectively fill cracks in cementitious systems. This behavior is very desirable for applications as a topical sealer.

Several methods were used to evaluate the effects of SME-PS on the fresh properties of cementitious systems. Tests included the use of SME as an evaporation retarder and as an admixed water repellant/sealer. The SME-PS was investigated for potential use as both an admixed material and topical application.

One problem in concrete construction occurs when water evaporates from a freshly placed concrete slab. This loss of water is problematic for two reasons. First, the loss of water results in a reduction in the amount of cement that reacts (hydrates) resulting in a more porous, weak open surface layer. This results in a less durable concrete. Second, the loss of water results in the generation of stresses which, if high enough can result in cracking. This phase of research will be conducted to determine the benefits of spraying SME-PS on the surface of fresh concrete so that it can act as an evaporation retarder or curing compound. Five (5) mortar samples were tested without any admixed or topically applied SME-PS, two (2) mortar samples containing admixed SME-PS were tested, and seven (7) mortar samples with topical applications of SME-PS were tested. However, due to vibration issues with the chamber being used, not all portions of the data collected are reported herein. Discussed below are the typical observed responses from the testing.

SME-PS blends have the potential to be used as evaporation retarders. By applying a layer of SME-PS to the surface of fresh concrete, the amount of water that evaporates during the curing process can be reduced significantly due to the presence of a thin film of SME-PS on the surface of the sample. This can reduce the potential for plastic shrinkage cracking.

Figure 33:
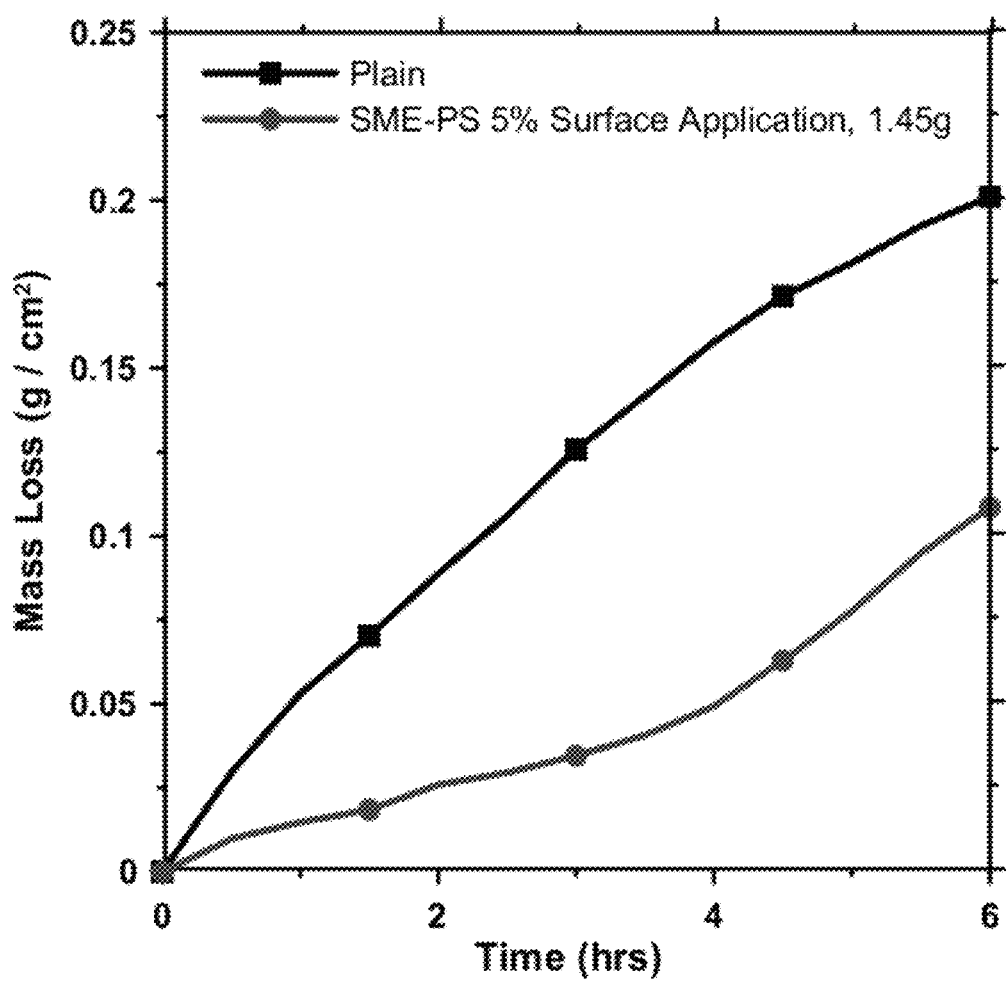
FIG. 33 shows typical mass loss due to evaporation for a plain mortar sample (no soy methyl ester polystyrene on surface), and a mortar sample surface treated with 0.018 g/cm$^2$ of SME with 5% PS by mass.

To quantify the effectiveness of SME-PS in retarding evaporation of water in fresh concrete, specimens were cast and then immediately treated accordingly (with or without SME-PS), and then placed in an environmental chamber where the conditions were 50%±1% relative humidity and a temperature of 23° C.±0.5° C. The samples were placed on scales which continuously monitor the mass of the samples. FIG. 33 shows the typical mass loss due to evaporation for a plain mortar sample (no SME-PS on surface), and a mortar sample surface treated with 0.018 g/cm$^2$ of SME with 5% PS by mass. The graph shows a reduction in evaporation for the sample surface treated with SME-PS.

FIG. 33 shows a reduction of 46% in the mass due to water evaporation. The main window of evaporation reduction occurs during the first 5 hours of the experiment while the mortar is still in its plastic state. After this time, set occurs and the evaporation rates become very similar. However, the reduction which occurs in the first few hours of curing are the most crucial for mixtures with low water-to-cement ratios in order to reduce water loss, and mitigate the potential for cracking. An additional benefit of using SME-PS blends in this application is that since SME has an extremely low evaporation rate (compared to water) the SME that remains on the surface, when set occurs for concrete, will be absorbed into the concrete. The benefits associated with the absorption of SME-PS were discussed in detail above.

There is also the potential to use SME-PS in several applications as an admixture in cementitious materials. Evaporation retardation is most commonly achieved through topical application of substances on the surface of freshly placed concrete. However, it is of interest to examine the effects of SME-PS blends on evaporation of fresh concrete when used as an admixture.

Figure 34:
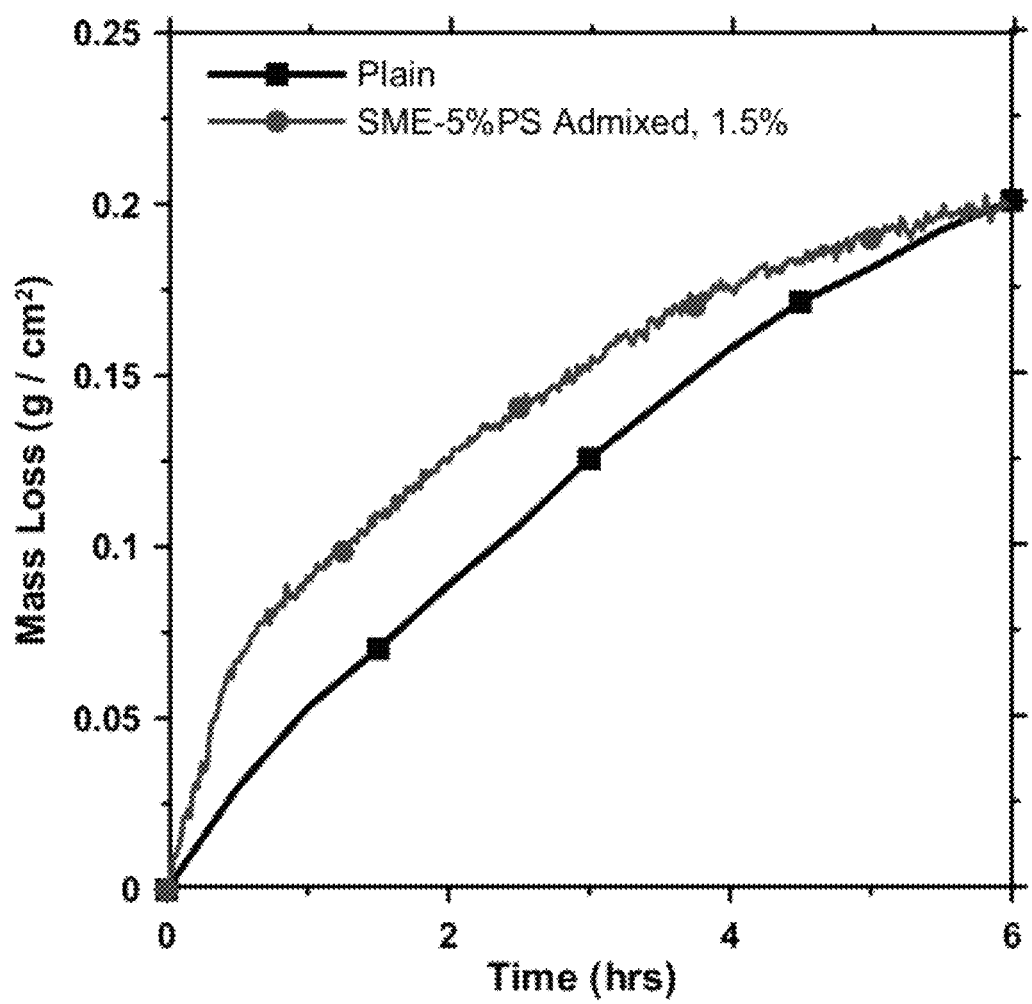
FIG. 34 shows mass loss due to evaporation for mortar with SME-5% PS admixed.

FIG. 34 shows the results from the same evaporation experiment conducted for the topical application, except that the SME-5% PS blend was added during the mixing process at 1.5% by weight of cement. Results consistently showed an initial evaporation rate greater than the plain samples. This leads to higher mass loss during the first 6 hours (approximately until set), and then the evaporation rate decreased significantly. After 6 hours, the sample with SME-5% PS admixed had actually increased mass loss due to evaporation by only 1% with respect to the reference sample. This increase in evaporation is small and is considered negligible. The reasons for the higher initial evaporation rate are not yet understood. One theory is that since there is additional liquid in the system due to the admixing of SME-PS, the solid phases of the mixture (cement and aggregate) are more prone to settling and bleeding. The behavior of SME-PS within a cementitious system is very complicated. Research on identifying the movement and behavior of SME-PS in fresh cementitious systems is being planned for the future.

To determine if the use of SME had any effect on the hydration process of cement, setting tests were performed using a vicat needle on cement paste samples with SME-PS blends. The samples made used several different blends, as well as dosages, of SME-PS. The results, shown in Table 10, indicate that there was no notable retarding effect on the hydration of cement as the set times were not changed significantly. This suggests that SME-PS could be used as an admixture in concrete without any additional curing time or special requirements for placement and finishing.

TABLE 10

Set Time Results from the Vicat Needle Test

| SME Blend | Dosage* | Final Set (min) | % Delay of Final Set Time |
|---|---|---|---|
| Control | 0.00% | 375 | 0.0 |
| 10% PS | 1.25% | 340 | −9.3 |
|  | 2.50% | 330 | −12.0 |
| 5% PS | 1.25% | 390 | 4.0 |
|  | 2.50% | 380 | 1.3 |
| 1% PS | 1.25% | 400 | 6.7 |
|  | 2.50% | 385 | 2.7 |

*Dosage is mass of SME-PS blend by weight of cement

Figure 35:
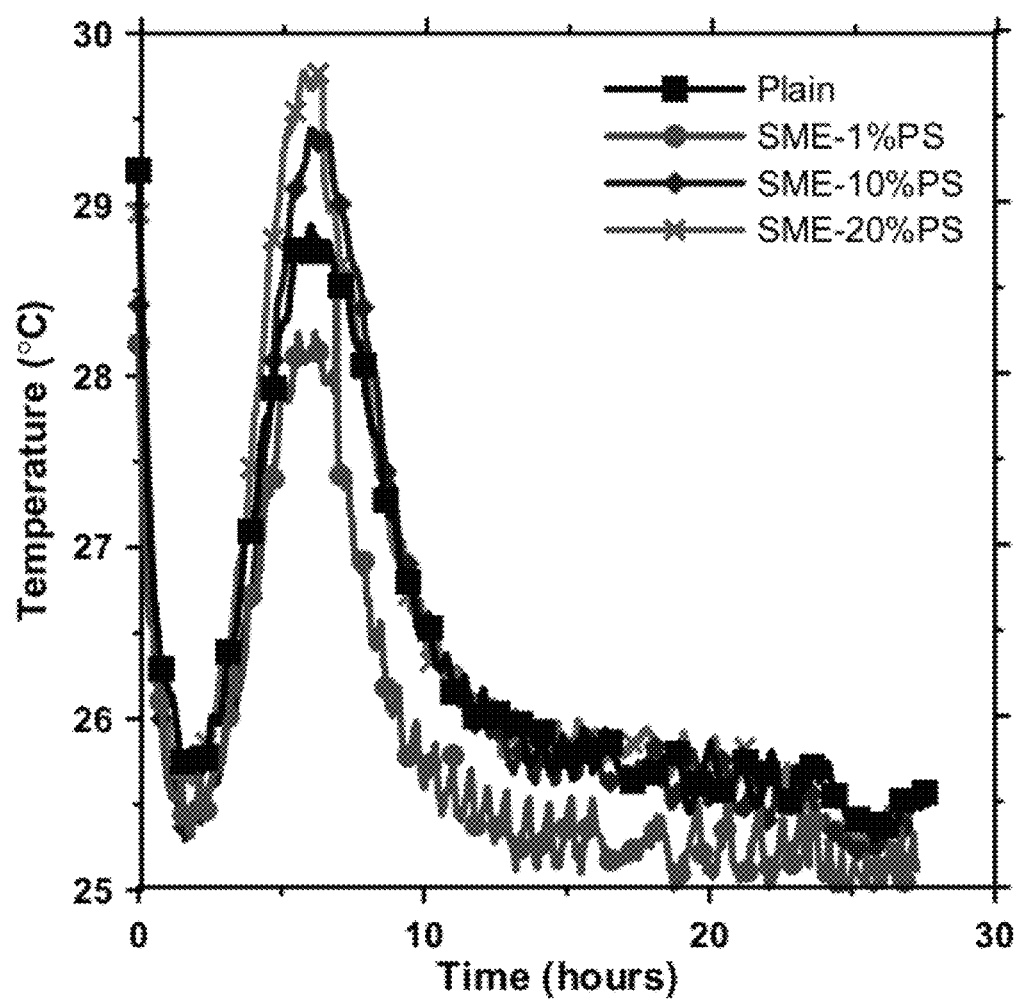
FIG. 35 shows hydration temperature profiles for w/c=0.3 cement pastes containing SME-PS Blends Dosed at 5% by weight of cement.

Another method of determining the influence of SME-PS blends on the hydration process was used. A set of thermocouples was utilized to monitor the temperature of sealed cement paste samples with a water to cement ratio of 0.30. The temperature profiles shown in FIG. 35 represent the temperature of the cement paste as a function of time. As cement hydrates, heat is released, and therefore the rate of temperature development is indicative of the stage of hydration. This method also showed that there is almost no retardation or acceleration of the cement hydration for samples containing SME-PS blends. It should be noted that the magnitude of the temperature is not important for this graph as these measurements were not performed in an insulated calorimeter. However, qualitatively they support the results obtained from the vicat needle test described previously. This is because the rate at which the temperature is changing is similar for all specimens examined.

Figure 36:
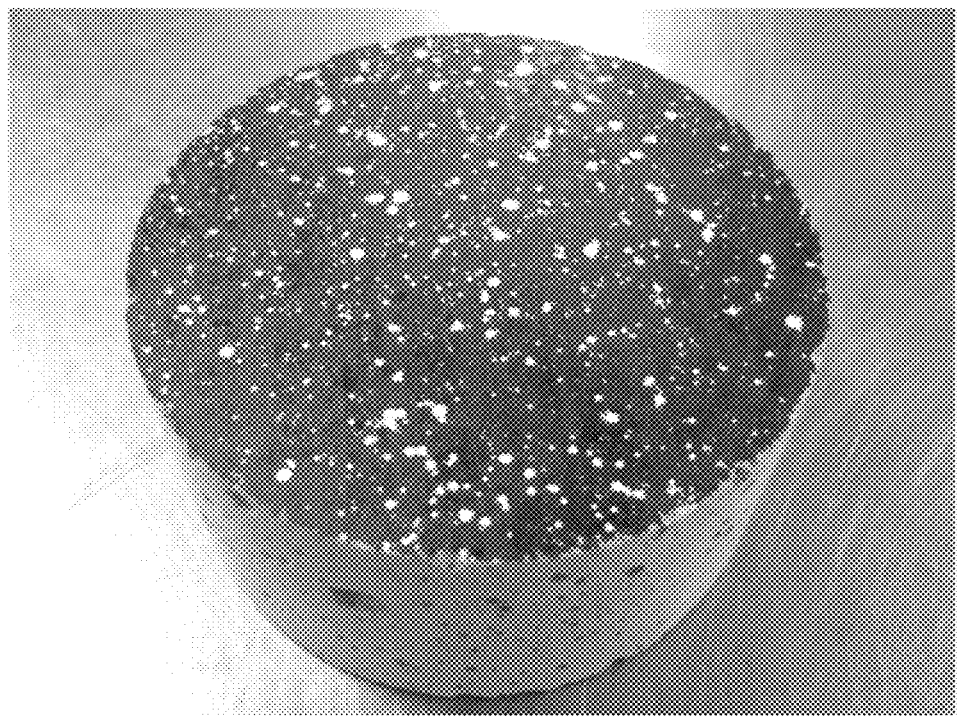
FIG. 36 shows an air void assessment sample after preparation in accordance with the teachings of the present invention.

Because of the polymeric nature of SME-PS, air can become entrained in SME-PS blends when they are mixed. It is of interest to quantify whether this air-entraining effect still occurs when SME-PS is admixed in concrete. To do this, a graphical analysis was performed on samples containing SME-PS blends. The specimens used were created identically to those used for the water absorption experiments described above. A mortar with a w/c of 0.42, and a fine aggregate volume fraction of 55% was used. Each unique mixture resulted in three (3) mortar samples for a total of 15 samples. SME-PS blends were admixed at 2.50% by weight of cement, as described in Table 5. The mortar was mixed according to ASTM C 305. The mortar was cast into 4-inch×8-inch cylinder molds, allowed to cure for 24 hours under wet burlap, and then saw-cut into 2-inch thick discs. Immediately after cutting, the discs were then polished on one of the faces using a lap polisher. The specimens were then dried and the polished surface was colored using a black permanent marker. Following this process, zinc oxide powder was applied to the polished surface and was pushed into the voids using a flexible putty knife. The specimen was carefully wiped down with a cotton cloth to remove excess powder and was then retouched with the black marker. The resulting specimen is shown in FIG. 36.

The purpose of preparing the specimens described above is to create a sample whose surface appearance is highly contrasted between the white zinc oxide filled voids (air voids), and the flat black polished surface of mortar (cement paste and aggregate). These specimens are placed on a high resolution flatbed scanner and scanned at a resolution of 3600 dpi. The images are then thresholded using predetermined values to discriminate between the black surface, and the white zinc oxide powder filled air voids present in the image. The number of white pixels, as well as the number of black pixels can then be counted. Using this information, the percentage of area that is white is then taken to be the hardened air content. Additionally, the area of groups of white pixels (which compose an air void) can be calculated and the air void size distribution of the sample can also be found.

The air void content of all samples with admixed SME-PS was higher than that of the plain mortar sample which did not contain any additional admixture. However, as seen in Table 11, the maximum increase in air void content is approximately 2.5%. This is a small increase in air voids when considering the coefficient of variation of some of the results.

TABLE 11

Air Void Analysis Results for Mortar with SME-PS Blends Admixed at 2.50% by Weight of Cement

| Sample | Average % Voids | Standard Deviation |
|---|---|---|
| Plain | 3.85% | 0.63% |
| SME-0% PS | 5.37% | 0.08% |
| SME-1% PS | 4.89% | 0.14% |
| SME-5% PS | 4.74% | 0.65% |
| SME-10% PS | 5.08% | 0.98% |
| SME-20% PS | 5.35% | 0.09% |

The SME-PS does not have any significant increase in void creation effects when admixed into concrete. It is speculated that some of these additional air voids measured in the analysis may be due to SME-PS agglomerations that form in the samples prior to the set of the mortar. This is possible since complete dispersion of SME-PS in concrete is impossible due to it being immiscible and tends to phase separate quickly. However, no significant change in void size distribution was measured for any of the sample sets containing SME-PS. This leads to the conclusion that SME-PS blends have no significant impact on the air content, or the air void size distribution of hardened cementitious materials.

In light of this exemplary experiment, it can be concluded that SME-PS blends reduced the evaporation rates of fresh mortar specimens by 46% in a topical application, while admixed application of SME-PS showed no reduction of in mass loss due to evaporation in the first 6 hours. The initial evaporation rates were actually higher for the admixed application of SME-PS, which would imply that more water is leaving the system during the first several hours. This could be attributed to a reduction in surface tension of the system due to the addition of SME-PS. Moreover, SME-PS does not have a noticeable impact on the set time or hydration of cementitious systems, nor does it appear to have an impact the hardened air void content of mortar samples made with SME-PS as an admixture. It should be noted that the mixtures described in accordance with this exemplary example did not use any other admixtures, and further research may be performed to investigate the use of SME-PS with other admixtures, such as an air entraining agents.

The rheology of cement pastes is of great interest in the field of concrete research. In the past, researchers have used rheometers to quantify yield stress and viscosity of fresh cement pastes and concrete. In some cases their efforts resulted in both empirical and theoretical relationships for the slump, flow, and spread of cementious mixtures. The purpose of the rheological testing on cement pastes with SME-PS as an admixture is to quantify the change in the rheological properties due to the presence of the SME-PS. This allows the effectiveness of SME-PS in different applications to be gauged, mainly as a VMA in concrete mixtures. As stated above, the viscosity of the SME is greatly increased by the addition of polystyrene. In order to fully quantify the performance of the SME as a VMA, the results of the rheological tests were compared to test done on cement pastes identical to those using the SME, only with a commercial VMA.

SME has gone through many tests involving its use with cementious materials. SME has been tested for potential use as both an admixture and as a topical application. The water repelling properties of SME, along with the ability to vary the viscosity of the mixtures, make it possible to use SME in several different ways. Preliminary testing has shown that while SME-PS admixtures have no significant effect on the mechanical properties or hydration of cement, it can significantly reduce water absorption and transport.

SME is renewable, non-toxic, and has a high solvent capacity. The latter property is the basis for the use of SME as a potential viscosity modifying admixture. Because SME has a high solvent capacity it is capable of "holding" dissolved compounds which can then change the physical properties of the SME. This allows SME to be used as a carrier for other compounds, in particular, polymers. One such polymer which can be readily added to SME is polystyrene (PS).

When added to the SME, the PS can significantly change the SME viscosity. The change in viscosity is believed to be due to the shape of the PS molecule. Because PS is a long chain-like molecule, when it dissolves into the SME the particles can entangle and hinder fluid flow, increasing the viscosity. This leads to the creation of a more viscous blend of the SME-PS which may be very useful in certain applications.

Figure 37:
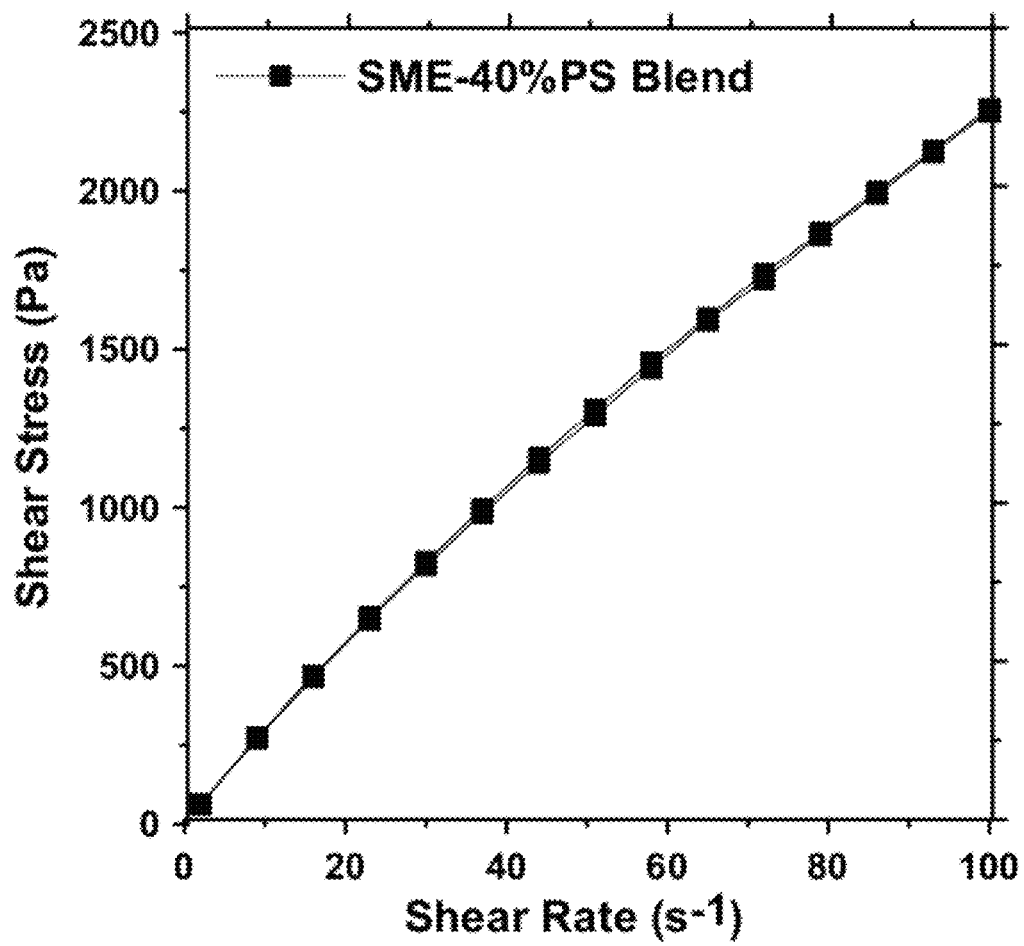
FIG. 37 shows a flow curve of SME-40% PS blend to measure viscosity.

The blend used in accordance with the principles of the present invention is SME with 40% PS added by mass of SME. FIG. 37 shows that the SME-PS blend (40% PS) has a measured viscosity of approximately 22.0 Pa·s, which is about twice the viscosity of a typical honey.

Cement paste samples were formulated using Type I ordinary portland cement, deionized water, a high range water reducing admixture, and two VMAs. The pastes were prepared at a constant water-to cement ratio (w/c) of 0.30, with varying dosages of superplasticizer (SP) and VMA. In accordance with one experimental process, two (2) different VMA were used: a commercial VMA referred to as COM (Rheomac 450VMA) and one SME based VMA containing 40% PS by mass of SME. The use of the COM was used to make relative comparisons regarding the performance expected with SME-PS blends as a VMA in an SCC mixture.

Figure 38:
FIG. 38 shows an immersion blender, mixing containers and an ice bath used to mix samples in accordance with the present invention.

The mixing procedure was modified from the standard mixing procedure. The cement pastes were mixed using an immersion hand-held blender, as seen in FIG. 38. This mixing technique allows for shorter mixing times at high shear rates, and results in a very homogenous paste with minimal cement particle flocculation. Because the immersion blender generates significant heat, all materials were conditioned to around 15° C. using an ice bath before mixing. Once mixed and placed in the rheometer sampling cup, the samples were at a temperature of 25±0.5° C. and maintained at this temperature by the rheometer's Peltier temperature control system.

The mixing process was conducted using the following steps: (1) the water was added to the mixing container, followed by the cement; (2) the system was allowed to rest for 30 seconds; (3) the immersion blender was used to mix the water and cement for 30 seconds; (4) the mixer was stopped and the sides of the container scraped with a spatula; (5) the paste was mixed with the blender for another 45 seconds, during which time any SP and the appropriate VMA dose was added; (6) immediately after mixing, the first sample was placed in the measuring cell, and the testing cycle began.

Figure 39:
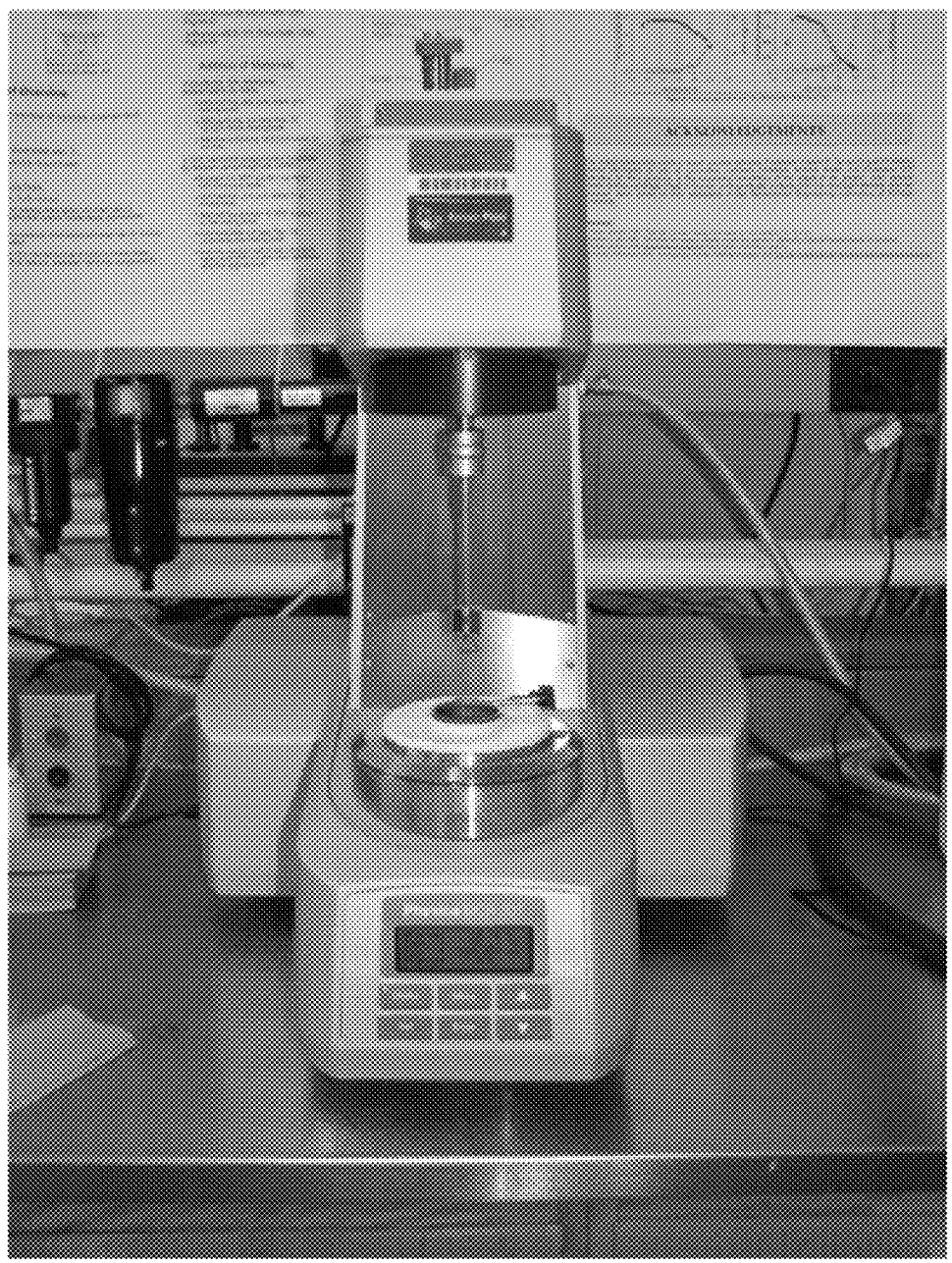
FIG. 39 shows a Physica MCR 301 Rheometer by Anton Paar and used to test samples in accordance with the present invention.

The rheological parameters of a cement paste are of key importance for evaluating the effectiveness of a VMA. The measurement of these parameters is completed through the use of an Anton Paar MCR301 rheometer, an air bearing, stress-controlled device, which can also operate in strain-rate controlled mode through a feedback control loop. The Physica MCR 301, shown in FIG. 39 is equipped with a permanent magnet synchronous drive (minimum torque=0.1 µNm, torque resolution<0.1 µNm), and an optical incremental encoder for measurement of the shear strain (resolution<1 µrad).

Figure 40:
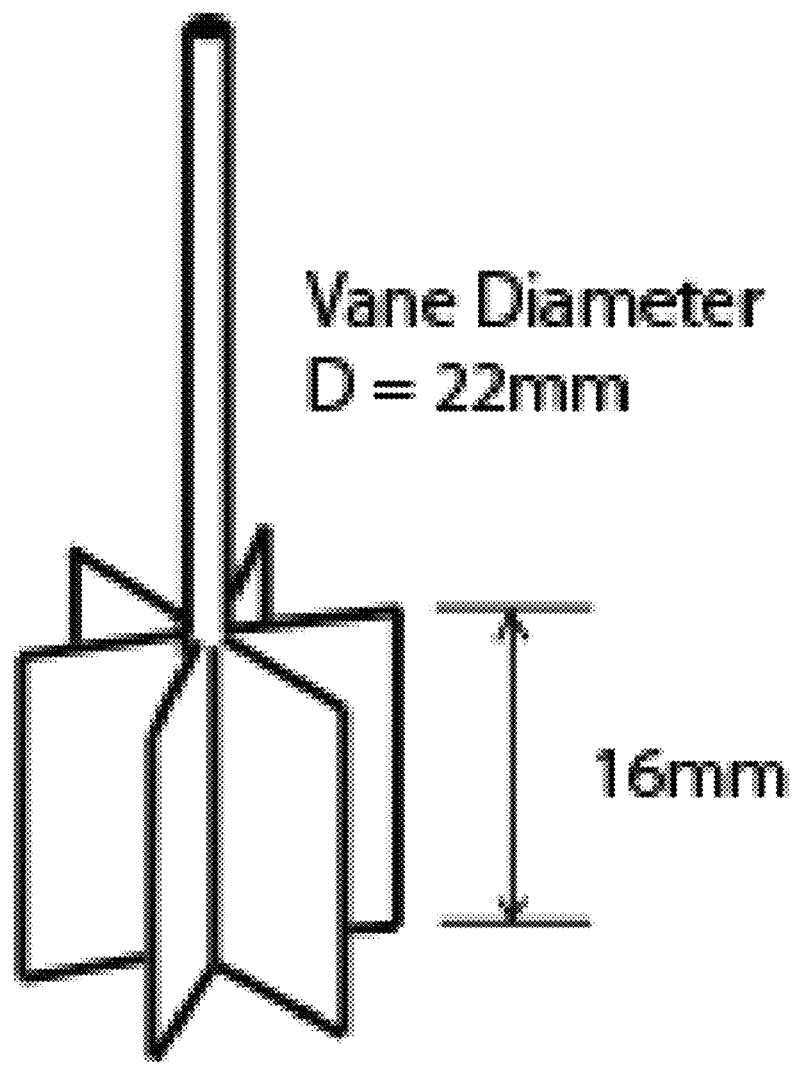
FIG. 40 shows a vane apparatus in accordance with the teachings of the present invention.

In accordance with certain exemplary embodiments, experiments were performed utilizing the vane geometry shown in FIG. 40. The vane is formed by six fins with a height of 16 mm and has a diameter of 22 mm. The cup the sample was tested in had an inside diameter of 27 mm resulting in an annular gap of approximately 5 mm. The vane geometry was chosen to carry out these tests as it had been used successfully to investigate the rheological properties of concentrated suspensions such as cement paste and minimized errors from slip. When using the vane geometry the shearing occurs on a surface approximated by a cylinder circumscribing the vane. This leads to the material being sheared within itself rather than against the surface of the geometry. Preliminary tests showed consistent results using this geometry.

Before the test cycle began, a pre-shear was performed on the sample at a shear rate ($\dot{\gamma}$) of 500 s$^{-1}$ for 60 seconds. This is followed by a 30 second resting period. The goal of these operations is to control and render uniform the history of all the samples, to facilitate comparisons between the results of the subsequent testing stages.

There are several different methods that are commonly used to measure the plastic viscosity of a fresh cement paste. In this experiment, the plastic viscosity was measured by running a rate controlled flow curve that linearly increments the shear rate every 10 seconds from $0 \text{ s}^{-1}$ to $500 \text{ s}^{-1}$ over 2½ minutes and back to $0 \text{ s}^{-1}$ over another 2½ minutes. This results in 15 measurements along both the up and down portions of the flow curve. After the test is completed, the down portion of the flow curve data is used to approximate the plastic viscosity by fitting a line representative of a Bingham fluid.

$$\tau=\tau_0+\eta\dot{\gamma} \tau=\tau_0+\eta\dot{\gamma}$$  [Equation 12]

Using a line, whose equation is of the form y=mx+b, the intercept of the line (b) is equal to the interpolated yield stress ($\tau_0$), the slope of the line (m) is the plastic viscosity ($\eta$), the independent variable (x) is the shear rate ($\dot{\gamma}$), and the dependent variable (y) is the measured shear stress ($\tau$). This model is adequate for the tests conducted since the relative comparison of viscosity between samples is of greatest value, and not the absolute values of rheological parameters. Each dosage was tested 3 times on separate cement paste mixtures. This is adequate for evaluating the comparative effectiveness of the SME based mixture as a VMA.

Figure 41:
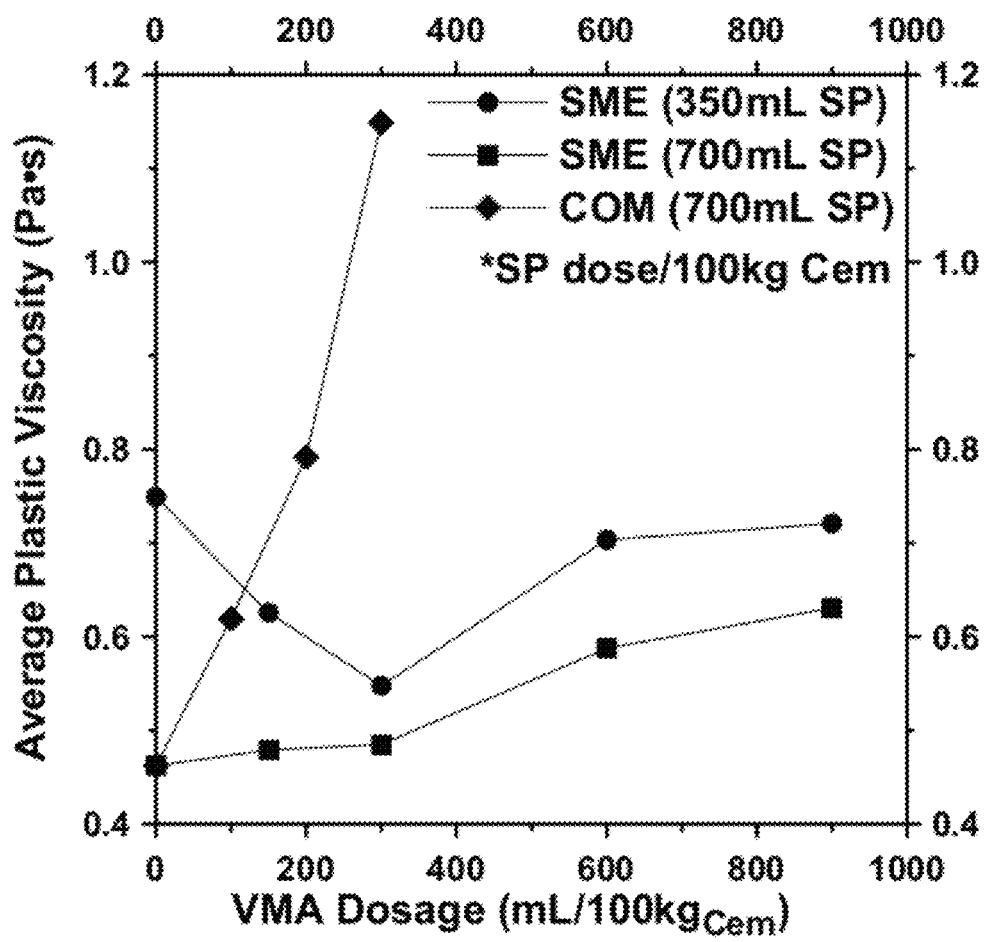
FIG. 41 shows paste viscosity by VMA dosage in accordance with the teachings of the present invention.

A total of 44 cement paste samples were tested for this investigation. The average standard deviation among cement paste samples tested was 0.034 Pa-s. This is equivalent to a coefficient of variation of approximately 5% amongst similar samples. The samples with the SME-PS blends show significant changes in viscosity of the pastes. For the higher dose of SP (700 mL/100 kg cement) it appears that the higher the dose of SME, the higher the plastic viscosity of the paste. However, the magnitude of viscosity change is much smaller when compared to the change in viscosity produced by COM as shown in FIG. 41. It should also be noted that the increase of viscosity versus the increase in dose is not a linearly proportional relationship for SME-PS, as observed for the COM. When SME is added to the pastes, the oil-like properties of the SME-PS may actually be lowering the viscosity to some extent, and therefore be competing against the increase in viscosity due to the PS present in the blend (this is observed in the decreasing and then increasing viscosity behavior of the SME-PS blends with 350 mL of SP). Once a high dosage is reached, the change in viscosity diminishes.

Figure 42:
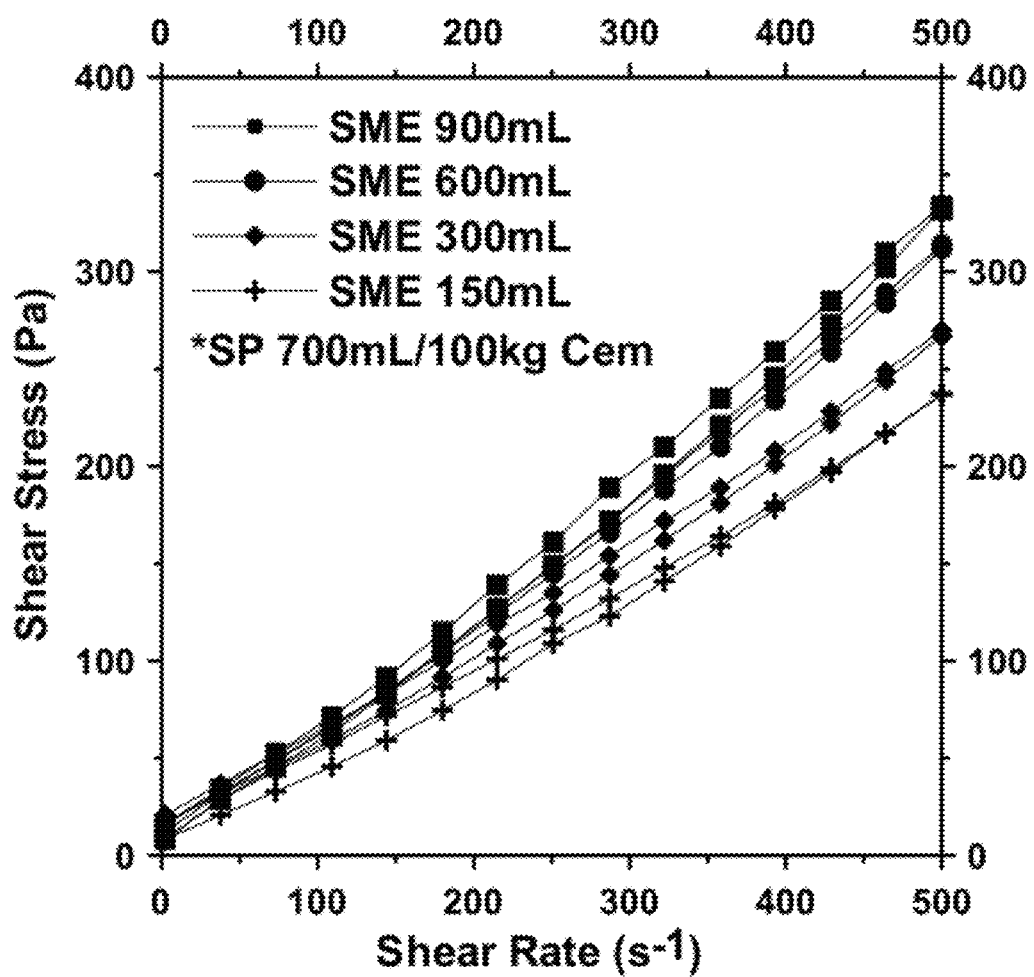
FIG. 42 shows flow curves for pastes containing SME-40% PS.
Figure 43:
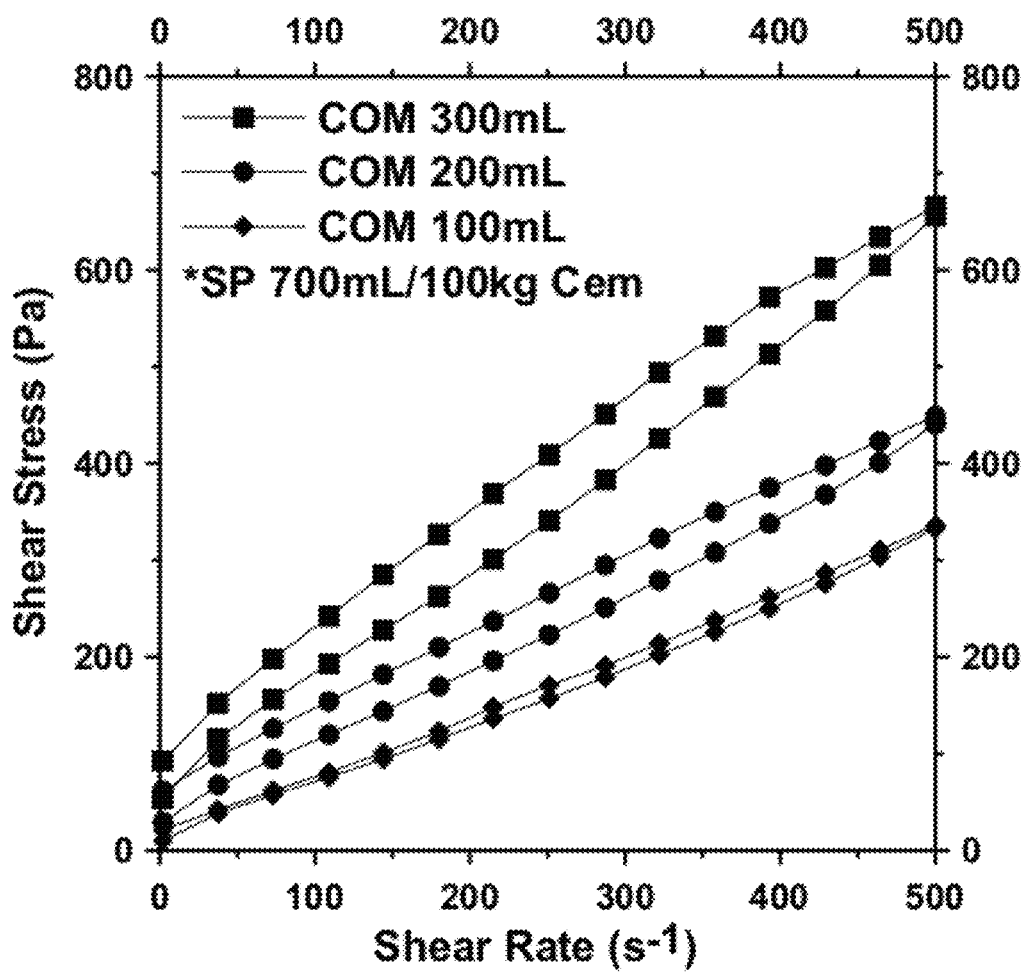
FIG. 43 shows flow curves for pastes containing COM.

FIGS. 42 and 43 show flow curves for the SME-PS and COM samples with a SP dose rate of 700 mL/100 kg cement. Differences are observed between the flow curves for the pastes prepared with the SME-PS blend and the COM admixture. Specifically, the flow curve for the SME-PS paste shows an increase in viscosity as the shear rate increases, a behavior referred to as shear-thickening. This shear-thickening could be attributed to the high dose of SP. However, the same shear thickening behavior is not seen in the tests using COM containing the same SP dose.

One possibility for this additional shear thickening behavior is the additional polymer content in the samples containing the SME admixture. The shearing of the material may be inducing the rearrangement of the PS molecules causing them to cross-link with one another.

FIG. 42 also shows that the curves for the SME-PS samples are characterized by a smaller hysteresis loop, compared to the COM samples. The samples containing COM appear to go through a significantly greater amount of structural breakdown over the course of the flow curve cycle. The small size of the hysteresis loop for the samples containing SME might be indicative of a high rate of restructuring. This is supported by the fact that the down portion of the flow curve, for a large number of the samples containing SME, crossed the up portion of the flow curve. This behavior has been previously described in terms of the competing rates of restructuring and destructuring.

In light of the above exemplary experiments, several conclusions can be made in terms of the potential use of Soy Methyl Ester Polystyrene blends (SME-PS) as a concrete additive. First, SME-PS blends do not have significant impacts on the basic mechanical properties of the concrete. In fact, the maximum reduction in compressive strength was observed to be around 18%, and this reduction may be attributed to reduced water absorption during curing, surface tension, and increases in air void content. SME-PS blends also reduce water absorption by about 74-94% when the SME-PS is admixed. To this end, when the SME-PS blends are applied topically, water absorption results show a reduction in water absorption of about 85-93%.

SME-PS blends also reduce chloride penetration by approximately 68%, and the blends with higher polystyrene contents appear to perform better in reducing chloride diffusion. Moreover, the potential of SME-PS as a penetrating sealer has been confirmed by x-ray measurements which showed no visible water penetration after 4.5 hours of water ponding on a topically treated sample.

The application of SME-PS blends topically and admixed can aid in reducing water loss due to evaporation during the first 24 hours of curing. Topically applied, SME-PS was shown to reduce water loss by 46% after 6 hours, and admixed SME-PS did not change the total evaporation after 6 hours. In addition, the SME-PS blends did not have adverse effects on the rate of hydration as determined from the Vicat test, as well as hydration temperature profiles of cement pastes.

Finally, measurements of hardened air void content also revealed that there was little effect on the air void content and size distribution of mortar samples, and the use of highly viscous blends as an admixture can alter the viscosity of cementitious mixtures. It should be noted, however, that the application of SME-PS blends for this purpose appears impractical for use as a VMA because of the high doses required.

Figure 44:
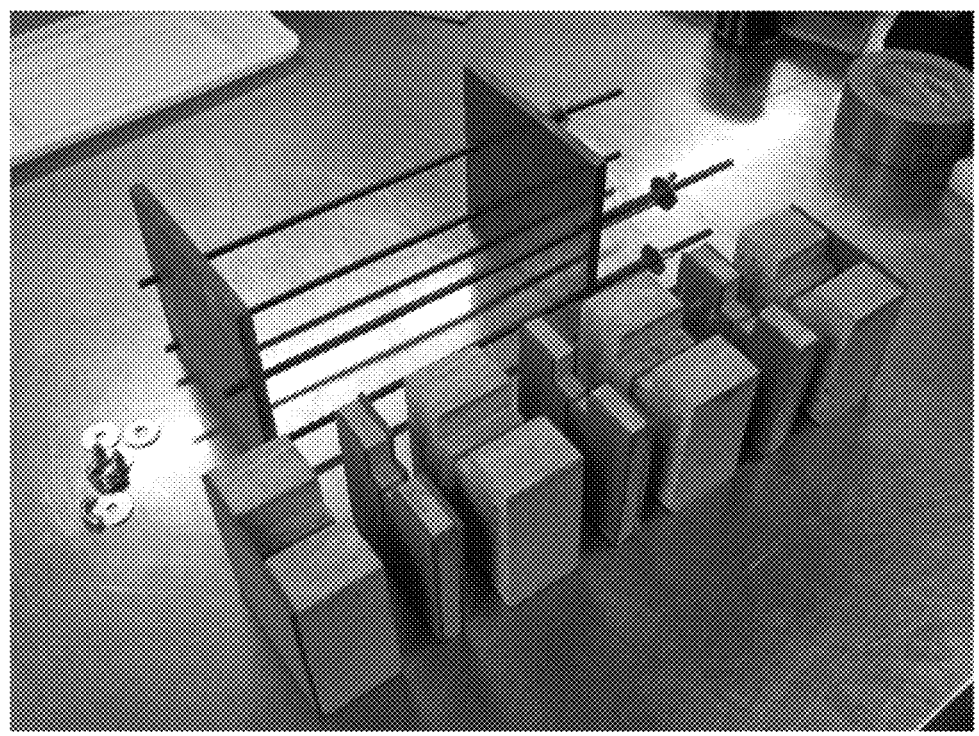
FIG. 44 shows a saw-cut geometry freeze-thaw sample and mold in accordance with the teachings of the present invention.

It should be understood and appreciated herein that further experimentation can be conducted to further characterize the behavior of the SME-PS blends, as well as their long term durability. Such experiments can be used to determine the effectiveness of SME-PS blends in protecting cementious materials from moisture related damage and degradation. Such experiments include freeze-thaw testing where the deterioration of concrete samples due to freeze-thaw over time is considered. FIG. 44, for instance, shows samples and molds that can be used for such testing. The molds allow the sample to be sliced transversely into thinner sections that can be easily used for x-ray measurements. These slices are then sealed with a silicone foam pad on either side, and then sandwiched together using the spring loaded mold. This allows easy removal and replacement of slices over the duration of the experiment to monitor the deterioration of the samples.

The durability of SME-PS blends in topical and admixture applications can also be further investigated in accordance with the teachings of the present invention. To this end, because SME is biodegradable, reapplication of these blends over time may be required in order to maintain adequate performance. Leaching and washing out of the SME-PS blends can also be considered to predict the service life of the blend, particularly for topical applications.

Further research may also include the investigation of SME-PS blend interactions with other common admixtures such as air entrainers, water reducers, and shrinkage reducing admixtures. As such, the present invention and its associated teachings are not intended to be limited herein.

While an exemplary embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

REFERENCES

The following references are incorporated herein by reference in their entirety:
1. Cramer, S. M. and A. J. Carpenter. Influence of Total Aggregate Gradation on Freeze-Thaw Durability and Other Performance Measures of Paving Concrete. In *Transportation Research Record: Journal of the Transportation Research Board, No.* 1668, Transportation Research Board of the National Academies, Washington, D.C., 1999
2. Wohl, R. L. and R. W. LaFraugh. Criteria for the Selection of Penetrating Hydrophobic Sealers Used in the Repair of Concrete Parking Decks. *Building Deck Waterproofing, ASTM STP* 1084. Fort Lauderdale, Fla., American Society for Testing and Materials, Philadelphia. 1990, pp. 75-82.
3. Natural Soy Products, L. (2008). "Non-Toxic SoySeal Wood Sealer & Waterproofer." Retrieved Nov. 6, 2008, from http://www.soyclean.biz/wood_sealer.asp.
4. Wright, J., S. Rizkalla, and Z. Shen. Three-year field and laboratory evaluation of linseed oil as a concrete sealer. *Canadian Journal of Civil Engineering*. Vol. 20, 1990. pp. 844-854.
5. Blankenhorn, P. R., R. T. Baileys, D. E. Kline, P. D. Cady. The Effects of Linseed Oil on the Compressive Strength of Concrete. *Cement and Concrete Research*. Vol. 8, 1978, pp. 513-516.
6. Duffield, J. S., Hosein; Graboski, Michael; McCormick, Robert; Wilson, Richard (1998). U.S. Biodiesel Development: New Markets for Conventional and Genetically Modified Agricultural Products, Economic Research Service: 32.
7. Tao, B. Y., S. Mohtar, et al. (2005). Biobased Hydrophobic Surface Treatment Agent for Porous Materials, Indiana Soybean Alliance. Provisional Patent: PRF 64717.
8. Mindess, S., J. F. Young, and Darwin, David. *Concrete*. Prentice Hall, Upper Saddle River, N.J., 2003.
9. National Renewable Energy Laboratory (2008). Biodiesel Handling and Use Guide. U.S. D. o. Energy: 56.
10. Brevard Biodiesel. (2007). "Stability of BioDiesel and the 'Iodine Value'." Retrieved Dec. 30, 2007. http://www.brevardbiodiesel.org/
11. Waste Online. (February 2006). "Plastics Recycling." Retrieved Jun. 1, 2008. http://www.wasteonline.org.uk/
12. Weiss, J. and B. Tao. Proposal for the Evaluation of SME-PS for Use in the Concrete Construction Industry. Purdue University, Indiana Soybean Alliance, 2007.
13. Coates, K. C., M. C. Santagata, Samia Mohtar, B. Y. Tao, and W. J. Weiss. Rheological Evaluation of Soy Methyl-Ester Polystyrene (SME-PS) Blends in Cement Pastes. To be presented at Third North American Conference on the Design and Use of Self-Consolidating Concrete. ACBM, Chicago, Ill., 2008.
14. Garboczi, E. J., K. A. Snyder, et al. (1995). "Geometrical percolation threshold of overlapping ellipsoids." *Physical Review E* 52(1): 819.
15. N. T. Notley, P. D. (1957). "Dimensions of linear polystyrene molecules in solution: Molecular weight dependence for low molecular weights." *Journal of Polymer Science* 24(106): 275-281.
16. Standard Test Method for Interfacial Tension of Oil Against Water by the Ring Method, ASTM C 971-99a. ASTM International, 2004.
17. McCormick, R. L., M. Ratcliff, et al. (2007). "Several factors affecting the stability of biodiesel in standard accelerated tests." *Fuel Processing Technology* 88(7): 651-657.
18. ASTM (1999). Standard Method of Test for Mechanical Mixing of Hydraulic Cement Pastes and Mortars of Plastic Consistency. *C* 305-99. A. International.
19. Strength of Cylindrical Concrete Specimens, ASTM C 39-05. ASTM International, 2005.
20. Standard Method of Test for Length Change of Hardened Hydraulic Cement Mortar and Concrete, ASTM C 157-93. ASTM International, 1993.
21. Standard Test Method for Measurement of Rate of Absorption of Water by Hydraulic-Cement Concretes. ASTM C 1585-04. ASTM International, 2004.
22. Rajabipour, F. (2006). Insitu Electrical Sensing and Material Health Monitoring in Concrete Structures. *Civil Engineering*. West Lafayette, Ind., Purdue University. Doctor of Philosophy: 193.
23. Paradis, F., and Weiss, W. J., "Using X-Ray Tomography to Image Cracks in Cement Paste," International Conference on High Performance Fiber Reinforced Composites HPFRCC Stuttgart Germany, ed. H. W. Reinhart, 2007
24. Bisnett, R, Samia Mohtar, B. Y. Tao, and W. J. Weiss. Soy Methyl Esters (SME)-Polystyrene Blends as a Penetrating Water Sealant for Concrete Blocks (Draft), Purdue University, 2007.
25. Couch, J., W. J. Weiss. "Experimental X-Ray Analysis Techniques," To be submitted to *Journal of Manufacturing Systems*, (Draft), Purdue University, 2008.
26. Coates, K. C., S. Mohtar, et al. (2008). "Can Soy Methyl Esters Reduce Fluid Transport And Improve The Durability of Concrete ?" *Transportation Research Record: Journal of the Transportation Research Board*.
27. Peterson, K., Air-Void Analysis of Hardened Concrete: Helping Computers To Count Air Bubbles Like People Count Air Bubbles—Methods For Flatbed Scanner Calibration. Ph.D. dissertation, Michigan Technological University, April 2008
28. Sant, G., Ferraris, C. F., and Weiss, W. J., 'Rheological Properties of Cement Pastes: A Discussion of Structure Formation and Mechanical Property Development', submitted to Cement and Concrete Research, (2007)
29. Dzuy, N. Q. and D. V. Boger (1983). "Yield Stress Measurement for Concentrated Suspensions." Journal of Rheology 27(4): 321-349.
30. Keentok, M., J. F. Milthorpe, et al. (1985). "On the shearing zone around rotating vanes in plastic liquids: theory and experiment." Journal of Non-Newtonian Fluid Mechanics 17(1): 23-35.
31. Cyr, M., C. Legrand, et al. (2000). "Study of the shear thickening effect of superplasticizers on the rheological behaviour of cement pastes containing or not mineral additives." Cement and Concrete Research 30(9): 1477-1483.
32. Ramachandran, V. S.; Beaudoin, J. J. (2001). Handbook of Analytical Techniques in Concrete Science and Technology. William Andrew Publishing/Noyes.
33. Coussot, P. (2005). Rheometry of Pastes, Suspensions, And Granular Materials: Applications In Industry and Environment. Hoboken, N.J., John Wiley & Sons, Inc.
34. Sant, G., A. Eberhardt, D. P. Bentz, and W. J. Wiess. The Influence of Shrinkage-Reducing Admixtures (SRAs) on Moisture Absorption in Cementitious Materials at Early-Ages. Submitted to the *ASCE Journal of Materials in Civil Engineering*, 2008.
35. Bisnett, R.; Mohtar, S.; Tao, B.; Weiss, W. J.; (2007). Soy Methyl Esters (SME)-Polystyrene Blends as a Penetrating Water Sealant for Concrete Blocks (Draft), Purdue University.

What is claimed is:

1. A non-aqueous blend composition for treating a porous material, comprising:
fatty acid methyl esters obtained from vegetable oils; and
polystyrene dissolved in the fatty acid methyl esters to form the non-aqueous blend composition;
wherein the porous material is a cementitious material.

2. The non-aqueous blend composition of claim 1, wherein the fatty acid methyl esters are a soy methyl ester selected from the group consisting of methyl palmitate, methyl stearate, methyl oleate, methyl linoleate and methyl linolenate.

3. The non-aqueous blend composition of claim 1, wherein the fatty acid methyl esters have 16 to 22 carbon atoms.

4. The non-aqueous blend composition of claim 1, further comprising a plasticizer.

5. The non-aqueous blend composition of claim 4, wherein the plasticizer is dioctyl phthalate.

6. The non-aqueous blend composition of claim 1, wherein the polystyrene is present in the blend composition in an amount of from about 1% to about 40% by weight of the fatty acid component.

7. A method of treating a porous material, comprising:
providing fatty acid methyl esters obtained from vegetable oils, the fatty acid methyl esters having 16 to 22 carbon atoms;
dissolving polystyrene in the fatty acid methyl esters to form a non-aqueous blend composition; and
applying the blend composition to a cementitious material.

8. The method of claim 7, wherein the polystyrene is present in the blend composition in an amount of from about 1% to about 40% by weight of the fatty acid methyl esters.

9. The method of claim 7, wherein the step of providing the fatty acid methyl esters comprises providing a soy methyl ester selected from the group consisting of methyl palmitate, methyl stearate, methyl oleate, methyl linoleate and methyl linolenate.

10. The method of claim 7, wherein the step of applying the blend composition to a porous material comprises admixing the blend composition with the cementitious material.

11. The method of claim 10, wherein the blend composition is admixed with the cementitious material in an amount of from about 1.25% to about 2.50% by weight of the cementitious material.

12. The method of claim 7, wherein the step of applying the blend composition to a porous material comprises topically treating a surface of a cementitious material with the blend composition.

13. The method of claim 7, wherein the blend composition is free from water.

14. The method of claim 7, further comprising adding a plasticizer to the blend composition.

15. The method of claim 14, wherein the step of adding the plasticizer to the blend composition comprises adding a dioctyl phthalate to the blend composition.

16. The method of claim 12, wherein the blend composition is applied as a sealant.

17. The method of claim 7, wherein the blend composition is topically applied to the porous material as a sealant.

18. A cementitious material penetrated with the non-aqueous blend composition of claim 1.

19. The cementitious material of claim 18, wherein the water absorption of the cementitious material is reduced between 87-92% compared to an untreated cementitious material.

20. The cementitious material of claim 18, wherein the fatty acid methyl esters are selected from the group consisting of methyl palmitate, methyl stearate, methyl oleate, methyl linoleate and methyl linolenate.

21. The non-aqueous blend of composition of claim 18, wherein the fatty acid methyl esters are selected from the group consisting of methyl palmitate, methyl stearate, methyl oleate, methyl linoleate and methyl linolenate.

* * * * *